United States Patent
Ohshima et al.

(10) Patent No.: US 7,495,936 B2
(45) Date of Patent: Feb. 24, 2009

(54) THREE-PHASE VOLTAGE-FED AC/DC CONVERTER

(75) Inventors: Masaaki Ohshima, Tokyo (JP); Hirokazu Shimizu, Tokyo (JP); Shuichi Ushiki, Tokyo (JP); Jirou Fukui, Tokyo (JP)

(73) Assignee: Origin Electric Co., Ltd., Tokyo (JP)

( * ) Notice: Subject to any disclaimer, the term of this patent is extended or adjusted under 35 U.S.C. 154(b) by 176 days.

(21) Appl. No.: 11/679,475

(22) Filed: Feb. 27, 2007

(65) Prior Publication Data

US 2007/0200607 A1   Aug. 30, 2007

(30) Foreign Application Priority Data

Feb. 28, 2006   (JP) ............................. 2006-053487
Jan. 15, 2007   (JP) ............................. 2007-005918

(51) Int. Cl.
*H03J 3/00* (2006.01)
*H02M 5/40* (2006.01)

(52) U.S. Cl. .......................................... 363/36; 363/34
(58) Field of Classification Search ................ 363/34, 363/36, 37, 52, 53, 55, 56.01, 84, 89, 95, 363/97, 125, 127, 131, 149, 152; 318/798–812
See application file for complete search history.

(56) References Cited

U.S. PATENT DOCUMENTS

| | | | | |
|---|---|---|---|---|
| 5,994,870 A | * | 11/1999 | Kaneko et al. | 318/798 |
| 6,005,783 A | * | 12/1999 | Xue et al. | 363/36 |
| 6,043,617 A | * | 3/2000 | Matsumoto et al. | 318/52 |

FOREIGN PATENT DOCUMENTS

| | | |
|---|---|---|
| JP | 52-103634 | 8/1977 |
| JP | 06-311653 | 11/1994 |

* cited by examiner

*Primary Examiner*—Matthew V Nguyen
(74) *Attorney, Agent, or Firm*—Darby & Darby P.C.

(57) ABSTRACT

A three-phase voltage-fed AC/DC converter includes a conversion circuit which converts power from a DC voltage source to three-phase AC power. The converter further includes a UM conversion circuit which carries out dq conversion of the three-phase output voltage, a superior voltage control circuit which outputs a voltage reference vector based on a superior reference vector and an output voltage vector obtained by the UM conversion circuit, an inferior voltage control circuit which outputs a PWM reference based on the voltage reference vector and the output voltage vector, and a frequency control circuit which synchronizes a value generated based on a q-axis component from the UM conversion circuit with a rotation angle of a conversion matrix in the UM conversion circuit.

13 Claims, 22 Drawing Sheets

FIG. 2
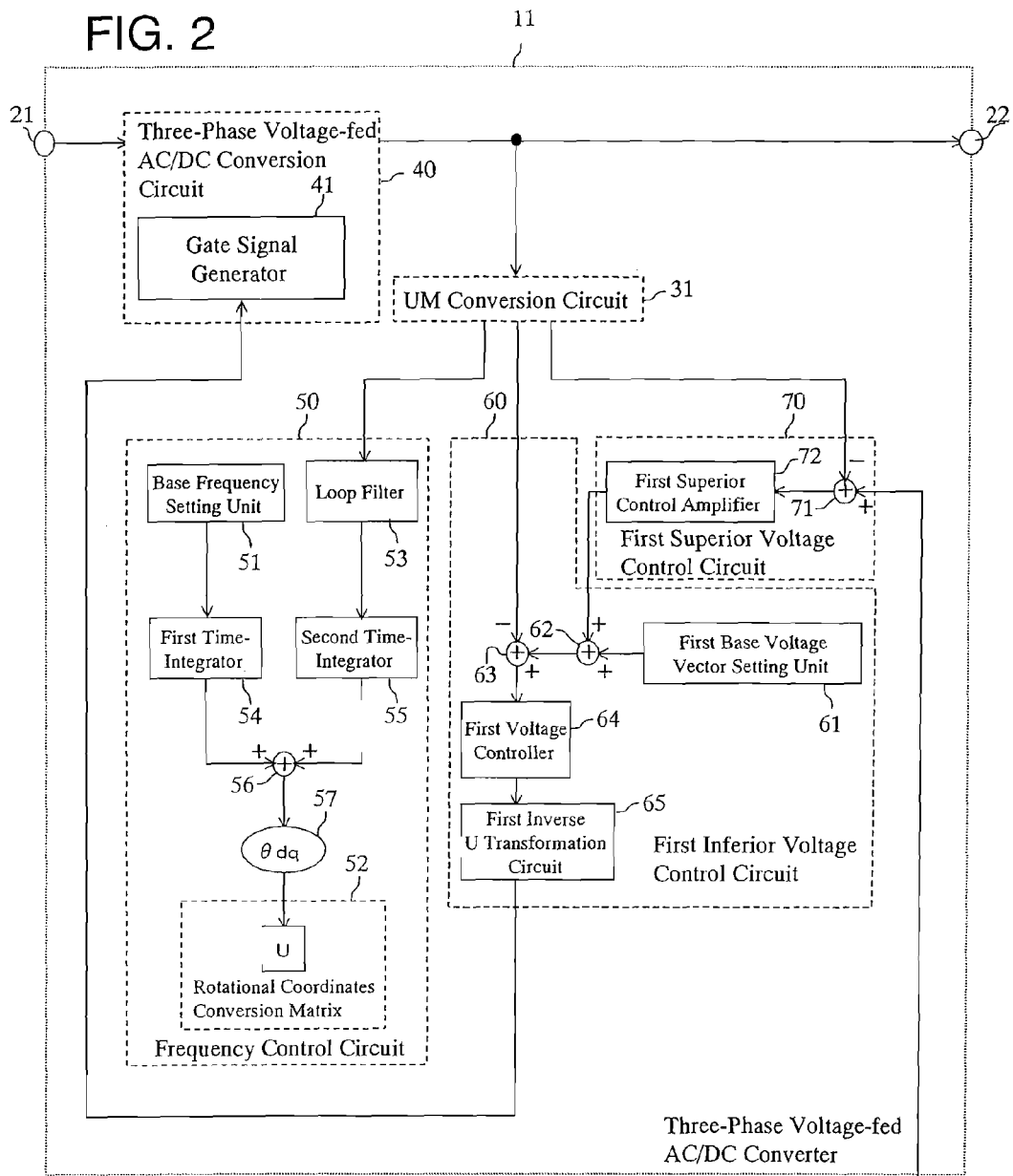
U is outputted to the UM Conversion Circuit
and the Inverse U Transformation Circuit
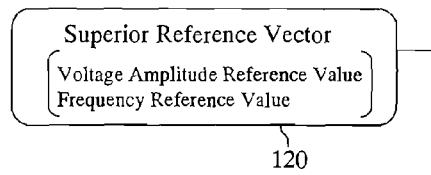

ded by a deviation detection circuit provided separately, and the output has been corrected so that the detected deviation becomes zero (e.g., see Japanese Laid-Open Patent Application No. SHO 52-103634).

THREE-PHASE VOLTAGE-FED AC/DC CONVERTER

The present application claims priority from Japanese Patent Application No. 2006-053487, filed Feb. 28, 2006, and Japanese Patent Application No. 2007-005918, filed on Jan. 15, 2007, the disclosures of which are hereby incorporated by reference herein in their entirety.

FIELD OF THE INVENTION

The present invention is related to a three-phase voltage-fed AC/DC converter which can be applied to a power network link device or an uninterruptible power supply forming a power supply of an electric power system, and a three-phase voltage-fed AC/DC converter which can be applied to an inverter that operates while connected to an electric power system.

DESCRIPTION OF THE PRIOR ART

Up until now, in the case where a plurality of inverters are operated while connected in parallel, the deviation between the outputs of one inverter and another inverter has been detected by a deviation detection circuit provided separately, and the output has been corrected so that the detected deviation becomes zero (e.g., see Japanese Laid-Open Patent Application No. SHO 52-103634).

In this regard, a schematic block diagram showing a parallel operation of a prior art power supply is shown in FIG. 13. FIG. 13 shows an arrangement in which two inverters are connected in parallel and power is supplied for a common load.

A prior art power supply 300 has a reference oscillator 301, a PLL (Phase-Locked Loop) circuit 302, an inverter 303, an active power deviation detection circuit 304, a voltage transformer 305, a phase detection transformer 306 and a current transformer 307. The phase detection transformer 306 detects the phase of the output voltage. The voltage transformer 305 and the current transformer 307 detect the active power of the output voltage. The active power deviation detection circuit 304 detects the deviation of the power of the power supply 300 from the active power detection signal from the voltage transformer 305 and the current transformer 307. The reference oscillator 301 generates a signal which forms the base of the power supply 300. The PLL circuit 302 controls the frequency of the output signal in accordance with the difference between the detected phase of the phase detection transformer 306 and the reference signal phase from the reference oscillator 301, and controls the phase of the output signal so that the power deviation from the reference signal phase from the reference oscillator 301 and the power deviation detection signal from the active power deviation detection circuit 304 becomes zero. The inverter 303 generates AC power based on the output signal from the PLL circuit 302. A power supply 310 has the same structure as the power supply 300, and has a phase detection transformer 316, a voltage transformer 315 and a current transformer 317, an active power deviation detection circuit 314, a reference oscillator 311, a PLL circuit 312 and an inverter 313. Further, the active power deviation detection circuits 304, 314 of the power supplies 300, 310 are connected by a common signal line 308.

In such prior art power system, improvement of the reliability of the system is planned by the structure described above in which information on the active power deviation between each device is exchanged via the common signal line 308, and the active power deviation is corrected automatically by each of the power supplies 300, 310.

Further, power network link inverter protection methods which make it possible to prevent islanding operation and reverse charging to the AC power system are known in the prior art (e.g., see Japanese Laid-Open Patent Application No. HEI 06-311653, describing a "frequency shift method", a "band-pass filter method", a "power fluctuation method" and a "harmonic voltage monitoring method" are described).

In this regard, FIG. 22 shows a schematic diagram of the structure of a prior art three-phase voltage-fed AC/DC converter. When the AC power system is interrupted, the power network link inverter changes the frequency of the inverter output voltage by changing the current phase based on the frequency of the inverter output voltage, the frequency rate of change and the voltage distortion near the zero intersection. The three-phase voltage-fed AC/DC converter of FIG. 22 detects this and shuts down the power network link inverter.

However, in the case where the prior art power supply 300 of FIG. 13 is operated in parallel, the outputs of each of the power supplies 300, 310 are monitored using the active power deviation detection circuits 304, 314, respectively. Further, information on the active power deviation needs to be exchanged mutually via the common signal line 308.

For this reason, if either of the active power deviation detection circuits 304, 314 operates abnormally, an accurate power deviation can not be detected, and this results in the loss of balance for the entire power supply. Further, the same problem also occurs when an error is created in the exchange of information about the active power of each inverter. FIG. 13 shows an embodiment in which the two power supplies 300, 310 are operated in parallel, but in the case where there is a greater number of parallel operations or when a remote arrangement is carried out, the situation described above becomes a bigger problem. This is a major problem affecting the reliability of the entire power supply.

SUMMARY OF THE INVENTION

In this regard, it is a first object of the present invention to provide a three-phase AC/DC converter in which each device is made autonomous so that an autonomous parallel operation can be carried out to control the output deviation even in the case where a plurality of units are connected in parallel and undergo parallel operation.

Further, the prior art power network link inverter protection method uses the fact that the excitation voltage of a distribution transformer is distorted. Further, it is believed that the distortion of the excitation voltage depends on the relationship between the inverter capacity and the distribution transformer capacity and the like. For this reason, in the case where the supply power and load power of the power network link inverter are roughly equal, it is difficult to reliably detect an islanding operation of the power network link inverter.

In this regard, it is a second object of the present invention to provide a three-phase voltage-fed AC/DC converter which can reliably detect that the AC power system is interrupted and an islanding operation has been formed.

In order to achieve the first object, the three-phase voltage-fed AC/DC converter according to the present invention controls each axial component independently when the three-phase output voltage is converted to rotational coordinates. Further, the three-phase voltage-fed AC/DC converter according to the present invention makes the rotation angle follow the frequency of the power system when the three-phase output voltage is converted to rotational coordinates.

Further, the three-phase voltage-fed AC/DC converter according to the present invention has internal equivalent impedance so that it can be operated as a distribution network connected to a power system.

Namely, a three-phase voltage-fed AC/DC converter according to an embodiment of the present invention is equipped with a three-phase voltage-fed AC/DC conversion circuit which has internal equivalent impedance viewed from an AC terminal, converts power from a DC voltage source to three-phase AC power in accordance with the pulse width of gate signals generated based on a PWM reference, and outputs the three-phase AC power to the AC terminal; a UM conversion circuit which converts the three-phase output voltage at the AC terminal to dq rotational coordinates in which the component related to the amplitude of the three-phase output voltage forms the d-axis component and the component related to the frequency deviation of the three-phase output voltage forms the q-axis component, and outputs the result; a superior voltage control circuit which receives the input of a superior reference vector formed with both a voltage amplitude reference value for the amplitude of the three-phase output voltage at the AC terminal and a frequency reference value for the frequency, and generates a signal that makes the amplitude and frequency of the three-phase output voltage at the AC terminal close to the reference values prepared by the superior reference vector, based on the inputted superior reference vector and the output voltage vector obtained by said UM conversion circuit, and outputs the signal as a voltage reference vector; an inferior voltage control circuit which generates a signal that makes the amplitude and phase of the three-phase output voltage close to the combined value of both the base voltage vector and the voltage reference vector, based on the base voltage vector which prescribes the amplitude and phase of the three-phase output voltage at the AC terminal, an output voltage vector obtained by the UM conversion circuit and the voltage reference vector from the superior voltage control circuit, and outputs the signal as the PWM reference; and a frequency control circuit which synchronizes a value generated based on a base frequency which prescribes the frequency of the three-phase output voltage at the AC terminal and the q-axis component of the output voltage vector obtained by the UM conversion circuit with the rotation angle of a conversion matrix in the UM conversion circuit.

The three-phase voltage-fed AC/DC converter has internal equivalent impedance so that it can be operated in connection to a power system even when operated as a distribution network. Further, the three-phase voltage-fed AC/DC converter synchronizes the value generated from the component related to the frequency deviation of the three-phase output voltage with the rotation angle of the conversion matrix in the UM conversion circuit by the frequency control circuit. In this way, such rotation angle follows the frequency of the power system. Further, the superior control circuit generates a voltage reference vector so as to make the amplitude and frequency of the inverter close to the reference values that are based on the superior reference vector. In this way, even if the amplitude and frequency of the power system are changed, it is possible to detect each deviation portion of the amplitude and frequency of the three-phase output power of the three-phase voltage-fed AC/DC converter for such amplitude and frequency. Accordingly, the inferior voltage control circuit can compensate such deviation portions by controlling the amplitude and phase of the three-phase voltage-fed AC/DC converter to match both the amplitude and phase of the power system. Consequently, the three-phase voltage-fed AC/DC converter according to the present invention can be operated in connection to a power system as a distribution network, and can carry out an autonomous parallel operation which compensates the power deviation for the power system autonomously. For this reason, it is possible to improve the reliability of the three-phase voltage-fed AC/DC converter according to the present invention, and a distributed arrangement of the three-phase voltage-fed AC/DC converter according to the present invention can be formed. Further, in the case where a plurality of inverters undergoes parallel operation, the operation can be carried out without any limit to the number of inverters.

In the three-phase voltage-fed AC/DC converter described above, the superior voltage control circuit is preferably provided with a first subtracter which subtracts the output voltage vector prepared by the UM conversion circuit from the superior reference vector, and a superior control amplifier which amplifies the output vector prepared by the first subtracter and then outputs the result as the voltage reference vector so that the three-phase output voltage at the AC terminal is close to the reference value that is based on the superior reference vector; the inferior voltage control circuit is preferably provided with a base voltage vector setting unit which sets and outputs the base voltage vector, a first adder which adds the voltage reference vector prepared by the superior voltage control circuit and the base voltage vector from the base voltage vector setting unit and then outputs the result, a second subtracter which subtracts the output voltage vector prepared by the UM conversion circuit from the output vector prepared by the first adder, a voltage controller which converts the output vector from the second subtracter and outputs the result so that the three-phase output voltage at the AC terminal is close to the combined value of the base voltage vector and the voltage reference vector, and an Inverse U transformation unit which outputs the output vector from the voltage controller as the PWM reference by carrying out inversion from the dq rotational coordinates; and the frequency control circuit is preferably provided with a base frequency setting unit which sets the base frequency, a first time-integrator which carries out time integration of the base frequency from the base frequency setting unit and outputs the result, a loop filter which adds a low-pass filtering element to the q-axis component of the output voltage vector obtained by the UM conversion circuit and outputs the result, a second time-integrator which carries out time integration of the output value from the loop filter and outputs the result, and a second adder which adds the output value from the first time-integrator and the output value from the second time-integrator and then outputs the result as the generated value; wherein the frequency control circuit synchronizes the generated value with the rotation angle of the conversion matrix in the UM conversion circuit and the Inverse U transformation unit.

Each structure of the three-phase voltage-fed AC/DC converter according to the present invention may be more concretely described as follows. The frequency control circuit adds the low-pass filtering element to the q-axis component which is the component related to the frequency deviation of the three-phase output voltage in the loop filter, and carries out time integration in the second time-integrator. Further, the frequency control circuit carries out time integration of the base frequency outputted from the base frequency setting unit in a first time-integrator. Further, the frequency control circuit synchronizes a value generated by adding the integrated value from the second time-integrator to the integrated value from the first time-integrator with the rotation angle of a conversion matrix in the UM conversion circuit. In this way, such rotation angle follows the frequency of the power system.

Further, the superior voltage control circuit subtracts the output voltage vector of the UM conversion circuit from the superior reference vector in the subtracter. Further, the superior voltage control circuit generates and outputs a voltage reference vector by carrying out amplification in the superior control amplifier so as to make the amplitude and frequency of the inverter close to the reference values that are based on the superior reference vector. In this way, even if the amplitude and frequency of the power system are changed, it is possible to detect each deviation portion of the amplitude and frequency of the three-phase output power of the three-phase voltage-fed AC/DC converter for such amplitude and frequency, and the inferior voltage control circuit can compensate such deviation portions. Namely, the inferior voltage control circuit adds the voltage reference vector from the superior voltage control circuit to the base voltage vector from the base voltage vector setting unit to add a compensation portion of the deviation of the amplitude and frequency of the power system.

Further, the inferior voltage control circuit subtracts the output voltage vector obtained by the UM conversion circuit from the vector that a compensation portion of the deviation is added to, carries out conversion in a voltage controller so that the difference with the amplitude and phase of the power system is close to the combined value of the base voltage vector and the voltage reference vector, and outputs the result. Further, the inferior voltage control circuit converts the two-phase output vector obtained from the voltage controller to three phases in the Inverse U transformation unit, and outputs the result as a PWM reference to the three-phase voltage-fed AC/DC conversion circuit. In this way, the amplitude and phase of the three-phase output voltage of the three-phase voltage-fed AC/DC converter are controlled to match both the amplitude and phase of the power system.

Consequently, the three-phase voltage-fed AC/DC converter according to the present invention can be operated in connection to a power system as a distribution network, and can carry out an autonomous parallel operation which compensates the power deviation for the power system autonomously. For this reason, it is possible to improve the reliability of the converter, and a distributed arrangement can be formed. Further, in the case where a plurality of inverters undergoes parallel operation, the operation can be carried out without any limit to the number of inverters.

A three-phase voltage-fed AC/DC converter according to another embodiment of the present invention is equipped with a three-phase voltage-fed AC/DC conversion circuit which has internal equivalent impedance viewed from an AC terminal, converts power from a DC voltage source to three-phase AC power in accordance with the pulse width of gate signals generated based on a PWM reference, and outputs the three-phase AC power to the AC terminal; an M conversion circuit which converts the three-phase output voltage at the AC terminal to $\alpha\beta$ static coordinates formed by an $\alpha$ axis and a $\beta$ axis which are mutually orthogonal, wherein one voltage of the three-phase output voltage forms a reference; a U conversion circuit which converts the output voltage vector of the M conversion circuit to dq rotational coordinates in which the component related to the amplitude of the three-phase output voltage forms the d-axis component and the component related to the frequency deviation of the three-phase output voltage forms the q-axis component, and then outputs the result; a superior voltage control circuit which receives the input of a superior reference vector formed with both a voltage amplitude reference value for the amplitude of the three-phase output voltage at the AC terminal and a frequency reference value for the frequency, and generates a signal that makes the amplitude and frequency of the three-phase output voltage at the AC terminal close to the reference values prepared by the superior reference vector, based on the inputted superior reference vector and the output voltage vector obtained by the U conversion circuit, and carries out inverse U transformation of the signal from the dq rotational coordinates to the $\alpha\beta$ static coordinates, and outputs the signal on the $\alpha\beta$ coordinates as a voltage reference vector; an inferior voltage control circuit which generates a signal that makes the amplitude and phase of the three-phase output voltage close to the combined value of both the base voltage vector and the voltage reference vector, based on the base voltage vector which prescribes the amplitude and phase of the three-phase output voltage at the AC terminal, an output voltage vector obtained by the UM conversion circuit and the voltage reference vector from the superior voltage control circuit, and outputs the signal as said PWM reference; and a frequency control circuit which synchronizes a value generated based on a base frequency which prescribes the frequency of the three-phase output voltage at the AC terminal and the q-axis component of the output voltage vector obtained by the U conversion circuit with the rotation angle of a conversion matrix in the U conversion circuit and the superior voltage control circuit.

In contrast to the first described embodiment of the disclosed invention, the signal process inside the inferior voltage control circuit of the present embodiment of the invention is carried out in $\alpha\beta$ static coordinates. The three-phase voltage-fed AC/DC converter according to this embodiment also has internal equivalent impedance so that it can be operated in connection to a power system as a distribution network. Further, the three-phase voltage-fed AC/DC converter synchronizes the value generated from the component related to the frequency deviation of the three-phase output voltage with the rotation angle of the conversion matrix in the U conversion circuit by the frequency control circuit. In this way, such rotation angle follows the frequency of the power system.

Further, the superior control circuit generates a voltage reference vector so as to make the amplitude and frequency of the inverter close to the reference values that are based on the superior reference vector. In this way, even if the amplitude and frequency of the power system are changed, it is possible to detect each deviation portion of the amplitude and frequency of the three-phase output power of the three-phase voltage-fed AC/DC converter for such amplitude and frequency. Accordingly, the inferior voltage control circuit can compensate such deviation portions by controlling the amplitude and phase of the three-phase voltage-fed AC/DC converter to match both the amplitude and phase of the power system. Consequently, the three-phase voltage-fed AC/DC converter can be operated in connection to a power system as a distribution network, and can carry out an autonomous parallel operation which compensates the power deviation for the power system autonomously. For this reason, it is possible to improve the reliability of the three-phase voltage-fed AC/DC converter according to the present invention, and a distributed arrangement of the three-phase voltage-fed AC/DC converter according to the present invention can be formed. Further, in the case where a plurality of inverters undergoes parallel operation, the operation can be carried out without any limit to the number of inverters.

In the three-phase voltage-fed AC/DC converter described above, the superior voltage control circuit is preferably provided with a first subtracter which subtracts the output voltage vector obtained by the U conversion circuit from the superior reference vector, a superior control amplifier which amplifies the output vector prepared by the first subtracter and then outputs the result so that the three-phase output voltage at the AC terminal is close to the reference value that is based on the superior reference vector, and an Inverse U transformation unit which carries out inverse U transformation of the output vector from the superior control amplifier from the dq rotational coordinates to the αβ static coordinates and outputs the αβ coordinates as the voltage reference vector; the inferior voltage control circuit is preferably provided with a base voltage vector setting unit which sets and outputs the base voltage vector, a first adder which adds the voltage reference vector from the superior voltage control circuit and the base voltage vector from the base voltage vector setting unit and then outputs the result, a second subtracter which subtracts the output voltage vector obtained by the M conversion circuit from the output vector prepared by the first adder, and a voltage controller which converts the output vector from the second subtracter and outputs the result as the PWM reference so that the three-phase output voltage at the AC terminal is close to the combined value of the base voltage vector and the voltage reference vector; and the frequency control circuit is preferably provided with a base frequency setting unit which sets the base frequency, a first time-integrator which carries out time integration of the base frequency from the base frequency setting unit and outputs the result, a loop filter which adds a low-pass filtering element to the q-axis component of the output voltage vector obtained by the U conversion circuit and outputs the result, a second time-integrator which carries out time integration of the output value from the loop filter and outputs the result, and a second adder which adds the output value from the first time-integrator and the output value from the second time-integrator and then outputs the result as the generated value; wherein the frequency control circuit synchronizes the generated value with the rotation angle of the conversion matrix in the U conversion circuit and the Inverse U transformation unit.

Each structure of the three-phase voltage-fed AC/DC converter of the present embodiment of the invention is defined more concretely as follows. The frequency control circuit adds the low-pass filtering element to the q-axis component which is the component related to the frequency deviation of the three-phase output voltage in the loop filter, and carries out time integration in the second time-integrator. Further, the frequency control circuit carries out time integration of the base frequency outputted from the base frequency setting unit in a first time-integrator. Further, the frequency control circuit synchronizes a value generated by adding the integrated value from the second time-integrator to the integrated value from the first time-integrator with the rotation angle of a conversion matrix in the U conversion circuit. In this way, such rotation angle follows the frequency of the power system. Further, the superior voltage control circuit subtracts the output voltage vector obtained by the U conversion circuit and the superior reference vector in the subtracter. Further, the superior voltage control circuit generates a voltage reference vector by carrying out amplification in the superior control amplifier and conversion to αβ static coordinates in an Inverse U transformation unit so as to make the amplitude and frequency of the inverter close to the reference values that are based on the superior reference vector.

In this way, even if the amplitude and frequency of the power system are changed, it is possible to detect each deviation portion of the amplitude and frequency of the three-phase output power of the three-phase voltage-fed AC/DC converter for such amplitude and frequency, and the inferior voltage control circuit can compensate such deviation portions. Namely, the inferior voltage control circuit adds the voltage reference vector from the superior voltage control circuit to the base voltage vector from the base voltage vector setting unit to add a compensation portion of the deviation of the amplitude and frequency of the power system. Further, the inferior voltage control circuit subtracts the output voltage vector obtained by the M conversion circuit from the vector that a compensation portion of the deviation is added to, carries out conversion in a voltage controller so that the difference with the amplitude and phase of the power system is close to the combined value of the base voltage vector and the voltage reference vector, and outputs the result as a PWM reference to the three-phase voltage-fed AC/DC conversion circuit.

In this way, the amplitude and phase of the three-phase output voltage of the three-phase voltage-fed AC/DC converter are controlled to match both the amplitude and phase of the power system. Consequently, the three-phase voltage-fed AC/DC converter according to the present invention can be operated in connection to a power system as a distribution network, and can carry out an autonomous parallel operation which compensates the power deviation for the power system autonomously. For this reason, it is possible to improve the reliability of the converter, and a distributed arrangement can be formed. Further, in the case where a plurality of inverters undergoes parallel operation, the operation can be carried out without any limit to the number of inverters.

A three-phase voltage-fed AC/DC converter according to still another embodiment of the present invention is equipped with three-phase voltage-fed AC/DC conversion circuit which has internal equivalent impedance viewed from an AC terminal, converts power from a DC voltage source to three-phase AC power in accordance with the pulse width of gate signals generated based on a PWM reference, and outputs the three-phase AC power to the AC terminal; a UM conversion circuit which converts the three-phase output voltage at the AC terminal to dq rotational coordinates in which the component related to the amplitude of the three-phase output voltage forms the d-axis component and the component related to the frequency deviation of the three-phase output voltage forms the q-axis component, and outputs the result; a superior voltage control circuit which receives the input of a superior reference vector formed with both a voltage amplitude reference value for the amplitude of the three-phase output voltage at the AC terminal and a frequency reference value for the frequency, and generates a signal that takes the amplitude and frequency of the three-phase output voltage at the AC terminal close to the reference values prepared by the superior reference vector, based on the inputted superior reference vector and the output voltage vector obtained by the UM conversion circuit, and outputs the signal as a voltage reference vector by carrying out inverse UM transformation from the dq rotational coordinates; an inferior voltage control circuit which generates a signal that makes the amplitude and phase of the three-phase output voltage close to the combined value of both the base voltage vector and the voltage reference vector, based on the base voltage vector which prescribes the amplitude and phase of the three-phase output voltage at the AC terminal, an output voltage vector obtained by the UM conversion circuit and the voltage reference vector from the superior voltage control circuit, and outputs the signal as the PWM reference; and a frequency control circuit which synchronizes a value generated based on a base frequency which prescribes the frequency of the three-phase output voltage at the AC terminal and the q-axis component of the output voltage vector obtained by the UM conversion circuit with the rotation angle of a conversion matrix in the UM conversion circuit and the superior voltage control circuit.

In contrast to the first embodiment described above for the disclosed invention, the signal process inside the inferior voltage control circuit for the present embodiment is carried out on the original three phases. The three-phase voltage-fed AC/DC converter according to the third invention of the present application also has internal equivalent impedance so that it can be operated in connection to a power system as a distribution network. Further, the three-phase voltage-fed AC/DC converter according to the third invention of the present application synchronizes the value generated from the component related to the frequency deviation of the three-phase output voltage with the rotation angle of the conversion matrix in the UM conversion circuit by the frequency control circuit. In this way, such rotation angle follows the frequency of the power system. Further, the superior control circuit generates a voltage reference vector so as to make the amplitude and frequency of the inverter close to the reference values that are based on the superior reference vector. In this way, even if the amplitude and frequency of the power system are changed, it is possible to detect each deviation portion of the amplitude and frequency of the three-phase output power of the three-phase voltage-fed AC/DC converter for such amplitude and frequency. Accordingly, the inferior voltage control circuit can compensate such deviation portions by controlling the amplitude and phase of the three-phase voltage-fed AC/DC converter to match both the amplitude and phase of the power system. Consequently, the three-phase voltage-fed AC/DC converter according to the present invention can be operated in connection to a power system as a distribution network, and can carry out an autonomous parallel operation which compensates the power deviation for the power system autonomously. For this reason, it is possible to improve the reliability of the three-phase voltage-fed AC/DC converter according to the present invention, and a distributed arrangement of the three-phase voltage-fed AC/DC converter according to the present invention can be formed. Further, in the case where a plurality of inverters undergoes parallel operation, the operation can be carried out without any limit to the number of inverters.

The superior voltage control circuit is preferably provided with a first subtracter which subtracts the output voltage vector obtained by the UM conversion circuit from the superior reference vector, a superior control amplifier which amplifies the output vector prepared by the first subtracter and then outputs the result as the voltage reference vector so that the three-phase output voltage at the AC terminal is close to the reference value that is based on the superior reference vector, and an Inverse UM transformation circuit which outputs the output vector from the superior control amplifier as the voltage reference vector by carrying out UM inversion from the dq rotational coordinates; the inferior voltage control circuit is preferably provided with a base voltage vector setting unit which sets and outputs the base voltage vector, a first adder which adds the voltage reference vector from the superior voltage control circuit and the base voltage vector from the base voltage vector setting unit and then outputs the result, a second subtracter which subtracts the three-phase output voltage at the AC terminal from the output vector prepared by the first adder, and a voltage controller which converts the output vector from the second subtracter and outputs the result as the PWM reference so that the three-phase output voltage at the AC terminal is close to the combined value of the base voltage vector and the voltage reference vector; and the frequency control circuit is preferably provided with a base frequency setting unit which sets the base frequency, a first time-integrator which carries out time integration of the base frequency from the base frequency setting unit and outputs the result, a loop filter which adds a low-pass filtering element to the q-axis component of the output voltage vector obtained by the UM conversion circuit and outputs the result, a second time-integrator which carries out time integration of the output value from the loop filter and outputs the result, and a second adder which adds the output value from the first time-integrator and the output value from the second time-integrator and then outputs the result as the generated value; wherein the frequency control circuit synchronizes the generated value with the rotation angle of the conversion matrix in the UM conversion circuit and the Inverse UM transformation circuit.

Each structure of the three-phase voltage-fed AC/DC converter according to the present embodiment is defined more concretely as follows. The frequency control circuit adds the low-pass filtering element to the q-axis component which is the component related to the frequency deviation of the three-phase output voltage in the loop filter, and carries out time integration in the second time-integrator. Further, the frequency control circuit carries out time integration of the base frequency outputted from the base frequency setting unit in a first time-integrator. Further, the frequency control circuit synchronizes a value generated by adding the integrated value from the second time-integrator to the integrated value from the first time-integrator with the rotation angle of a conversion matrix in the UM conversion circuit. In this way, such rotation angle follows the frequency of the power system.

Further, the superior voltage control circuit subtracts the output voltage vector of the UM conversion circuit from the superior reference vector in the subtracter. Further, the superior voltage control circuit generates a voltage reference vector by carrying out amplification in the superior control amplifier and inversion from dq rotational coordinates by the Inverse UM transformation circuit so as to make the amplitude and frequency of the inverter close to the reference values that are based on the superior reference vector. In this way, even if the amplitude and frequency of the power system are changed, it is possible to detect each deviation portion of the amplitude and frequency of the three-phase output power of the three-phase voltage-fed AC/DC converter for such amplitude and frequency, and the inferior voltage control circuit can compensate such deviation portions. Namely, the inferior voltage control circuit adds the voltage reference vector from the superior voltage control circuit to the base voltage vector from the base voltage vector setting unit to add a compensation portion of the deviation of the amplitude and frequency of the power system.

Further, the inferior voltage control circuit subtracts the three-phase output voltage from the vector that a compensation portion of the deviation is added to, carries out conversion in a voltage controller so that the difference with the amplitude and phase of the power system is close to the combined value of the base voltage vector and the voltage reference vector, and outputs the result as a PWM reference to the three-phase voltage-fed AC/DC conversion circuit. In this way, the amplitude and phase of the three-phase output voltage of the three-phase voltage-fed AC/DC converter are controlled to match both the amplitude and phase of the power system. Consequently, the three-phase voltage-fed AC/DC converter can be operated in connection to a power system as a distribution network, and can carry out an autonomous parallel operation which compensates the power deviation for the power system autonomously. For this reason, it is possible to improve the reliability of the converter, and a distributed arrangement can be formed. Further, in the case where a plurality of inverters undergoes parallel operation, the operation can be carried out without any limit to the number of inverters.

In the three-phase voltage-fed AC/DC converter according to each of the embodiments described above, the three-phase voltage-fed AC/DC conversion circuit is preferably provided with a three-phase voltage-fed AC/DC conversion unit which has the internal equivalent impedance viewed from the AC terminal, converts power from the DC voltage source to three-phase AC power in accordance with the pulse width of the gate signals, and outputs the three-phase AC power; a current detection circuit which detects the three-phase output current of the three-phase voltage-fed AC/DC conversion unit and then outputs a signal generated in accordance with the size of the three-phase output current; a gate signal generator which generates and outputs the gate signals so that the difference between the PWM reference and the output from the current detection circuit is close to zero; and a three-phase AC filter circuit which removes the high-frequency component originating in the gate signals in the three-phase voltage-fed AC/DC conversion unit from the three-phase output voltage of the three-phase voltage-fed AC/DC conversion unit.

The three-phase AC filter circuit can remove the high-frequency component originating in the gate signals in the three-phase voltage-fed AC/DC conversion unit from the output from the three-phase voltage-fed AC/DC conversion unit. Further, by detecting the current from the three-phase voltage-fed AC/DC conversion unit with the current detection circuit, and by generating gate signals with the gate signal generator so that the difference between the PWM reference and the output from the current detection circuit is close to zero, the current error is controlled within tolerance.

The three-phase voltage-fed AC/DC conversion circuit is also preferably provided with a three-phase voltage-fed AC/DC conversion unit which has the internal equivalent impedance viewed from the AC terminal, converts power from the DC voltage source to three-phase AC power in accordance with the pulse width of the gate signals, and outputs the three-phase AC power; a voltage detection circuit which detects the three-phase output voltage of the three-phase voltage-fed AC/DC conversion unit and then outputs a signal generated in accordance with the size of the three-phase output voltage; a gate signal generator which generates and outputs the gate signals so that the difference between the PWM reference and the output from the current detection circuit is close to zero; and a three-phase AC filter circuit which removes the high-frequency component originating in the gate signals in the three-phase voltage-fed AC/DC conversion unit from the three-phase output voltage of the three-phase voltage-fed AC/DC conversion unit.

In the present invention, the three-phase AC filter circuit can remove the high-frequency component originating in the gate signals in the three-phase voltage-fed AC/DC conversion unit from the output from the three-phase voltage-fed AC/DC conversion unit. Further, by detecting the voltage from the three-phase voltage-fed AC/DC conversion unit with the voltage detection circuit, and by generating a gate signals with the gate signal generator so that the difference between the PWM reference and the output from the voltage detection circuit is close to zero, the output voltage follows the PWM reference.

The three-phase voltage-fed AC/DC converter is preferably further equipped with a current detection circuit which detects the three-phase output current of the AC terminal, and a second UM conversion circuit which converts the detected current signal of the current detection circuit to dq rotational coordinates in which the d-axis component forms the component related to the active power and the q-axis component forms the component related to the reactive power, and outputs the result, wherein the three-phase voltage-fed AC/DC conversion circuit is preferably provided with a three-phase voltage-fed AC/DC conversion unit which has the internal equivalent impedance viewed from the AC terminal, converts power from the DC voltage source to three-phase AC power in accordance with the pulse width of the gate signals, and outputs the three-phase AC power, a current detection circuit which detects the three-phase output current of the three-phase voltage-fed AC/DC conversion unit and then outputs a signal generated in accordance with the size of the three-phase output current, a gate signal generator which generates and outputs the gate signals so that the difference between the PWM reference and the output from the current detection circuit is close to zero, and a three-phase AC filter circuit which removes the high-frequency component originating in the gate signals in the three-phase voltage-fed AC/DC conversion unit from the three-phase output voltage of the three-phase voltage-fed AC/DC conversion unit; and the inferior voltage control circuit is preferably provided with a filter current compensator which outputs a current compensation vector prescribed so that the current loss in the three-phase AC filter circuit is compensated, a PWM current deviation compensator which outputs a current deviation compensation vector prescribed so that the current deviation of the three-phase output current from the three-phase voltage-fed AC/DC conversion circuit is compensated, a feedforward amplifier which amplifies the output current vector from the second UM conversion circuit at a prescribed feedforward gain so that the current for the load of the AC terminal is compensated, and a third adder which adds the current deviation compensation vector from the filter current compensator, the current deviation compensation vector from the PWM current deviation compensator and the output vector from the feedforward amplifier to the output vector from the voltage controller; wherein the frequency control circuit synchronizes the generated value with the rotation angle of the conversion matrix in the second UM conversion circuit.

In the present invention, the current deviation portion in the three-phase voltage-fed AC/DC conversion circuit is set in advance in the PWM current deviation compensator when the PWM reference forms a zero reference, and by adding this to the output vector from the voltage controller, such current deviation is compensated. Further, the current loss portion of the three-phase AC filter circuit in the three-phase voltage-fed AC/DC conversion circuit is set in advance in the current compensator, and by adding this to the output vector from the voltage controller, such loss is compensated. Further, by detecting the three-phase output current of the AC terminal, outputting in advance an output current vector obtained by dq conversion, and adding this to the output vector from the voltage controller, the feedforward amplifier generates a stabilized output voltage even when the output current is changed.

Further, the three-phase voltage-fed AC/DC converter according to the embodiments of the present invention described above is preferably further equipped with a current detection circuit which detects the three-phase output current of the AC terminal, and a second UM conversion circuit which converts the detected current signal of the current detection circuit to dq rotational coordinates in which the d-axis component forms the component related to the active power and the q-axis component forms the component related to the reactive power, and outputs the result, wherein the three-phase voltage-fed AC/DC conversion circuit is preferably provided with a three-phase voltage-fed AC/DC conversion unit which has the internal equivalent impedance viewed from the AC terminal, converts power from the DC voltage source to three-phase AC power in accordance with the pulse width of the gate signals, and outputs the three-phase AC power, a voltage detection circuit which detects the three-phase output voltage of the three-phase voltage-fed AC/DC conversion unit and then outputs a signal generated in accordance with the size of the three-phase output voltage, a gate signal generator which generates and outputs the gate signals so that the difference between the PWM reference and the output from the current detection circuit is close to zero, and a three-phase AC filter circuit which removes the high-frequency component originating in the gate signals in the three-phase voltage-fed AC/DC conversion unit from the three-phase output voltage of the three-phase voltage-fed AC/DC conversion unit; and the inferior voltage control circuit is preferably provided with a filter current compensator which outputs a current compensation vector prescribed so that the current loss in the three-phase AC filter circuit is compensated, a PWM current deviation compensator which outputs a current deviation compensation vector prescribed so that the current deviation of the three-phase output current from the three-phase voltage-fed AC/DC conversion circuit is compensated, a feedforward amplifier which amplifies the output current vector from the second UM conversion circuit at a prescribed feedforward gain so that the current for the load of the AC terminal is compensated, and a third adder which adds the current deviation compensation vector from the filter current compensator, the current deviation compensation vector from the PWM current deviation compensator and the output vector from the feedforward amplifier to the output vector from the voltage controller; wherein the frequency control circuit synchronizes the generated value with the rotation angle of the conversion matrix in the second UM conversion circuit.

In the present invention, the current deviation portion in the three-phase voltage-fed AC/DC conversion circuit is set in advance in the PWM current deviation compensator when the PWM reference forms a zero reference, and by adding this to the output vector from the voltage controller, such current deviation is compensated. Further, the current loss portion of the three-phase AC filter circuit in the three-phase voltage-fed AC/DC conversion circuit is set in advance in the current compensator, and by adding this to the output vector from the voltage controller, such loss is compensated. Further, by detecting the three-phase output current of the AC terminal, outputting in advance an output current vector obtained by dq conversion, and adding this to the output vector from the voltage controller, the feedforward amplifier generates a stabilized output voltage even when the output current is changed.

In order to achieve the second object of the inventions as described above, the three-phase voltage-fed AC/DC converter according to the present invention adds control which performs positive feedback of the AC current of the three-phase voltage-fed AC/DC converter and carries out a power network link operation, and in the case where the AC power system is interrupted and an islanding operation is formed, the frequency and/or the amplitude of the output voltage is changed, and by detecting this change, an islanding operation is judged to have been formed.

Namely, the present invention is a three-phase voltage-fed AC/DC converter equipped with a three-phase voltage-fed AC/DC conversion circuit which has internal equivalent impedance viewed from an AC terminal, converts power from a DC voltage source to three-phase AC power in accordance with the pulse width of gate signals generated based on a PWM reference, and outputs the three-phase AC power to the AC terminal; a superior voltage control circuit which receives the input of the output voltage vector obtained by converting the output from the three-phase voltage-fed AC/DC conversion circuit to dq rotational coordinates in which the component related to the amplitude of the three-phase output voltage forms the d-axis component and the component related to the frequency deviation of the three-phase output voltage forms the q-axis component, and the input of a superior reference vector in dq rotational coordinates in which the amplitude reference value for the amplitude of the output voltage of the AC terminal forms the d-axis component and the reference value for the frequency forms the q-axis component, generates a voltage reference vector based on the inputted output voltage vector and the inputted superior reference vector so that the amplitude and frequency of the three-phase output voltage at the AC terminal are close to the reference values that are based on the superior reference vector, and outputs the voltage reference vector; a positive feedback circuit which carries out positive feedback of each of the dq rotational coordinates axial components of the output voltage vector on at least one of the dq rotational coordinates axial components of the superior reference vector inputted in the superior voltage control circuit; an inferior voltage control circuit which generates a signal so that the amplitude and phase of the three-phase output voltage are close to the combined value of the base voltage vector and the voltage reference vector based on the base voltage vector which prescribes the amplitude and phase of the three-phase output voltage at the AC terminal, a vector based on the output voltage of the three-phase voltage-fed AC/DC conversion circuit and the voltage reference vector from the superior voltage control circuit, and outputs the signal as the PWM reference; and a frequency control circuit which synchronizes a value generated based on a base frequency which prescribes the frequency of the three-phase output voltage at the AC terminal and a value generated based on the q-axis component of the output voltage vector obtained by conversion of the output of the three-phase voltage-fed AC/DC conversion circuit to dq rotational coordinates with the rotation angle of a conversion matrix that converts the output from the three-phase voltage-fed AC/DC conversion circuit to dq rotational coordinates and/or the rotation angle of a conversion matrix in the superior voltage control circuit; a voltage anomaly detection circuit which monitors the output voltage of the three-phase voltage-fed AC/DC conversion circuit and detects a deviation of the monitored voltage from a predetermined range as a voltage anomaly; wherein the voltage anomaly detection circuit monitors the amplitude value of the output, the frequency of the output or the amount of correlation in these.

The three-phase voltage-fed AC/DC converter according to the present invention has internal equivalent impedance so that it can be operated in connection to a power system as a distribution network. Further, the three-phase voltage-fed AC/DC converter according to the present invention uses the frequency control circuit to synchronize the value generated from the component related to the frequency deviation of the three-phase output voltage with the rotation angle of the conversion matrix that converts the component related to the amplitude of the three-phase AC output voltage as a d-axis component and the component related to the frequency deviation as a q-axis component. In this way, such rotation angle follows the frequency of the power system.

Further, even if the voltage amplitude and frequency of the power system are changed by the superior voltage control circuit and the frequency control circuit, it is possible to detect each deviation portion of the voltage amplitude and frequency of the three-phase output of the three-phase voltage-fed AC/DC converter for such amplitude and frequency.

Accordingly, the inferior voltage control circuit can compensate such deviation portions by controlling the amplitude and phase of the three-phase voltage-fed AC/DC converter. Further, the positive feedback circuit carries out positive feedback of each of the dq rotational coordinates axial components of the output voltage vector inputted in the superior voltage control circuit on at least one of the dq rotational coordinates axial components of the superior reference vector inputted in the superior voltage control circuit. In this way, in the case where the power system is interrupted and an islanding operation is formed, the voltage amplitude or frequency of the AC terminal is changed.

Accordingly, the present invention can provide a three-phase voltage-fed AC/DC converter which monitors the voltage amplitude or frequency of the AC terminal, and can interrupt the AC power system and reliably detect that an islanding operation is formed when a prescribed threshold value is exceeded.

Further, instead of the voltage amplitude or frequency of the AC terminal, the three-phase voltage-fed AC/DC converter according to the present invention can obtain the same results by monitoring the amplitude value of the output voltage of the three-phase voltage-fed AC/DC conversion circuit, the frequency of the output voltage or the amount of correlation in these. For example, the three-phase voltage-fed AC/DC converter according to the present invention may monitor the d-axis component or the q-axis component when the three-phase output voltage in the AC terminal undergoes UM conversion to dq rotational coordinates, or the $\alpha$-axis component or the $\beta$-axis component when the three-phase output voltage in the AC terminal undergoes M conversion to $\alpha\beta$ static coordinates formed by an $\alpha$ axis and a $\beta$ axis which are mutually orthogonal, with one voltage of the three-phase output voltage forming a reference.

Further, the monitoring point where the amplitude value of the output voltage of the three-phase voltage-fed AC/DC conversion circuit, the frequency of the output voltage or the amount of correlation in these is monitored does not need to be set at the AC terminal, and may be set at any place in the three-phase voltage-fed AC/DC converter so long as these can be monitored. For example, the output from the positive feedback point where positive feedback of the output voltage vector is carried out on the superior reference vector, the output from the superior voltage control circuit or the output from the inferior voltage control circuit may be monitored.

The three-phase voltage-fed AC/DC converter according to the present invention is further equipped with inverter output blocking means which is provided inside the three-phase voltage-fed AC/DC conversion circuit, and has a gate signal blocking function that blocks the gate signals and/or an interruption function that interrupts the three-phase AC power from the three-phase voltage-fed AC/DC conversion circuit by a switch provided between the three-phase voltage-fed AC/DC conversion circuit and the AC terminal, wherein the inverter output blocking means blocks the output of the three-phase AC power to the AC terminal in the case where the voltage anomaly detection circuit detects a voltage anomaly.

By providing the positive feedback circuit which carries out positive feedback of the output voltage vector on the superior reference vector, in the case where the three-phase voltage-fed AC/DC converter forms an islanding operation, the output voltage of the three-phase voltage-fed AC/DC conversion circuit becomes unstable. The inverter output blocking means halts the three-phase voltage-fed AC/DC conversion circuit and/or interrupts the output from the three-phase voltage-fed AC/DC conversion circuit in the case where an islanding operation is formed.

The three-phase voltage-fed AC/DC converter according to the present invention is further equipped with a switch which interrupts the positive feedback circuit and/or positive feedback circuit halting means which sets the gain of the positive feedback circuit to zero, wherein the positive feedback circuit halting means halts the positive feedback of the voltage output vector to the superior reference vector after the inverter output blocking means blocks the output of the three-phase AC power to the AC terminal.

As described above, in the case where the three-phase voltage-fed AC/DC converter forms an islanding operation, by providing the positive feedback circuit, the output from the three-phase voltage-fed AC/DC conversion circuit will fluctuate independently from the voltage and frequency of the AC power system. The positive feedback circuit halting means halts positive feedback after an islanding operation is formed and the inverter output is blocked.

Accordingly, in addition to the effects described above, when a power network link operation is carried out again after the inverter output was blocked due to the detection of an islanding operation, the present invention makes it possible to avoid mismatching of the voltage and frequency of the three-phase voltage-fed AC/DC converter and the voltage and frequency of the AC power system.

In the present invention, it is possible to provide a three-phase AC/DC converter in which each device is made autonomous so that an autonomous parallel operation can be carried out to control the output deviation even in the case where a plurality of units are connected in parallel and undergo parallel operation.

The present invention makes it possible to provide a three-phase voltage-fed AC/DC converter which can reliably detect that there is an islanding operation in the case where the AC power system is interrupted and an islanding operation has been formed.

In addition to an UPS (Uninterruptible Power Supply) which requires a parallel redundancy operation, the three-phase voltage-fed AC/DC converter of the present invention can be applied to an inverter for photovoltaic power generation, an inverter for fuel cells, an inverter for power storage, an inverter for a distributed power supply such as an inverter for DC link wind power generation or the like, a rectifier, a SVC (Static Var Compensator) and the like.

BRIEF DESCRIPTION OF THE DRAWINGS

FIG. 2 is a schematic block diagram of another three-phase voltage-fed AC/DC converter according to the present invention.

FIG. 12(A) is a graph showing the respective waveforms of the inter-terminal voltage of the AC terminal of FIG. 3 and the system voltage, FIG. 12(B) is a graph showing the waveform of the d-axis component and the q-axis component of the three-phase output voltage at the AC terminal of FIG. 3, and FIG. 12(C) is a graph representing the current flowing through the AC terminal of the three-phase voltage-fed AC/DC converter 11.

DETAILED DESCRIPTION OF THE PREFERRED EMBODIMENTS

Figure 1:
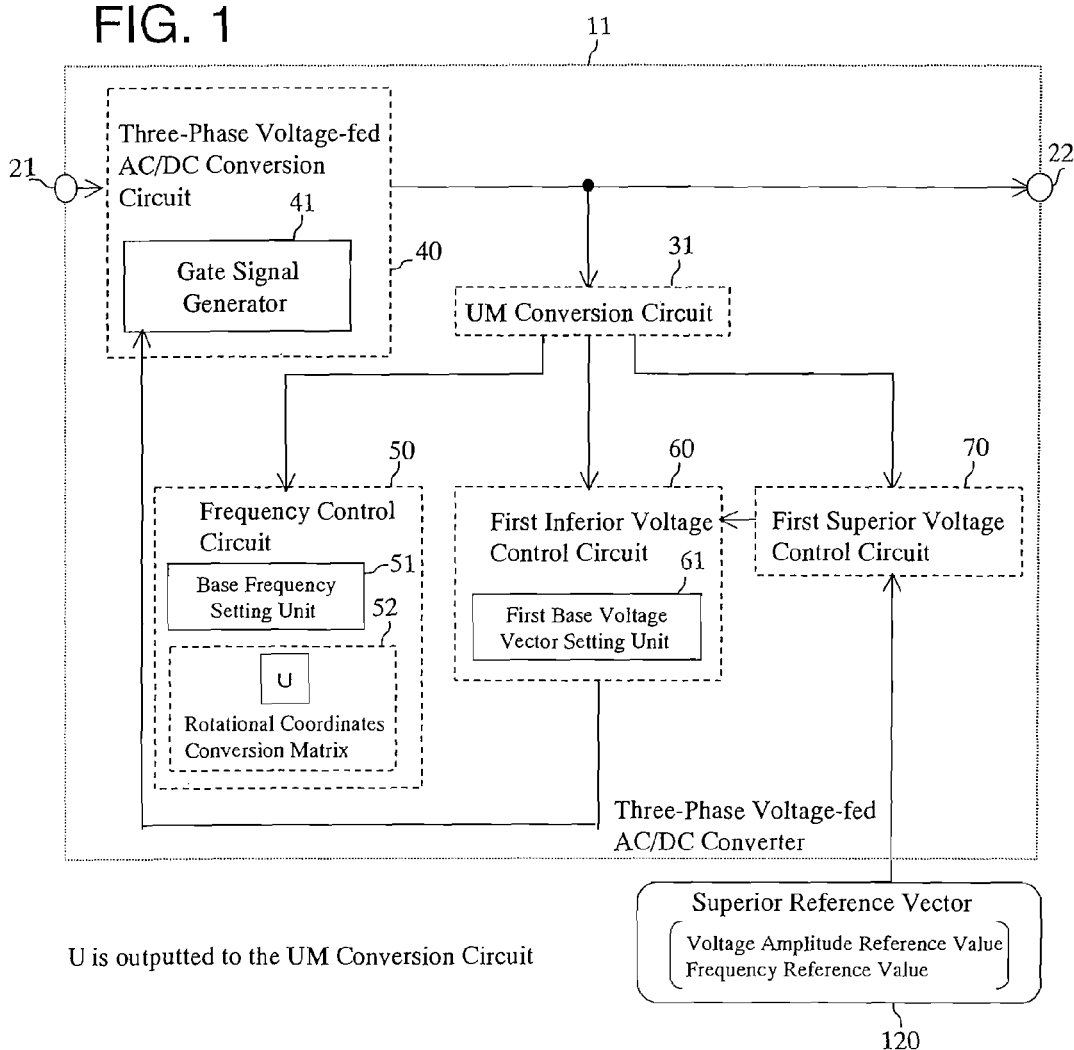
FIG. 1 is a schematic block diagram of a three-phase voltage-fed AC/DC converter according to the principles of the present invention.

The present invention is described in detail below with reference to the drawings. The present invention is not limited to the embodiments described below. Among the figures, the same or similar structural elements are shown by the same or similar reference numerals in the specification and drawings.

FIG. 1 and FIG. 2 show schematic block diagrams of a three-phase voltage-fed AC/DC converter according to the present invention.

A three-phase voltage-fed AC/DC converter 11 shown in FIG. 1 is equipped with a three-phase voltage-fed AC/DC conversion circuit 40 which has internal equivalent impedance viewed from an AC terminal 22, wherein power from a DC voltage source (not shown in the drawings) is received by a DC terminal 21 and converted to three-phase AC power which is then outputted from the AC terminal 22 based on a pulse width modulation (PWM) reference, a UM conversion circuit 31 in which the three-phase output voltage at the AC terminal 22 is converted to dq rotational coordinates which are then outputted, a first superior voltage control circuit 70 which outputs a signal generated based on the superior reference vector 120 and the output voltage vector of the UM conversion circuit 31 as a voltage reference vector, a first inferior voltage control circuit 60 which outputs a signal generated based on a base voltage vector, the output voltage vector obtained by the UM conversion circuit 31 and the voltage reference vector from the first superior voltage control circuit 70 as a PWM reference, and a frequency control circuit 50 which synchronizes a value generated based on a base frequency and the q-axis component of the output voltage vector obtained by the UM conversion circuit 31 with the rotation angle of a rotational coordinates conversion matrix 52 in the UM conversion circuit 31.

The three-phase voltage-fed AC/DC conversion circuit 40 converts the power from the DC voltage source not shown in the drawings to three-phase AC power in accordance with the pulse width of the gate signals generated by the gate signal generator 41 based on the PWM reference. Examples of a DC voltage source include a distribution network which outputs DC voltage independently such as a battery or the like, a distribution network which outputs DC voltage by rectifying power generated by a power generation method such as wind power generation or the like, or a distribution network which outputs DC voltage by controlling the voltage of a DC capacitor. In this case, a blocking inductor may be provided between the AC terminal 22 and the junction of the UM conversion circuit 31, and each three-phase output voltage may be outputted from the AC terminal 22 via the blocking inductor. This makes it possible to prevent the PWM component in the three-phase voltage-fed AC/DC conversion circuit 40 from discharging to the AC terminal 22.

Figure 8:
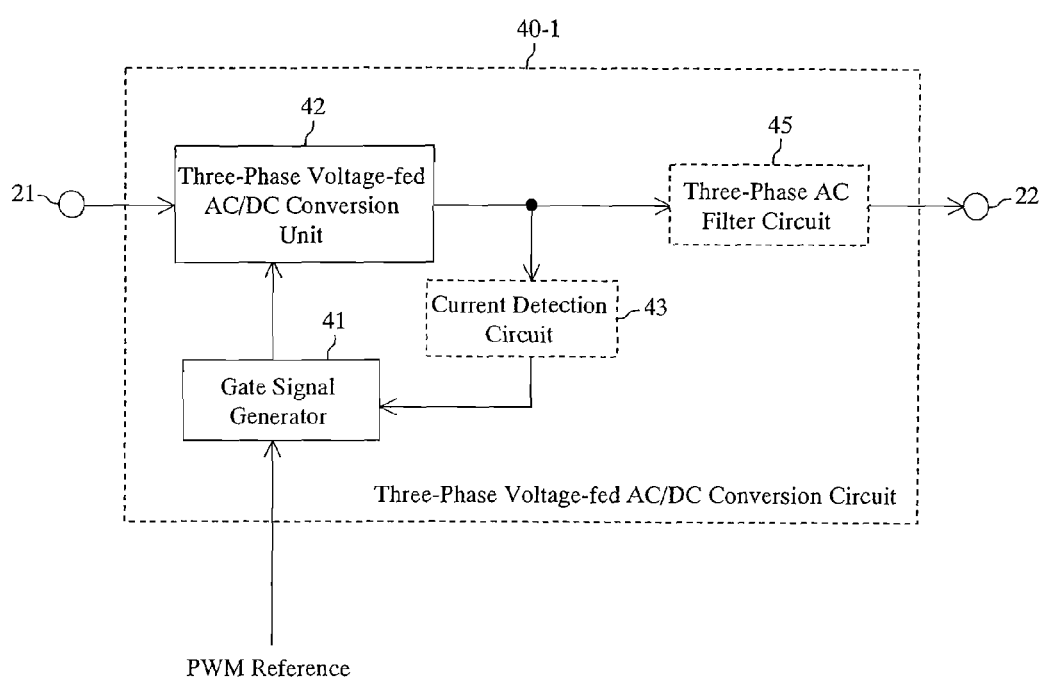
FIG. 8 is a schematic block diagram of a three-phase voltage-fed AC/DC conversion circuit according to the present invention.
Figure 9:
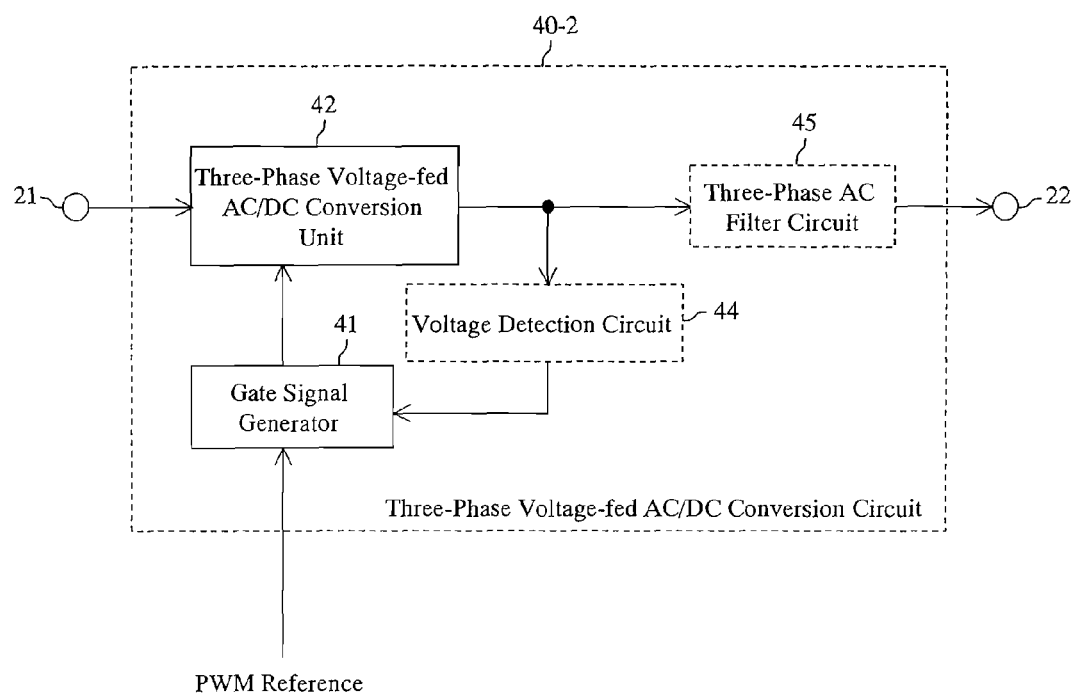
FIG. 9 is a schematic block diagram of another three-phase voltage-fed AC/DC conversion circuit according to the present invention.

FIG. 8 and FIG. 9 show schematic block diagrams of a three-phase voltage-fed AC/DC conversion circuit.

A three-phase voltage-fed AC/DC conversion circuit 40-1 shown in FIG. 8 is equipped with a three-phase voltage-fed AC/DC conversion unit 42 which has internal equivalent impedance viewed from an AC terminal 22, wherein power from a DC voltage source is received by a DC terminal 21 in accordance with the pulse width of the gate signals and converted to three-phase AC power which is then outputted, a current detection circuit 43 which detects the three-phase output current of the three-phase voltage-fed AC/DC conversion unit 42 and then outputs a signal generated in accordance with the size of the three-phase output current, a gate signal generator 41 which generates and outputs gate signals so that the difference between the PWM reference and the output of the current detection circuit 43 is close to zero, and a three-phase AC filter circuit 45 which removes the high-frequency component originating in the gate signals in the three-phase voltage-fed AC/DC conversion unit 42 from the three-phase output voltage at the three-phase voltage-fed AC/DC conversion unit 42 and then outputs the three-phase output voltage.

Further, in place of the current detection circuit 43 of FIG. 8, a three-phase voltage-fed AC/DC conversion circuit 40-2 shown in FIG. 9 is equipped with a voltage detection circuit 44 which detects the three-phase output voltage of the three-phase voltage-fed AC/DC conversion unit 42 and then outputs a signal generated in accordance with the size of the three-phase output voltage. In this case, the gate signal generator 41 generates and outputs gate signals so that the difference between the PWM reference and the output of the voltage detection circuit 44 is close to zero.

The internal equivalent impedance possessed by the three-phase voltage-fed AC/DC conversion unit 42 shown in FIG. 8 and FIG. 9 can be given by a control variable inside the three-phase voltage-fed AC/DC converter 11 of FIG. 1 as described later, or it can be given by a resistor, a reactor or a three-phase transformer at the output of the three-phase voltage-fed AC/DC conversion circuits 40-1, 40-2 of FIG. 8 and FIG. 9, or by connecting a combination of these. For example, a resistor or a reactor may be connected in series to each of the three-phase outputs of the three-phase voltage-fed AC/DC conversion circuits 40-1, 40-2, and in the case where a resistor is connected, a reactor may be connected in series after each resistor. Further, a three-phase transformer may be connected to the three-phase outputs of the three-phase voltage-fed AC/DC conversion circuits 40-1, 40-2. Further, in the case where a reactor is connected to each of the three-phase outputs of the three-phase voltage-fed AC/DC conversion circuits 40-1, 40-2, a three-phase transformer may be connected after the reactors. Further, a resistor may be connected to each of the three-phase outputs of the three-phase voltage-fed AC/DC conversion circuits 40-1, 40-2, and in the case where a reactor is connected in series after each resistor, a three-phase transformer may be connected after such reactors. In this way, because the three-phase voltage-fed AC/DC conversion unit 42 possesses internal equivalent impedance, the three-phase voltage-fed AC/DC converter 11 of FIG. 1 can operate in connection to a power system as a distribution network.

By giving the three-phase voltage-fed AC/DC conversion circuit 40 of FIG. 1 the structure shown in FIG. 8 or FIG. 9, the three-phase voltage-fed AC/DC converter 11 can remove the high-frequency component originating in the gate signals in the three-phase voltage-fed AC/DC conversion unit 42 from the output from the three-phase voltage-fed AC/DC conversion unit 42 by the provision of the three-phase AC filter circuit 45 (FIG. 8 and FIG. 9). Further, by detecting the current or the voltage from the three-phase voltage-fed AC/DC conversion unit 42 in the current detection circuit 43 or the voltage detection circuit 44, and by generating gate signals in the gate signal generator 41 so that the difference between the PWM reference and the output from the current detection circuit 43 or the voltage detection circuit 44 is close to zero, it is possible to control the current error within tolerance or make the output voltage follow the PWM reference.

Figure 10:
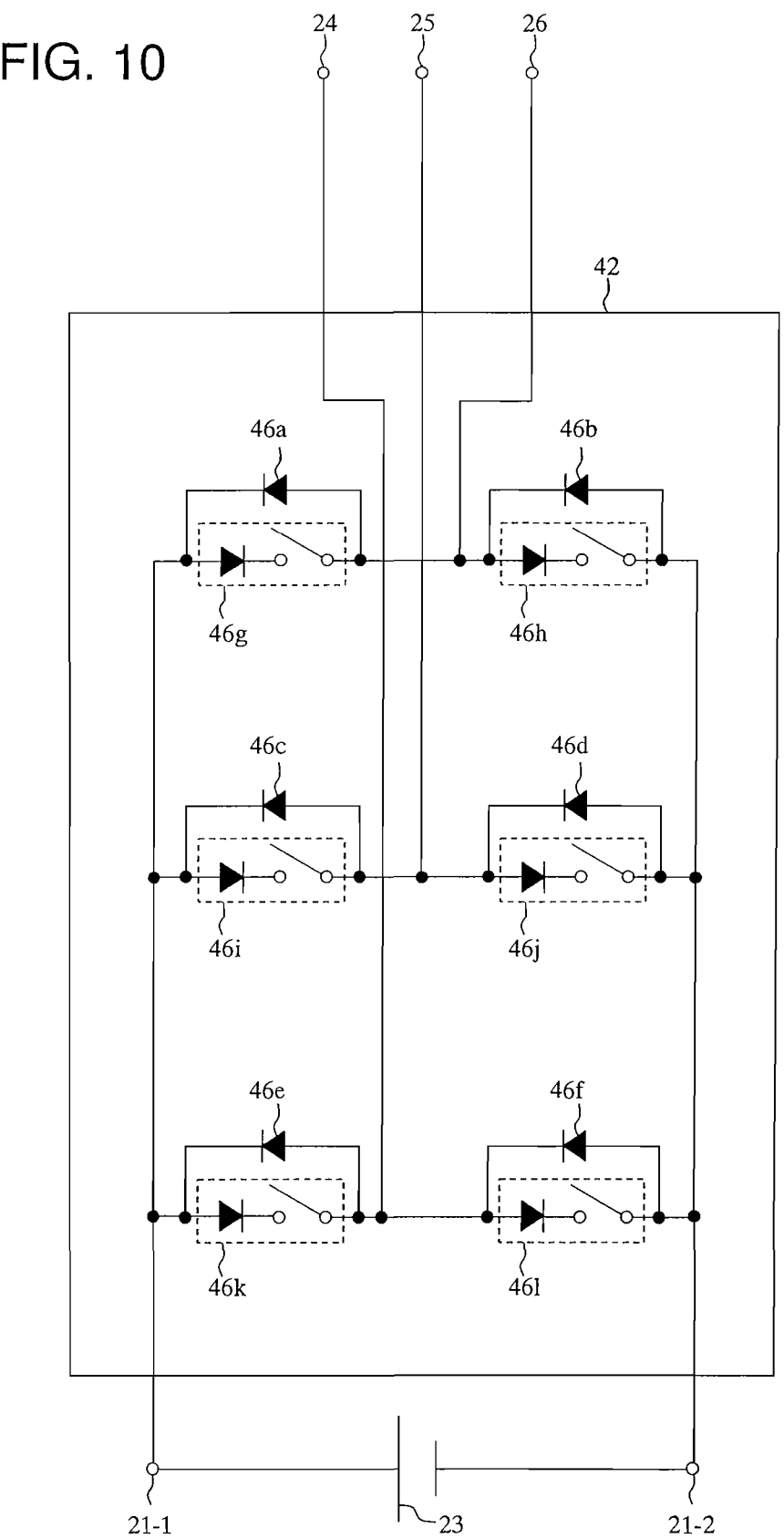
FIG. 10 is a schematic block diagram of a three-phase voltage-fed AC/DC conversion unit according to the present invention.
Figure 11:
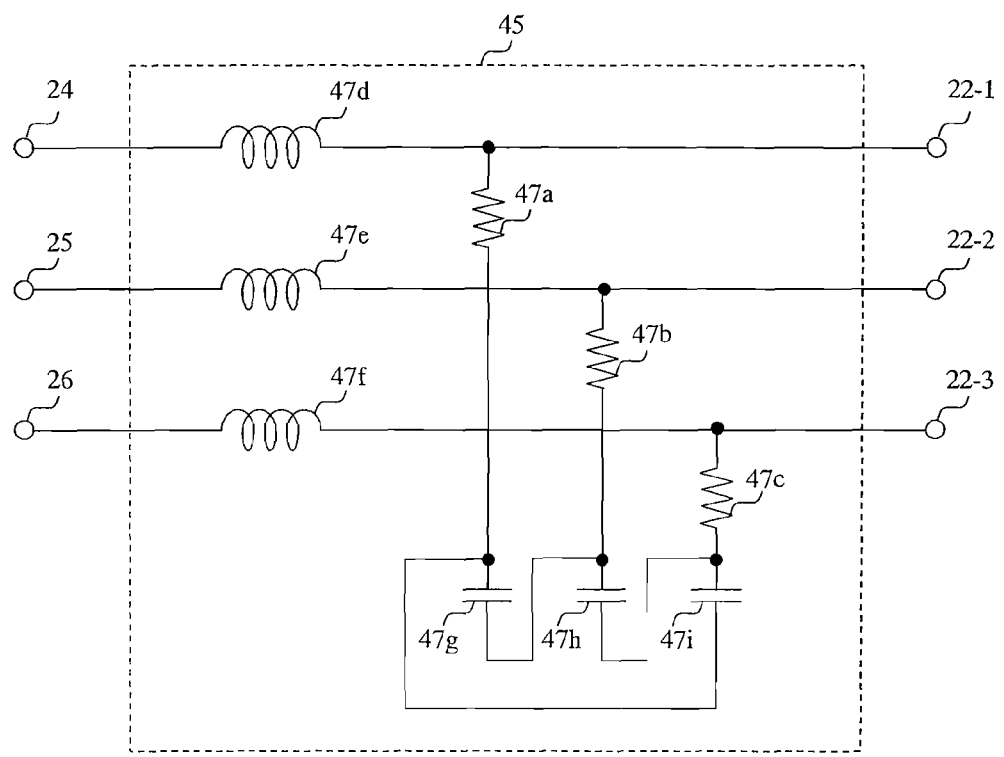
FIG. 11 is a schematic block diagram of another three-phase AC filter circuit according to the present invention.

In this regard, FIG. 10 shows a schematic block diagram of the three-phase voltage-fed AC/DC conversion unit 42 in FIG. 8 and FIG. 9. Further, FIG. 11 shows a schematic block diagram of the three-phase AC filter circuit 45 in FIG. 8 and FIG. 9.

The three-phase voltage-fed AC/DC conversion unit 42 shown in FIG. 10 is equipped with six switched valve devices 46g-46l and six diodes 46a-46f to form a three-phase bridge. The six switched valve devices 46g-46l are elements which switch the on/off of the switch in accordance with on/off input signals, and examples include a GTO (Gate Turn-Off Thyristor) or an IGBT (Insulated Gate Bipolar Transistor). In the three-phase voltage-fed AC/DC conversion unit 42, by switching the on/off of the six switches by pulse signals to each of the six switched valve devices 46g-46l in accordance with the references from the gate signal generator 41 shown in FIG. 8 or FIG. 9, power from a DC voltage source 23 can be converted to three-phase AC power and outputted from three AC terminals 24, 25, 26. The output voltage can be changed by changing the pulse width of the pulse signal. Further, DC terminals 21-1, 21-2 in FIG. 10 correspond to the DC terminal 21 in the block diagram of FIG. 1. In the three-phase AC filter circuit 45 shown in FIG. 11, current control inductors 47d, 47e, 47f which control the current in each phase, resistors 47a, 47b, 47c connected between each phase and capacitors 47g, 47h, 47i are provided between the AC terminals 24, 25, 26 at the input side which receive the three-phase output from the three-phase voltage-fed AC/DC conversion unit 42 of FIG. 8 or FIG. 9 and AC terminals 22-1, 22-2, 22-3 at the output side from which output is carried out. The capacity of each of the current control inductors 47d, 47e, 47f, the resistors 47a, 47b, 47c and the capacitors 47g, 47h, 47i can be suitably determined in accordance with the frequency characteristics of the output signals from the AC terminals 22-1, 22-2, 22-3 at the output side. Further, the resistors 47a, 47b, 47c do not need to be provided. In the three-phase voltage-fed AC/DC conversion circuits 40-1, 40-2 of FIG. 8 and FIG. 9, the three-phase AC filter circuit 45 of FIG. 11 can be applied as the three-phase AC filter circuit 45 to remove the high-frequency component originating in the gate signals in the three-phase voltage-fed AC/DC conversion unit 42. Further, the AC terminals 22-1, 22-2, 22-3 in FIG. 11 correspond to the AC terminal 22 in the block diagram of FIG. 1.

The UM conversion circuit 31 of FIG. 1 converts the three-phase output voltage at the AC terminal 22 to dq rotational coordinates by Equations 1~3 shown below in which the component related to the amplitude of such three-phase output voltage forms the d-axis component and the component related to the frequency deviation forms the q-axis component, and then outputs such coordinates. In Equation 3, the three-phase output voltage inputted in the UM conversion circuit 31 is given by (Va, Vb, Vc), and the output voltage vector (d-axis component, q-axis component) from the UM conversion circuit 31 is given by (Vd, Vq). In FIG. 1, the UM conversion circuit 31 outputs to each of the frequency control circuit 50, the first inferior voltage control circuit 60 and the first superior voltage control circuit 70.

In this regard, the three-phase output voltage at the AC terminal 22 is detected by carrying out the UM conversion operation with Equations 1~3. In this case, the three phases of the three-phase output voltage may be detected, or because the remaining one voltage is determined if any two voltages of the three-phase output voltage are determined, the UM conversion circuit 31 may detect any two voltages of the three-phase output voltage. Further, a low-pass filter may be provided before the UM conversion circuit 31, and the three-phase output voltage to the UM conversion circuit 31 may be detected via the low-pass filter. By removing the PWM component from the three-phase output voltage, it is possible to stabilize the control of the three-phase voltage-fed AC/DC converter 11.

Further, a low-pass filter may be provided after the UM conversion circuit 31, and the output voltage vector obtained by the UM conversion circuit 31 may be outputted via the low-pass filter. By removing the PWM component from the output voltage vector obtained by the UM conversion circuit 31, it is possible to stabilize the control of the three-phase voltage-fed AC/DC converter 11.

$$U \equiv \begin{pmatrix} \sin\theta_{dq} & -\cos\theta_{dq} \\ \cos\theta_{dq} & \sin\theta_{dq} \end{pmatrix} \quad [1]$$

$$M \equiv \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \quad [2]$$

$$\begin{pmatrix} V_d \\ V_q \end{pmatrix} \equiv UM \begin{pmatrix} V_a \\ V_b \\ V_c \end{pmatrix} \quad [3]$$

$$= \sqrt{\frac{2}{3}} \begin{pmatrix} \sin\theta_{dq} & -\cos\theta_{dq} \\ \cos\theta_{dq} & \sin\theta_{dq} \end{pmatrix} \cdot \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} V_a \\ V_b \\ V_c \end{pmatrix}$$

$$= \sqrt{\frac{2}{3}} \begin{pmatrix} \sin\theta_{dq} & \sin\left(\theta_{dq} - \frac{2}{3}\pi\right) & \sin\left(\theta_{dq} + \frac{2}{3}\pi\right) \\ \cos\theta_{dq} & \cos\left(\theta_{dq} - \frac{2}{3}\pi\right) & \cos\left(\theta_{dq} + \frac{2}{3}\pi\right) \end{pmatrix} \begin{pmatrix} V_a \\ V_b \\ V_c \end{pmatrix}$$

The frequency control circuit 50 synchronizes a value generated based on a base frequency which prescribes the frequency of the three-phase output voltage at the AC terminal 22 and the q-axis component of the output voltage vector obtained by the UM conversion circuit 31 with the rotation angle of the rotational coordinates conversion matrix 52 in the UM conversion circuit 31. Namely, as shown in FIG. 2, a low-pass filtering element is added in a loop filter 53 to the q-axis component which is the component related to the frequency deviation of the three-phase output voltage, and output is carried out after time integration is performed in a second time-integrator 55. The low-pass filtering element added in the loop filter 53 can be a lag element such as a first order lag element or the like, for example. In this way, it is possible to stabilize the feedback loop.

Further, a generated value 57 is generated by adding an integrated value from the second time-integrator 55 in a summing unit 56 to an integrated value obtained by carrying out time integration in a first time-integrator 54 on the base frequency outputted from a base frequency setting unit 51, and this generated value 57 is synchronized with the rotation angle of the rotational coordinates conversion matrix 52 in the UM conversion circuit 31. In this way, such rotation angle can be made to follow the frequency of the power system. In this synchronization, the generated value 57 obtained by adding the integrated value from the first time-integrator 54 and the integrated value from the second time-integrator 55 is given by $\theta_{dq}$ of Equation 3.

In this regard, in the UM conversion circuit 31, the component (q-axis component) related to the frequency deviation of the three-phase output voltage is outputted as described above. For this reason, the signal process in the UM conversion circuit 31 is believed to correspond to a phase comparison process which compares the phase of the three-phase output voltage with the phase of the generated value 57 obtained by adding the integrated value from the first time-integrator 54 and the integrated value from the second time-integrator 55. Further, the signal process which depends on adding the integrated value from the first time-integrator 54 and the integrated value from the second time-integrator 55 is believed to correspond to the signal process of a VCO (Voltage Controlled Oscillator) which can vary the value of a generated value in accordance with the output voltage from the loop filter 53. For this reason, the UM conversion circuit 31 and the frequency control circuit 50 are believed to collectively operate as a PLL in which the generated value 57 obtained by adding the integrated value from the first time-integrator 54 and the integrated value from the second time-integrator 55 is synchronized with the frequency of the three-phase output voltage at the AC terminal 22. For this reason, the frequency range in which synchronization is maintained (synchronization holding range (locking range)) and the frequency locking range (capture range) can be determined in the same way as the case of a PLL.

A superior reference vector 120 formed from a voltage amplitude reference value for the amplitude of the three-phase output voltage at the AC terminal 22 and a frequency reference value for the frequency is inputted in the first superior voltage control circuit 70 of FIG. 1. Further, a signal is generated based on the inputted superior reference vector 120 and the output voltage vector obtained by the UM conversion circuit 31 so that the amplitude and frequency of the three-phase output voltage at the AC terminal 22 are close to the reference values that are based on the superior reference vector 120, and this signal is outputted as a voltage reference vector. Namely, as shown in FIG. 2, the output vector obtained from the UM conversion circuit 31 and the superior reference vector 120 are subtracted in a subtracter 71, and the result is amplified by a first superior control amplifier 72 to generate and output a voltage reference vector so as to make the amplitude and frequency of the inverter close to the reference values that are based on the superior reference vector 120. In this way, even if the amplitude and frequency of the power system are changed, it is possible to detect each deviation portion of the amplitude and frequency of the three-phase output power of the three-phase voltage-fed AC/DC converter 11 for such amplitude and frequency. In this regard, in the first superior control amplifier 72, a low-pass filtering element may be added to the output vector from the subtracter 71. In this way, it is possible to stabilize the feedback loop. Further, a limiter may be provided after the first superior control amplifier 72, and the output vector from the first superior control amplifier 72 may be outputted via the limiter. This makes it possible to prevent over-output and stabilize control.

In the first inferior voltage control circuit 60 of FIG. 1, a signal is generated so that the amplitude and phase of the three-phase output voltage are close to the combined value of the base voltage vector and the voltage reference vector based on a base voltage vector which prescribes the amplitude and phase of the three-phase output voltage at the AC terminal 22, the output voltage vector obtained by the UM conversion circuit 31 and the voltage reference vector from the first superior voltage control circuit 70, and then this signal is outputted as a PWM reference. Further, the base voltage vector is set in advance by a first base voltage vector setting unit 61. This base voltage vector forms the reference of the amplitude and phase of the three-phase output voltage at the AC terminal 22 in two phases.

Namely, as shown in FIG. 2, the voltage reference vector from the first superior voltage control circuit 70 is added in an adder 62 to the base voltage vector set in advance in the first base voltage vector setting unit 61 to add a compensation portion of the deviation of the amplitude and phase of the power system. Further, the output voltage vector obtained by the UM conversion circuit 31 is subtracted in the subtracter 63, and the result is converted and outputted so that the difference with the amplitude and phase of the power system is close to the combined value of the base voltage vector and the voltage reference vector in a first voltage controller 64. Further, the output vector in dq space from the first voltage controller 64 is converted to αβ space in a first Inverse U transformation unit 65 and outputted as a PWM reference to the three-phase voltage-fed AC/DC conversion circuit 40. In this way, the deviation portion detected by the first superior voltage control circuit 70 can be compensated, and the amplitude and phase of the three-phase output voltage of the three-phase voltage-fed AC/DC converter 11 can be controlled so that the amplitude and phase of the three-phase output voltage of the three-phase voltage-fed AC/DC converter 11 match both the amplitude and phase of the power system.

The first voltage controller 64 can be an amplifier, for example. In this regard, a low-pass filter may be provided between the subtracter 63 and the first voltage controller 64, and the output vector from the subtracter 63 may be outputted via the low-pass filter. By removing the PWM component, the control in the first voltage controller 64 can be stabilized. Further, a voltage limiter may be provided between the subtracter 63 and the first voltage controller 64 (or in the case where a low-pass filter is provided in this position, between the low-pass filter and the first voltage controller 64), and the output vector from the subtracter 63 may be outputted via the voltage limiter. This makes it possible to suppress excessive fluctuation of the output voltage when the three-phase voltage-fed AC/DC converter 11 is operated. Further, a current limiter may be provided between the first voltage controller 64 and the first Inverse U transformation unit 65 (or in the case where a filter current compensator, a PWM current deviation compensator and a feedforward amplifier described below are provided, between an adder which adds the outputs of these and the first Inverse U transformation unit 65), and the output vector from the first voltage controller 64 may be outputted via the current limiter. This makes it possible to prevent over-current from flowing to the switching device of the three-phase voltage-fed AC/DC converter 11 at both the stationary time and the transition time.

Figure 3:
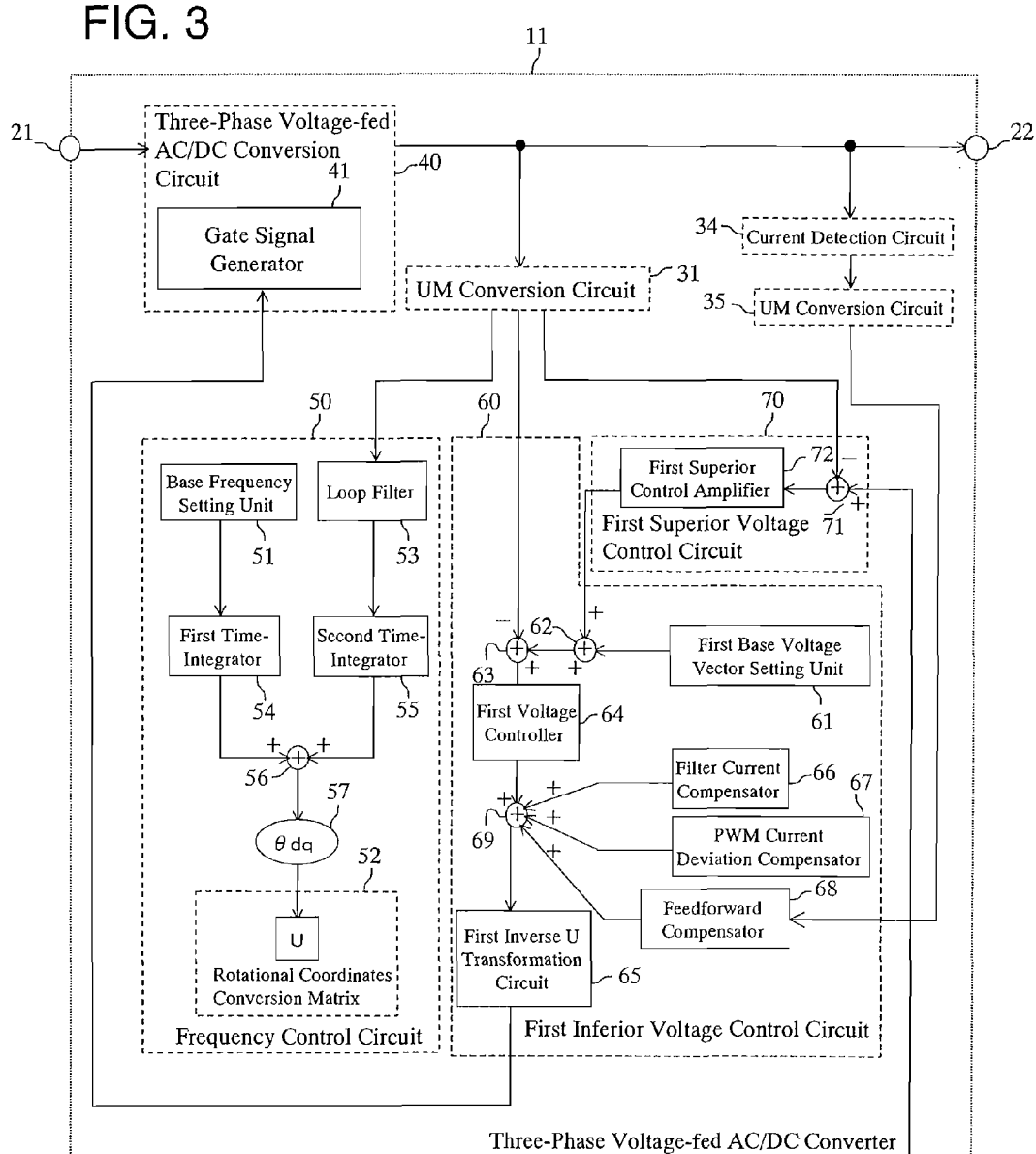
FIG. 3 is a schematic block diagram of another three-phase voltage-fed AC/DC converter according to the present invention.

FIG. 3 shows a schematic block diagram of another three-phase voltage-fed AC/DC converter according to the present invention.

The three-phase voltage-fed AC/DC converter 11 of FIG. 3 further equips the three-phase voltage-fed AC/DC converter 11 shown in FIG. 2 with a current detection circuit 34 which detects the three-phase output current of the AC terminal 22, and a UM conversion circuit 35 in which the detected current signal of the current detection circuit 34 is converted to dq rotational coordinates and outputted, wherein the output vector from the first voltage controller 64 and the output vectors from a filter current compensator 66, a PWM current deviation compensator 67 and a feedforward amplifier 68 are added in an adder 69.

In this case, either one of the three-phase voltage-fed AC/DC conversion circuits 40-1, 40-2 described in FIG. 8 or FIG. 9 can be applied to the three-phase voltage-fed AC/DC conversion circuit 40. For this reason, either the three-phase voltage-fed AC/DC conversion circuit 40-1 or 40-2 of FIG. 8 or FIG. 9 will be applied in FIG. 3. Further, the dq conversion in the UM conversion circuit 35 is the same as the coordinates conversion described in Equations 1~3. Namely, the UM conversion circuit 35 outputs the detected current signal of the current detection circuit 34 as a d-axis component forming the component related to the active power and a q-axis component forming the component related to the reactive power of such detected current signal.

The filter current compensator 66 of FIG. 3 outputs a current compensation vector which is prescribed so that the current loss in a three-phase AC filter circuit 45 inside the three-phase voltage-fed AC/DC conversion circuit 40 (FIG. 8 or FIG. 9) is compensated. In this way, in the three-phase voltage-fed AC/DC converter 11, the current loss portion in the three-phase AC filter circuit 45 of FIG. 8 or FIG. 9 is set in advance in the filter current compensator 66, and by adding this to the output vector from the first voltage controller 64, it is possible to compensate such loss. Further, the PWM current deviation compensator 67 outputs a current deviation compensation vector which is prescribed so that the current deviation of the three-phase output current from the three-phase voltage-fed AC/DC conversion circuit 40 is compensated. In this way, in the three-phase voltage-fed AC/DC converter 11, the current deviation portion in the three-phase voltage-fed AC/DC conversion circuit 40 when the PWM reference is a zero reference is set in advance in the PWM current deviation compensator 67, and by adding this to the output vector from the first voltage controller 64, it is possible to compensate such loss.

Further, in the feedforward amplifier 68, the output current vector from the UM conversion circuit 35 is amplified at a prescribed feedforward gain and outputted so that the current flowing to the AC terminal 22 is compensated. In this way, in the three-phase voltage-fed AC/DC converter 11, by detecting the three-phase output current of the AC terminal 22 in the current detection circuit 34 and carrying out dq conversion, the active and reactive components of the three-phase output current can be detected, and by passing these values through the feedforward amplifier 68 and adding them to the output vector from the first voltage controller 64, it is possible to generate a stabilized output voltage even when the load current changes.

In this regard, a description will be given for the voltage control characteristics in the case where the three-phase voltage-fed AC/DC conversion circuit of FIG. 8 is applied to the three-phase voltage-fed AC/DC converter shown in FIG. 3.

The gain as the current amplification in the three-phase voltage-fed AC/DC conversion unit 42 of FIG. 8 is given by $G_{PWM}$, and the current deviation of the three-phase output current from the three-phase voltage-fed AC/DC conversion unit 42 for the zero reference vector is given by $—G_{PWM} M_1$ [D] (Here the symbols [ ] indicate a vector in the present specification. This is the same below). In this regard, $M_1$ is represented below by Equation 4 in the conversion matrix from αβ space to three-phase components.

$$M_1 \equiv \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \quad [4]$$

$—G_{PWM} M_1$ [D] is an inherent value created by feeding back the outputted signal in the gate signal generator 41 in accordance with the size of the current detected by the current detection circuit 43. Further, the three-phase current flowing through the three-phase AC filter circuit 45 is given by [$i_p$]. In this case, the current compensation portion in the PWM current deviation compensator 67 of FIG. 3 is given by U [D]. Further, the first voltage controller 64 is made an amplifier in FIG. 3, and the feedback gain of such amplifier is given by α, and the feedforward gain in the feedforward amplifier 68 is given by β. Further, the superior reference vector 120 is given by [$V_{mu}$], and the gain of the first superior control amplifier 72 is given by κ. The three-phase output current of the AC terminal 22 is given by [$i_s$], and the three-phase output voltage is given by [V]. Further, the base voltage vector in the first base voltage vector setting unit 61 is given by [$V_c$]. Further, the current loss portion in the three-phase AC filter circuit 45 of FIG. 8 is made zero, and the impedance of the three-phase AC filter circuit 45 is given by $Z_F$. Under the requirements described above, the PWM reference [j] from the first inferior voltage control circuit 60 is derived as shown below.

$$\vec{j} = U^{-1}\left(\alpha\left(\kappa\left(\vec{V}_{mu} - UM\vec{V}\right) + \vec{V}_c - UM\vec{V}\right) + \beta UM\vec{i}_s + U\vec{D}\right) \quad [5]$$

$$\vec{i}_p = G_{PWM}M_1\left(\vec{j} - \vec{D}\right)$$

$$\vec{i}_p = \vec{i}_s + \frac{\vec{V}}{Z_F}$$

Further, the relationship corresponding to the description in the present specification is given by:

$$\vec{j} = [j]$$

$$\vec{V}_{mu} = [V_{mu}], \vec{V} = [V], V_c = [V_c]$$

$$\vec{i}_s = [i_s], \vec{i}_p = [i_p]$$

$$\vec{D} = [D]$$

The following equation related to the three-phase output voltage V can be derived from Equation 5 shown above.

$$\vec{V} = \frac{\alpha G_{PWM} M_1 U^{-1}\left(\kappa\vec{V}_{mu} + \vec{V}_c\right)}{\alpha(\kappa+1)G_{PWM} + \frac{1}{Z_F}} - \frac{1 - \beta G_{PWM}}{\alpha(\kappa+1)G_{PWM} + \frac{1}{Z_F}}\vec{i}_s \quad [6]$$

From Equation 6 shown above, the internal equivalent impedance of the three-phase voltage-fed AC/DC conversion circuit 40-1 shown in FIG. 8 can be represented by Equation 7 shown below. Namely, the internal equivalent impedance in the three-phase voltage-fed AC/DC conversion unit 42 of the three-phase voltage-fed AC/DC conversion circuit 40-1 can be given by the control parameters α, β and κ inside the three-phase voltage-fed AC/DC converter 11 of FIG. 3

$$\frac{1 - \beta G_{PWM}}{\alpha(\kappa+1)G_{PWM} + \frac{1}{Z_F}} \quad [\Omega] \quad [7]$$

As described above, from the fact that the three-phase voltage-fed AC/DC converter 11 of FIG. 1~FIG. 3 has internal equivalent impedance, it can be operated in connection to a power system as a distribution network, and because the three-phase voltage-fed AC/DC converter 11 is equipped with the frequency control circuit 50, the first superior voltage control circuit 70 and the first inferior voltage control circuit 60, it can carry out an autonomous parallel operation which compensates the power deviation for the power system autonomously. For this reason, it is possible to improve the reliability of the device and form a distributed arrangement. Further, in the case where a plurality of inverters undergoes parallel operation, the operation can be carried out without any limit to the number of inverters.

In this regard, a description will be given for an example operation in the case where the three-phase voltage-fed AC/DC converter 11 (base voltage: 200 V, base frequency: 50 Hz) shown in FIG. 3 has a connection with a distribution network having a voltage amplitude of 200 V and a frequency of 52 Hz.

Each circuit constant related to Equations 5~7 described above as a circuit condition of FIG. 3 is prescribed by Table 1 shown below. In Table 1, a first order lag element is added to the first superior control amplifier 72, and the time constants thereof are recorded as $T_{vd}$ for the d-axis component and $T_{vq}$ for the q-axis component. The amplitude factor of the first superior control amplifier 72 is recorded as $K_{vd}$ for the d-axis component and $K_{vq}$ for the q-axis component. Further, a first order lag element is added as a low-pass filtering element in the loop filter 53 of the frequency control circuit 50, and the time constant thereof is recorded as $T_a$.

TABLE 1

| | |
|---|---|
| (Kvd, Kvq) | (4, 1) |
| (Tvd, Tvq) | (1 ms, 1 ms) |
| Ta | 1 ms |
| α | 0.2 S |
| β | 0.202 |
| Internal Equivalent Impedance | 4 Ω |

Under the circuit conditions of Table 1 shown above, first, the three-phase voltage-fed AC/DC converter 11 is driven under no load with the (voltage amplitude reference value, frequency reference value) of the voltage reference vector from the first superior voltage control circuit 70 to the first inferior voltage control circuit 60 of FIG. 3 set as (200 V, 0 V). Then after 0.06 seconds, a power network link is made with a distribution network having a voltage amplitude of 200 V and a frequency of 52 Hz. At this time, the impedance voltage is made to lag more than a 30 degree system.

Figure 12:
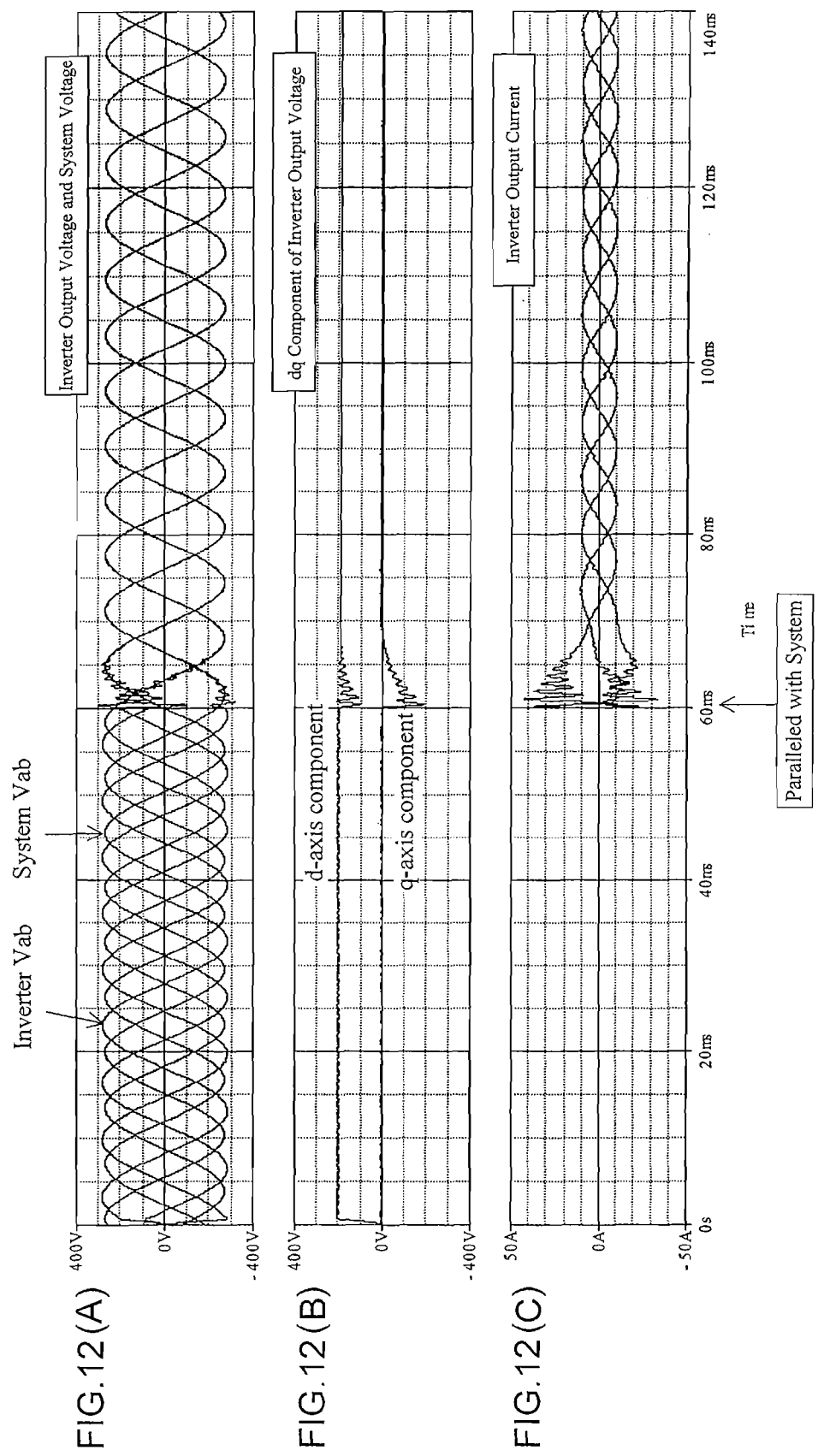
FIG. 12(A)-12(C) are graphs showing time waveforms that include the output voltage in the case where the three-phase voltage-fed AC/DC converter of FIG. 3 forms a connection with a distribution network having a voltage amplitude of 200 V and a frequency of 52 Hz. In particular.
Figure 13:
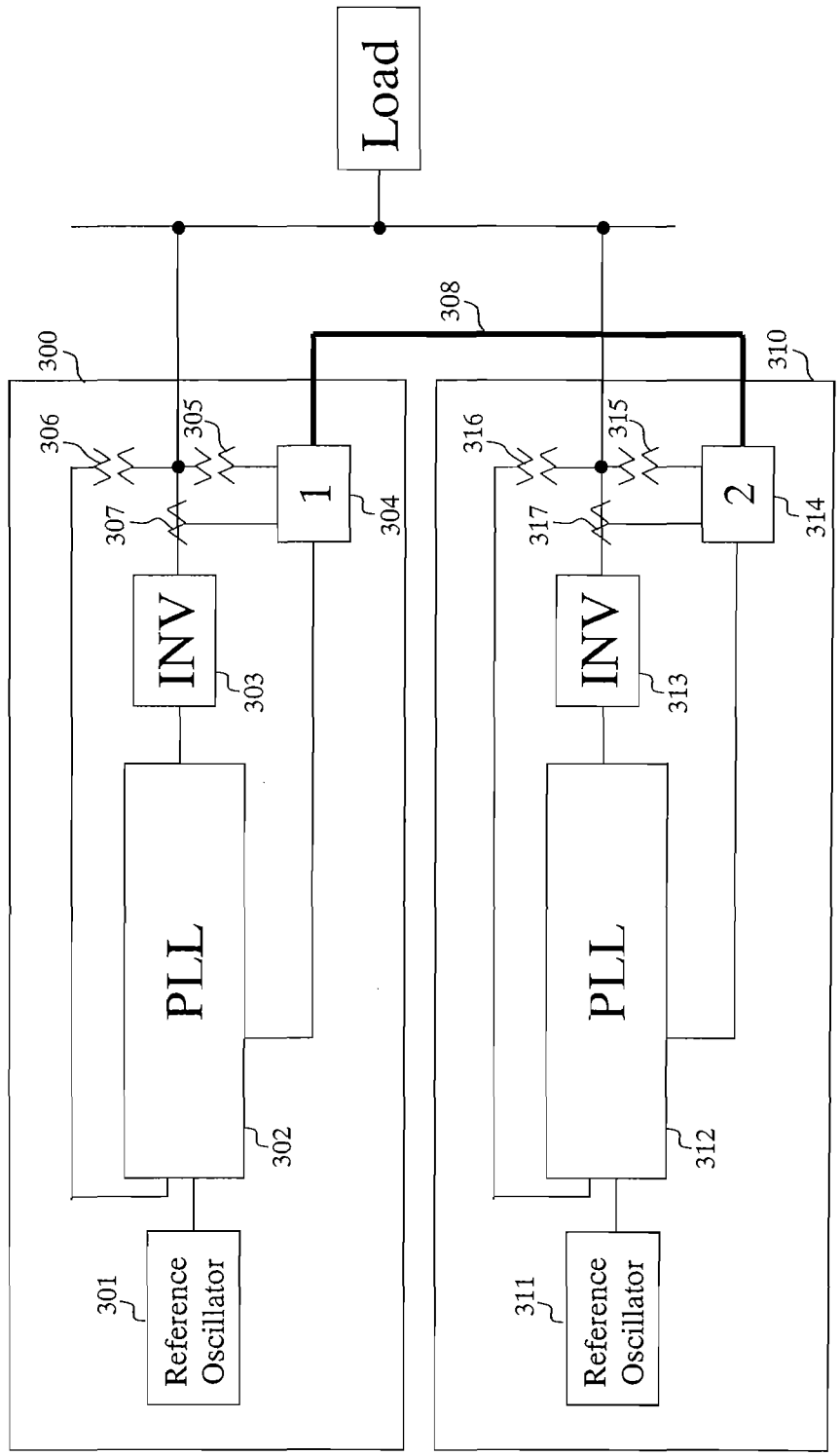
FIG. 13 is a schematic block diagram of a prior art power supply.

FIGS. 12(A) to 12(C) are graphs showing the time waveform included in the output voltage in the case where the three-phase voltage-fed AC/DC converter 11 shown in FIG. 3 makes a connection with a distribution network having a voltage amplitude of 200 V and a frequency of 52 Hz. FIG. 12(A) is a graph showing the respective waveforms of the inter-terminal voltage of the AC terminal 22 of FIG. 3 and the system voltage, and FIG. 12(B) is a graph showing the waveform of the d-axis component and the q-axis component of the three-phase output voltage at the AC terminal 22 of FIG. 3. FIG. 12(C) is a graph representing the current flowing through the AC terminal 22 of the three-phase voltage-fed AC/DC converter 11. Further, the time axes are matching in FIGS. 12(A), 12(B) and 12(C).

It is understood from the waveform of FIG. 12(A) that after a power network link is made at 0.06 seconds, the item that underwent dq conversion at 50 Hz up to 0.06 seconds undergoes signal conversion to 200 V DC, wherein the dq coordinates rotate at an angular speed of 52 Hz. Further, it is understood from the waveform of FIG. 12(B) that the power deviation created at the point in time when the power network link is made at 0.06 seconds is automatically corrected in approximately 15 milliseconds, and then a power network link operation is begun.

Figure 4:
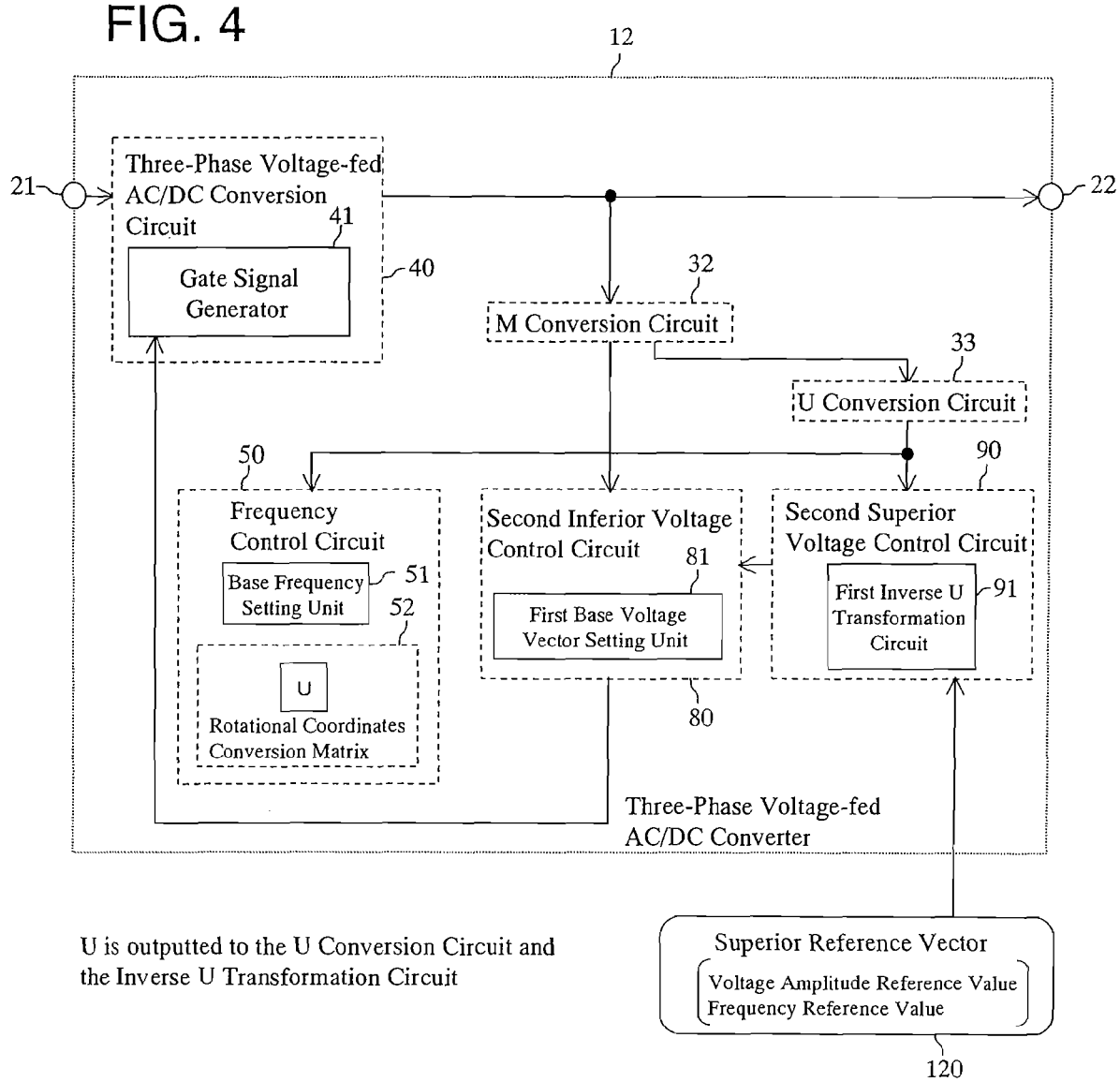
FIG. 4 is a schematic block diagram of another three-phase voltage-fed AC/DC converter according to the present invention.
Figure 5:
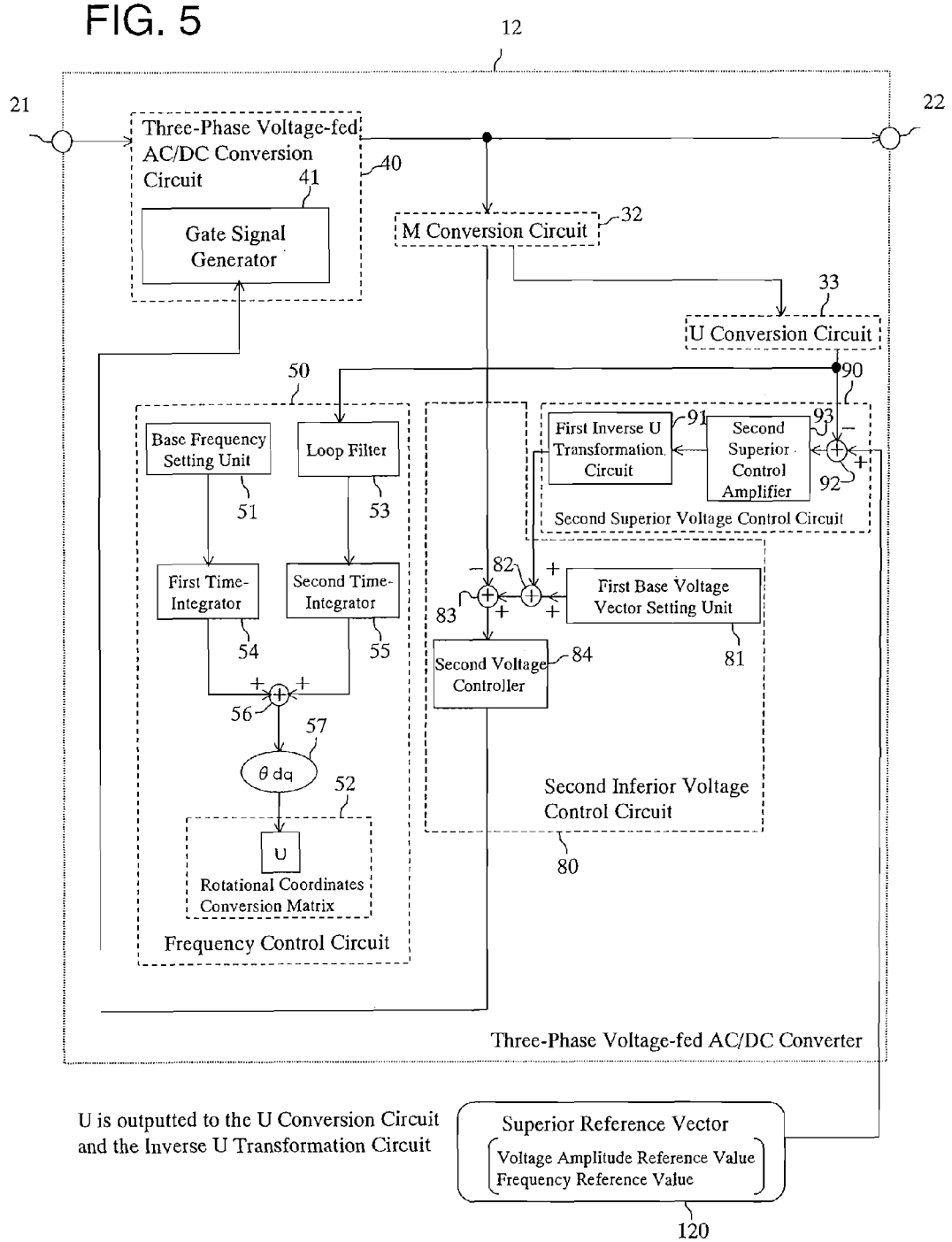
FIG. 5 is a schematic block diagram of another three-phase voltage-fed AC/DC converter according to the present invention.

FIG. 4 and FIG. 5 show schematic block diagrams of another three-phase voltage-fed AC/DC converter according to the present invention.

A three-phase voltage-fed AC/DC converter 12 shown in FIG. 4 is equipped with a three-phase voltage-fed AC/DC conversion circuit 40 which has internal equivalent impedance viewed from an AC terminal 22, wherein power from a DC voltage source (not shown in the drawings) is converted to three-phase AC power which is then outputted from the AC terminal 22 based on a PWM reference, an M conversion circuit 32 which converts the three-phase output voltage at the AC terminal 22 to $\alpha\beta$ static coordinates, a U conversion circuit 33 in which the output voltage vector obtained by the M conversion circuit 32 is converted to dq rotational coordinates which are then outputted, a second superior voltage control circuit 90 which outputs a signal generated based on a superior reference vector 120 and the output voltage vector obtained by the U conversion circuit 33 as a voltage reference vector, a second inferior voltage control circuit 80 which outputs a signal generated based on a base voltage vector, the output voltage vector obtained by the M conversion circuit 32 and the voltage reference vector from the second superior voltage control circuit 90 as a PWM reference, and a frequency control circuit 50 which synchronizes a value generated based on a base frequency and the q-axis component of the output voltage vector obtained by the U conversion circuit 33 with the rotation angle of a rotational coordinates conversion matrix 52 in the U conversion circuit 33. In comparison with the three-phase voltage-fed AC/DC converter 11 described in the first embodiment, the difference in the three-phase voltage-fed AC/DC converter 12 according to the present embodiment lies in the point that the signal process inside the second inferior voltage control circuit 80 is carried out in $\alpha\beta$ static coordinates. Further, because the same structural elements as those in FIG. 1 and FIG. 2 are shown by the same symbols in FIG. 4 and FIG. 5, a description is omitted.

The M conversion circuit 32 converts one voltage of the three-phase output voltage at the AC terminal 22 as a reference to $\alpha\beta$ static coordinates formed by an $\alpha$ axis and a $\beta$ axis which are mutually orthogonal. The conversion matrix can be represented by Equation 2 shown above. Further, the U conversion circuit 33 converts the output voltage vector of the M conversion circuit 32 to dq rotational coordinates in which the component related to the amplitude of the three-phase output voltage forms the d-axis component and the component related to the frequency deviation forms the q-axis component, and then outputs such coordinates. The conversion matrix can be represented by Equation 1 shown above. For this reason, because the output from the U conversion circuit 33 is carried out via the M conversion circuit 32, a vector having the same qualities as the output from the UM conversion circuit 31 of FIG. 1 is outputted. Further, a low-pass filter may be provided before the M conversion circuit 32, and the three-phase output voltage may be inputted to the M conversion circuit 32 via the low-pass filter.

By removing the PWM component from the three-phase output voltage, it is possible to stabilize the control of the three-phase voltage-fed AC/DC converter 12. A low-pass filter may be provided after the U conversion circuit 33, and the output voltage vector obtained by the U conversion circuit 33 may be outputted via the low-pass filter. By removing the PWM component from the output voltage vector obtained by the U conversion circuit 33, it is possible to stabilize the control of the three-phase voltage-fed AC/DC converter 12.

Further, a blocking inductor may be provided between the AC terminal 22 and the junction of the M conversion circuit 32, and the three-phase output voltage may be outputted from the AC terminal 22 via the blocking inductor. This makes it possible to prevent the PWM component generated by the three-phase voltage-fed AC/DC conversion circuit 40 from discharging to the AC terminal 22.

A superior reference vector 120 formed from a voltage amplitude reference value for the amplitude of the three-phase output voltage at the AC terminal 22 and a frequency reference value for the frequency is inputted in the second superior voltage control circuit 90 of FIG. 4. Further, a signal is generated based on the inputted superior reference vector 120 and the output voltage vector obtained by the U conversion circuit 33 so that the amplitude and frequency of the three-phase output voltage at the AC terminal 22 are close to the reference values that are based on the superior reference vector 120, and this signal is outputted as a voltage reference vector.

Namely, as shown in FIG. 5, the output vector obtained from the U conversion circuit 33 and the superior reference vector 120 are subtracted in a subtracter 92, and the result is amplified by a second superior control amplifier 93 and converted to $\alpha\beta$ static coordinates in a first Inverse U transformation unit 91 to generate a voltage reference vector so as to make the amplitude and frequency of the inverter close to the reference values that are based on the superior reference vector 120. In this way, even if the amplitude and frequency of the power system are changed, it is possible to detect each deviation portion of the amplitude and frequency of the three-phase output power of the three-phase voltage-fed AC/DC converter 12 for such amplitude and frequency. In this regard, in the second superior control amplifier 93, a low-pass filtering element may be added to the output vector from the subtracter 92. This makes it possible to stabilize the feedback loop. Further, a limiter may be provided after the second superior control amplifier 93 and the first Inverse U transformation unit 91, and the output vector from the second superior control amplifier 93 may be outputted via the limiter. This makes it possible to prevent over-output and stabilize control.

In the second inferior voltage control circuit 80 of FIG. 4, a signal is generated so that the amplitude and phase of the three-phase output voltage are close to the combined value of the base voltage vector and the voltage reference vector based on a base voltage vector which prescribes the amplitude and phase of the three-phase output voltage at the AC terminal 22, the output voltage vector obtained by the M conversion circuit 32 and the voltage reference vector from the second superior voltage control circuit 90, and then this signal is outputted as a PWM reference.

Namely, as shown in FIG. 5, the voltage reference vector from the second superior voltage control circuit 90 is added in an adder 82 to the base voltage vector set in advance in a first base voltage vector setting unit 81 to add a compensation portion of the deviation of the amplitude and frequency of the power system. Further, the output voltage vector obtained by the M conversion circuit 32 is subtracted in a subtracter 83, and the result is converted and outputted to the three-phase voltage-fed AC/DC conversion circuit 40 as a PWM reference so that the difference with the amplitude and phase of the power system is close to the combined value of the base voltage vector and the voltage reference vector in a second voltage controller 84. In this way, the deviation portion detected by the second superior voltage control circuit 90 can be compensated, and the amplitude and phase of the three-phase output voltage of the three-phase voltage-fed AC/DC converter 12 can be controlled so that the amplitude and phase of the three-phase output voltage of the three-phase voltage-fed AC/DC converter 12 match both the amplitude and phase of the power system.

The second voltage controller 84 can be an amplifier, for example. In this regard, a low-pass filter may be provided between the subtracter 83 and the second voltage controller 84, and the output vector from the subtracter 83 may be outputted via the low-pass filter. By removing the PWM component, the control in the second voltage controller 84 can be stabilized. Further, a voltage limiter may be provided between the subtracter 83 and the second voltage controller 84 (or in the case where a low-pass filter is provided in this position, between the low-pass filter and the second voltage controller 84), and the output vector from the subtracter 83 may be outputted via the voltage limiter. This makes it possible to suppress excessive fluctuation of the output voltage when the three-phase voltage-fed AC/DC converter 12 is operated. Further, a current limiter may be provided after the second voltage controller 84 (or in the case described below where the filter current compensator 66, the PWM current deviation compensator 67 and the feedforward amplifier 68 of FIG. 3 described above are provided, after an adder which adds the outputs of these), and the output vector from the second voltage controller 84 may be outputted via the current limiter. This makes it possible to prevent over-current from flowing to the switching device of the three-phase voltage-fed AC/DC converter 12 at both the stationary time and the transition time.

The three-phase voltage-fed AC/DC converter 12 of FIG. 5 may be further equipped with the feedforward amplifier 68 of FIG. 3, as well as the current detection circuit 34 and the M conversion circuit 32 required for this, the filter current compensator 66 and the PWM current deviation compensator 67 described in FIG. 3, and the outputs from these circuits can be added to the output vector from the second voltage controller 84 inside the second inferior voltage control circuit 80. In this case, either one of the three-phase voltage-fed AC/DC conversion circuits 40-1, 40-2 described in FIG. 8 or FIG. 9 can be applied to the three-phase voltage-fed AC/DC conversion circuit 40 of FIG. 5 in the same way as in FIG. 3.

As described above, from the fact that the three-phase voltage-fed AC/DC converter 12 of FIG. 4 and FIG. 5 has internal equivalent impedance, it can be operated in connection to a power system as a distribution network, and because the three-phase voltage-fed AC/DC converter 12 is equipped with the frequency control circuit 50, the second superior voltage control circuit 90 and the second inferior voltage control circuit 80, it can carry out an autonomous parallel operation which compensates the power deviation for the power system autonomously. For this reason, it is possible to improve the reliability of the device and form a distributed arrangement. Further, in the case where a plurality of inverters undergoes parallel operation, the operation can be carried out without any limit to the number of inverters.

Figure 6:
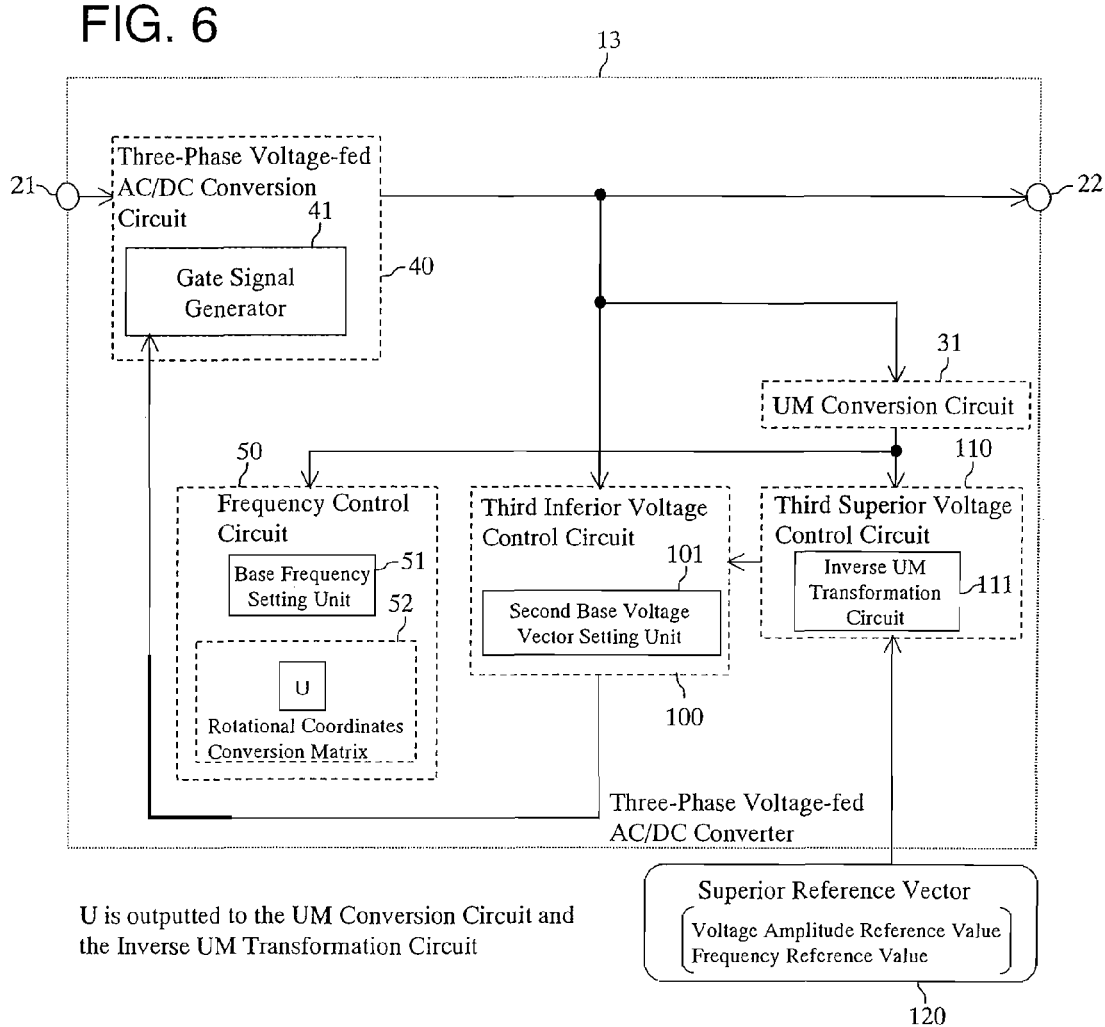
FIG. 6 is a schematic block diagram of another three-phase voltage-fed AC/DC converter according to one embodiment.
Figure 7:
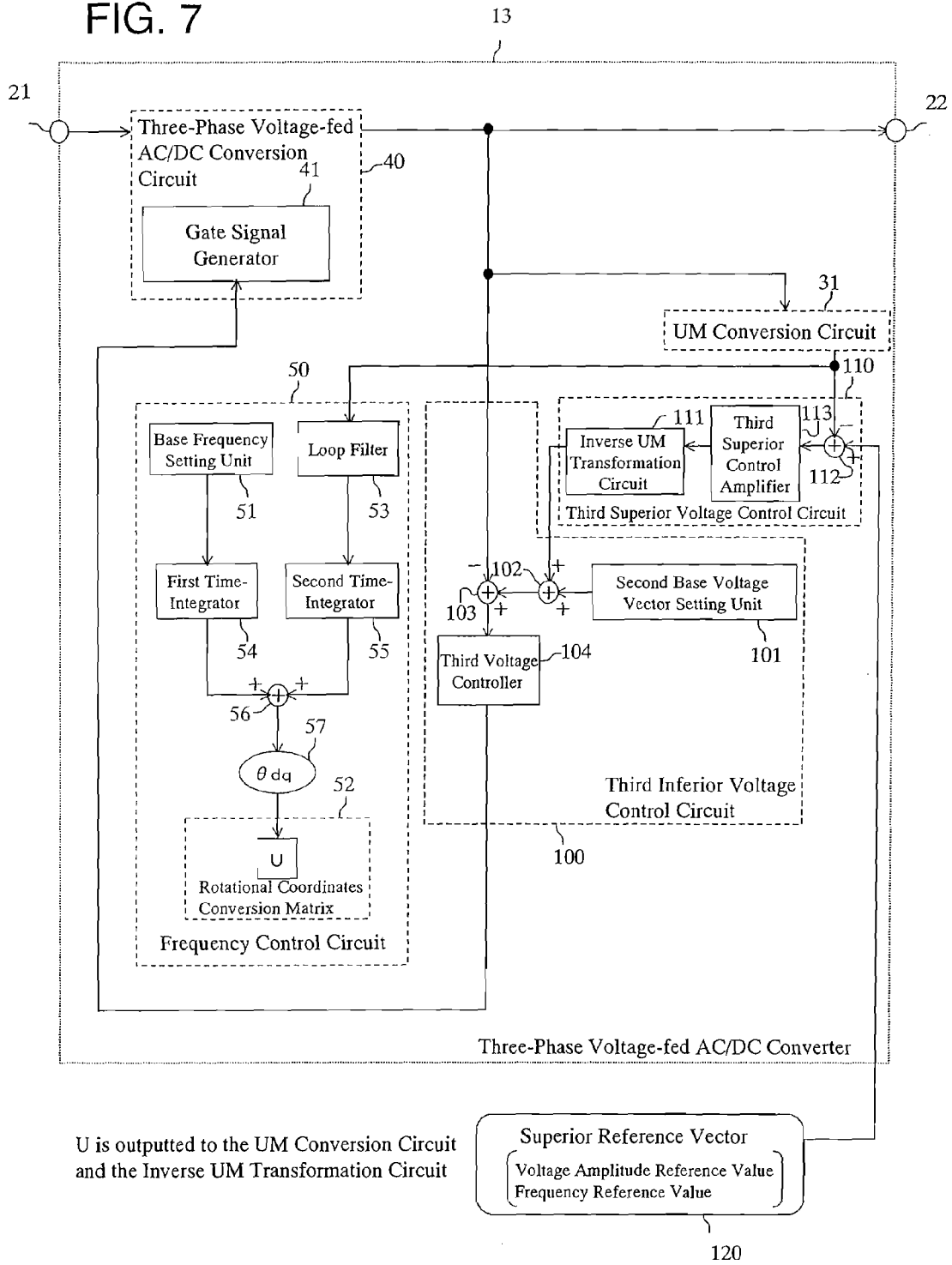
FIG. 7 is a schematic block diagram of another three-phase voltage-fed AC/DC converter according to the present invention.

FIG. 6 and FIG. 7 show schematic block diagrams of a three-phase voltage-fed AC/DC converter according to the present invention.

A three-phase voltage-fed AC/DC converter 13 shown in FIG. 6 is equipped with a three-phase voltage-fed AC/DC conversion circuit 40 which has internal equivalent impedance viewed from an AC terminal 22, wherein power from a DC voltage source (not shown in the drawings) is converted to three-phase AC power which is then outputted from the AC terminal 22 based on a PWM reference, a UM conversion circuit 31 in which the three-phase output voltage at the AC terminal 22 is converted to dq rotational coordinates which are then outputted, a third superior voltage control circuit 110 which outputs a signal generated based on the superior reference vector 120 and the output voltage vector of the UM conversion circuit 31 as a voltage reference vector, a third inferior voltage control circuit 100 which outputs a signal generated based on a base voltage vector, the three-phase output voltage at the AC terminal 22 and the voltage reference vector from the third superior voltage control circuit 110 as a PWM reference, and a frequency control circuit 50 which synchronizes a value generated based on a base frequency and the q-axis component of the output voltage vector obtained by the UM conversion circuit 31 with the rotation angle of a rotational coordinates conversion matrix 52 in the UM conversion circuit 31. In comparison with the three-phase voltage-fed AC/DC converter 11 described in the first embodiment, the difference in the three-phase voltage-fed AC/DC converter 13 according to the present embodiment lies in the point that the signal process inside the third inferior voltage control circuit 100 is carried out for the original three phases. Further, because the same structural elements as those in FIG. 1 and FIG. 2 are shown by the same symbols in FIG. 6 and FIG. 7, a description is omitted.

A superior reference vector 120 formed from a voltage amplitude reference value for the amplitude of the three-phase output voltage at the AC terminal 22 and a frequency reference value for the frequency is inputted in the third superior voltage control circuit 110. Further, a signal is generated based on the inputted superior reference vector 120 and the output voltage vector obtained by the UM conversion circuit 31 so that the amplitude and frequency of the three-phase output voltage at the AC terminal 22 are close to the reference values that are based on the superior reference vector 120, and this signal is outputted as a voltage reference vector. In this regard, a low-pass filter may be provided before the UM conversion circuit 31 and the third inferior voltage control circuit 100, and the three-phase output voltage may be detected via the low-pass filter. By removing the PWM component from the three-phase output voltage, it is possible to stabilize the control of the three-phase voltage-fed AC/DC converter 13. Further, a low-pass filter may be provided after the UM conversion circuit 31, and the output voltage vector obtained by the UM conversion circuit 31 may be outputted via the low-pass filter. By removing the PWM component from the output voltage vector obtained by the UM conversion circuit 31, it is possible to stabilize the control of the three-phase voltage-fed AC/DC converter 13. Further, a blocking inductor may be provided between the AC terminal 22 and the junction of the UM conversion circuit 31, and each three-phase output voltage may be outputted from the AC terminal 22 via the blocking inductor. This makes it possible to prevent the PWM component in the three-phase voltage-fed AC/DC conversion circuit 40 from discharging to the AC terminal 22.

In the specific structure shown in FIG. 7, the output vector obtained from the UM conversion circuit 31 and the superior reference vector 120 are subtracted in a subtracter 112, and the result is amplified by a third superior control amplifier 113 and undergoes inversion from dq rotational coordinates in an Inverse UM transformation circuit 111 to generate a voltage reference vector so as to make the amplitude and frequency of the inverter close to the reference values that are based on the superior reference vector 120. In this way, even if the amplitude and frequency of the power system are changed, it is possible to detect each deviation portion of the amplitude and frequency of the three-phase output power of the three-phase voltage-fed AC/DC converter 13 for such amplitude and frequency. In this regard, in the third superior control amplifier 113, a low-pass filtering element may be added to the output vector from the subtracter 112. This makes it possible to stabilize the feedback loop. Further, a limiter may be provided between the third superior control amplifier 113 and the Inverse UM transformation circuit 111, and the output vector from the third superior control amplifier 113 may be outputted via the limiter. This makes it possible to prevent over-output and stabilize control.

In the third inferior voltage control circuit 100 of FIG. 6, a signal is generated so that the amplitude and phase of the three-phase output voltage are close to the combined value of the base voltage vector and the voltage reference vector based on a base voltage vector which prescribes the amplitude and phase of the three-phase output voltage at the AC terminal 22, the three-phase output voltage at the AC terminal 22 and the voltage reference vector from the third superior voltage control circuit 110, and then this signal is outputted as a PWM reference. Further, the base voltage vector is set in advance by a second base voltage vector setting unit 101. This base voltage vector forms the reference of the amplitude and phase of the three-phase output voltage at the AC terminal 22.

Namely, as shown in FIG. 7, the voltage reference vector from the third superior voltage control circuit 110 is added in an adder 102 to the base voltage vector set in advance in the second base voltage vector setting unit 101 to add a compensation portion of the deviation of the amplitude and frequency of the power system. Further, the three-phase output voltage vector of the AC terminal 22 is subtracted in a subtracter 103, and the result is converted and outputted to the three-phase voltage-fed AC/DC conversion circuit 40 as a PWM reference so that the difference with the amplitude and phase of the power system is close to the combined value of the base voltage vector and the voltage reference vector in a third voltage controller 104. In this way, the deviation portion detected by the third superior voltage control circuit 110 can be compensated, and the amplitude and phase of the three-phase output voltage of the three-phase voltage-fed AC/DC converter 13 can be controlled so that the amplitude and phase of the three-phase output voltage of the three-phase voltage-fed AC/DC converter 13 match both the amplitude and phase of the power system. The third voltage controller 104 can be an amplifier, for example. In this regard, a low-pass filter may be provided between the subtracter 103 and the third voltage controller 104, and the output vector from the subtracter 103 may be outputted via the low-pass filter. By removing the PWM component, the control in the third voltage controller 104 can be stabilized. Further, a voltage limiter may be provided between the subtracter 103 and the third voltage controller 104 (or in the case where a low-pass filter is provided in this position, between the low-pass filter and the third voltage controller 104), and the output vector from the subtracter 103 may be outputted via the voltage limiter. This makes it possible to suppress excessive fluctuation of the output voltage when the three-phase voltage-fed AC/DC converter 13 is operated. Further, a current limiter may be provided after the third voltage controller 104 (or in the case described below where the filter current compensator 66, the PWM current deviation compensator 67 and the feedforward amplifier 68 of FIG. 3 described above are provided, after an adder which adds the outputs of these), and the output vector from the third voltage controller 104 may be outputted via the current limiter. This makes it possible to prevent over-current from flowing to the switching device of the three-phase voltage-fed AC/DC converter 13 at both the stationary time and the transition time.

The three-phase voltage-fed AC/DC converter 13 of FIG. 7 may further be equipped with the feedforward amplifier 68 as well as the current detection circuit 34 required for this, the filter current compensator 66 and the PWM current deviation compensator 67 described in FIG. 3, and the outputs from these circuits can be added to the output vector from the third voltage controller 104 inside the third inferior voltage control circuit 100. In this case, one of the three-phase voltage-fed AC/DC conversion circuits 40-1, 40-2 described in FIG. 8 or FIG. 9 can be applied to the three-phase voltage-fed AC/DC conversion circuit 40 of FIG. 7 in the same way as in FIG. 3.

As described above, from the fact that the three-phase voltage-fed AC/DC converter 13 of FIG. 6 and FIG. 7 has internal equivalent impedance, it can be operated in connection to a power system as a distribution network, and because the three-phase voltage-fed AC/DC converter 13 is equipped with the frequency control circuit 50, the third superior voltage control circuit 110 and the third inferior voltage control circuit 100, it can carry out an autonomous parallel operation which compensates the power deviation for the power system autonomously. For this reason, it is possible to improve the reliability of the device and form a distributed arrangement. Further, in the case where a plurality of inverters undergoes parallel operation, the operation can be carried out without any limit to the number of inverters.

Figure 21:
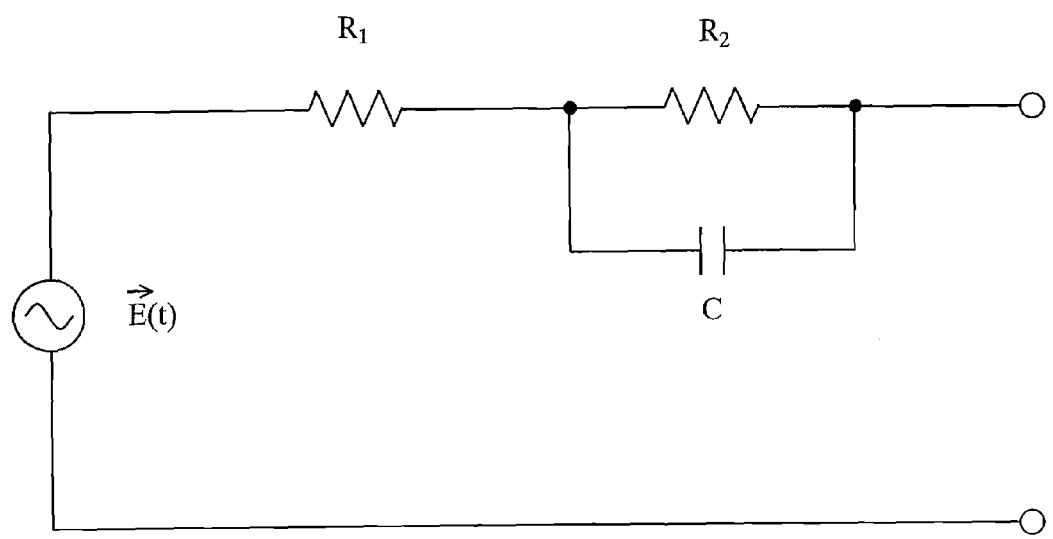
FIG. 21 is an equivalent circuit diagram of the three-phase voltage-fed AC/DC converter according to the present invention.
Figure 22:
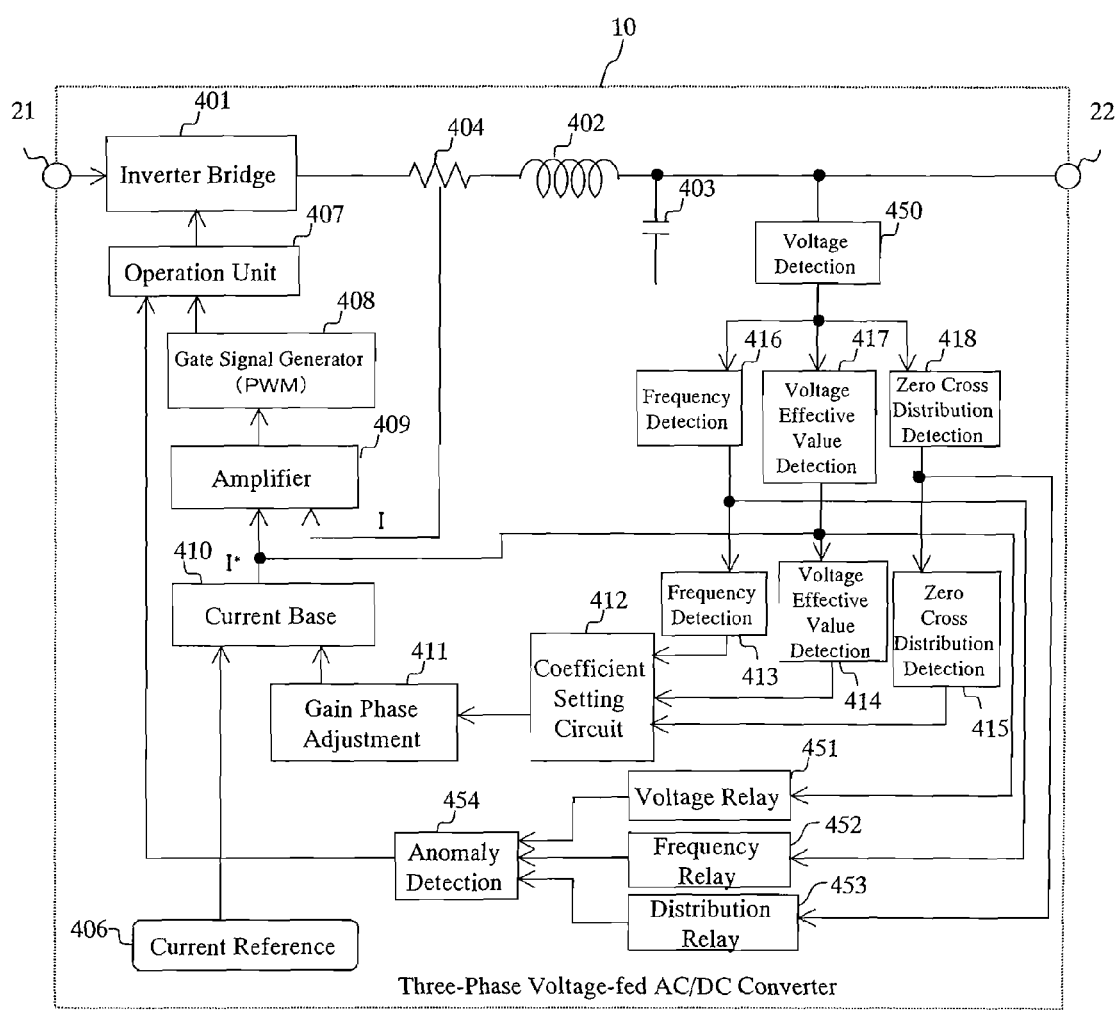
FIG. 22 is a schematic block diagram of a prior art three-phase voltage-fed AC/DC converter.

The internal equivalent impedance of the three-phase voltage-fed AC/DC converter can be calculated as shown below. The equivalent circuit of the α axis and β axis of the three-phase voltage-fed AC/DC converter according to the present invention is shown in FIG. 21. In FIG. 21, $R_1$, $R_2$ and C are given by Equation 8 shown below.

$$R_1 = \frac{1 - \beta \cdot G_{PWM}}{1 + \alpha \cdot R_F \cdot G_{PWM}} \cdot R_F \quad [\Omega] \qquad [8]$$

$$R_2 = \frac{1 - \beta \cdot G_{PWM}}{\alpha \cdot G_{PWM} \cdot (1 + \alpha \cdot R_F \cdot G_{PWM})} \quad [\Omega]$$

$$C = \frac{3 \cdot (1 + \alpha \cdot R_F \cdot G_{PWM})^2}{1 - \beta \cdot G_{PWM}} \cdot C_F \quad [F]$$

Figure 18:
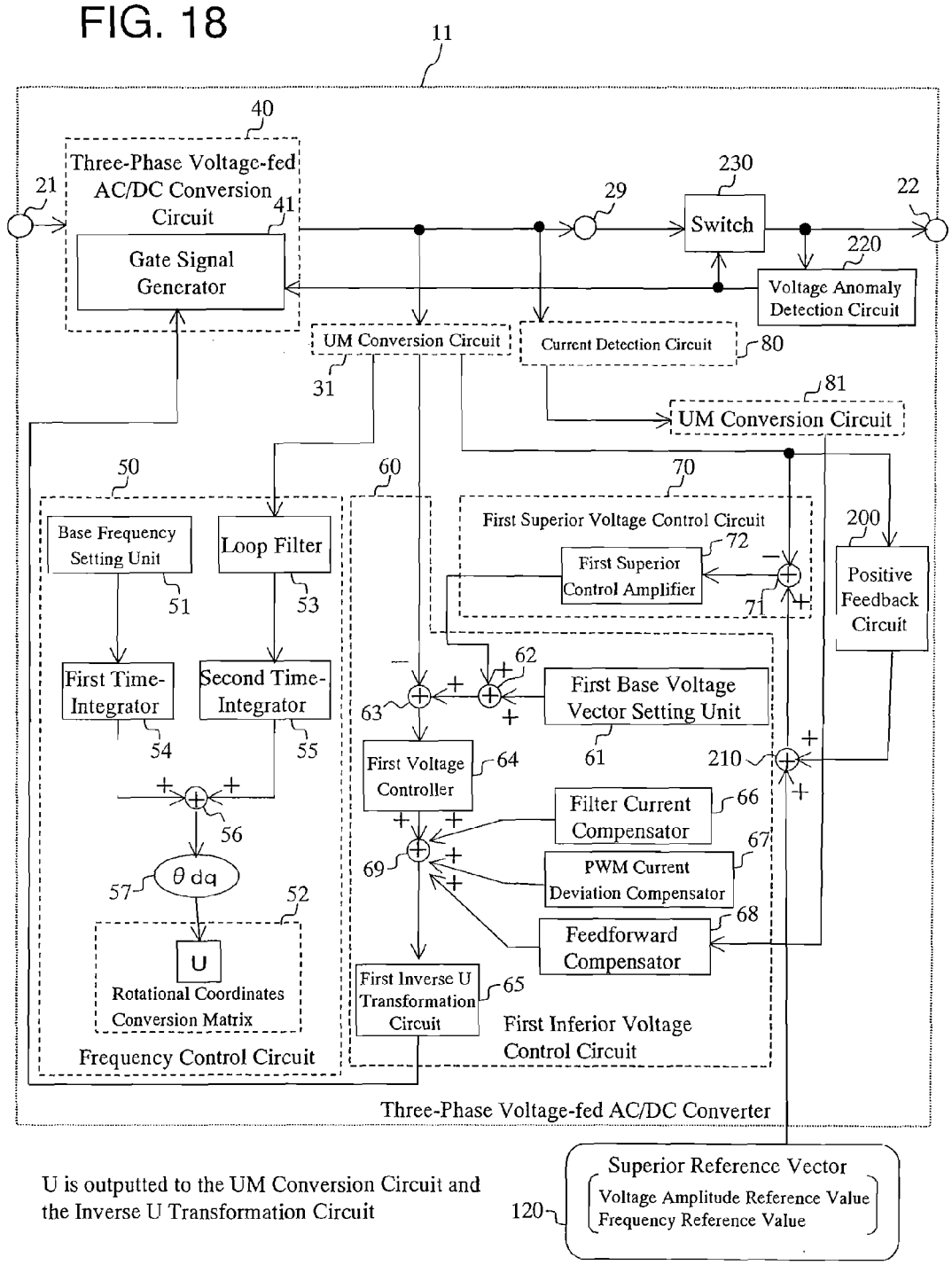
FIG. 18 is a schematic block diagram of another three-phase voltage-fed AC/DC converter according to the present invention.

Further, the gain as the current amplification in the three-phase voltage-fed AC/DC conversion unit of the three-phase voltage-fed AC/DC conversion circuit is given by $G_{PWM}$. Further, in the case where the first voltage controller 64 in FIG. 18 is made an amplifier, the feedback gain of such amplifier is given by α, and the feedforward gain in the feedforward amplifier 68 is given by β. The three-phase voltage-fed AC/DC conversion circuit has a three-phase AC filter circuit which can remove the high-frequency component originating in the gate signals in the three-phase voltage-fed AC/DC conversion unit. A schematic block diagram of the three-phase AC filter circuit is shown in FIG. 11. In Equation 8, $C_F$ represents the capacity of the capacitor of the three-phase AC filter circuit, and $R_F$ represents the resistance value of the three-phase AC filter circuit.

Figure 14:
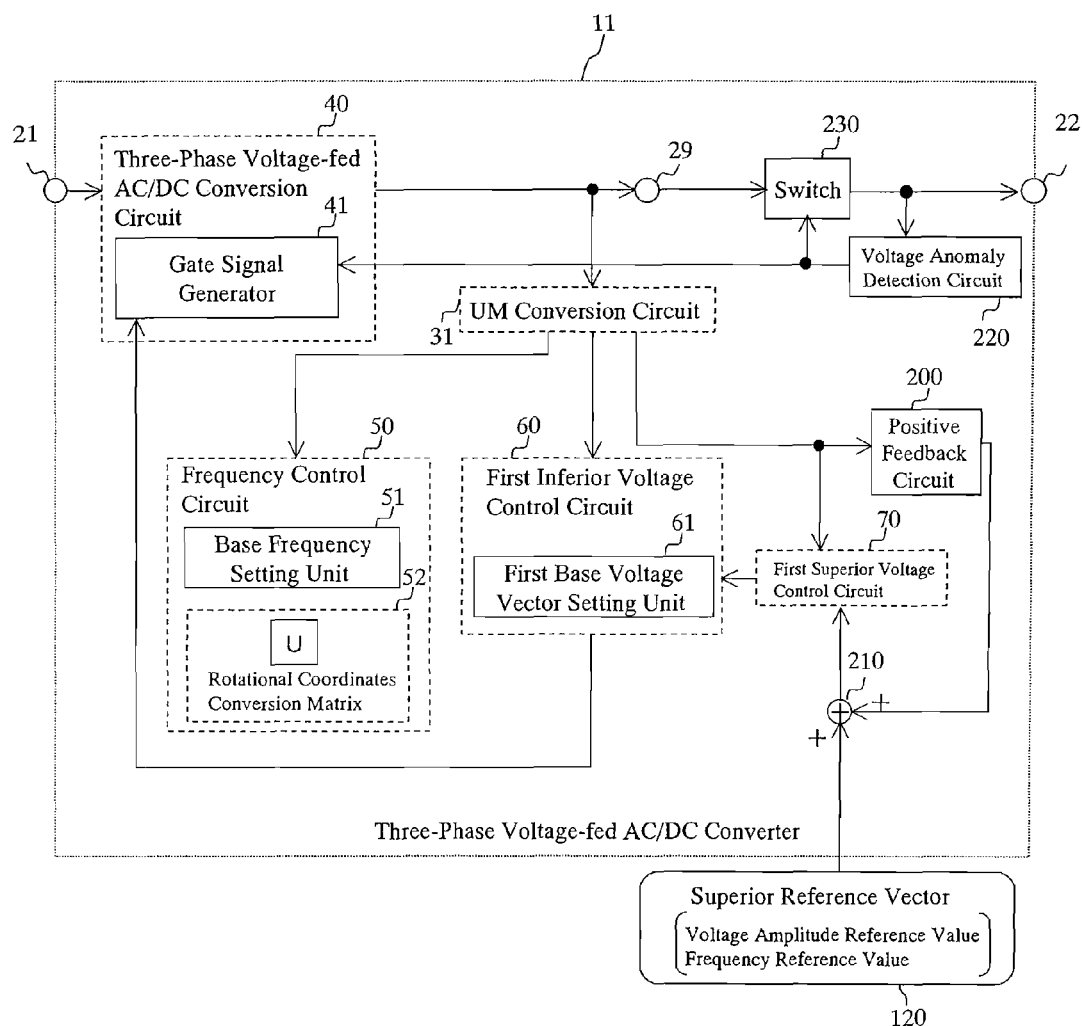
FIG. 14 is a schematic block diagram of a three-phase voltage-fed AC/DC converter according to principles of the present invention.

FIG. 14 shows a schematic block diagram of another three-phase voltage-fed AC/DC converter according to the present invention.

A three-phase voltage-fed AC/DC converter 11 shown in FIG. 14 is equipped with a three-phase voltage-fed AC/DC conversion circuit 40 which has internal equivalent impedance viewed from an AC terminal 29, wherein power from a DC voltage source (not shown in the drawings) is received by a DC terminal 21 and converted to three-phase AC power which is then outputted from the AC terminal 29 based on a PWM reference, a UM conversion circuit 31 in which the three-phase output voltage at the AC terminal 29 is converted to dq rotational coordinates which are then outputted, a first superior voltage control circuit 70 which outputs a signal generated based on the superior reference vector 120 and the output voltage vector of the UM conversion circuit 31 as a voltage reference vector, a first inferior voltage control circuit 60 which outputs a signal generated based on a base voltage vector, the output voltage vector obtained by the UM conversion circuit 31 and the voltage reference vector from the first superior voltage control circuit 70 as a PWM reference, and a frequency control circuit 50 which synchronizes a value generated based on a base frequency and the q-axis component of the output voltage vector obtained by the UM conversion circuit 31 with the rotation angle of a rotational coordinates conversion matrix 52 in the UM conversion circuit 31. Further, the three-phase voltage-fed AC/DC converter 11 is equipped with a positive feedback circuit 200 which carries out positive feedback of each of the dq rotational coordinates axial components of the output voltage vector obtained by the UM conversion circuit 31 on at least one of the dq rotational coordinates axial components of the superior reference vector 120, a voltage anomaly detection circuit 220 which monitors the output voltage of the three-phase voltage-fed AC/DC conversion circuit 40 and detects a deviation of the monitored voltage from a predetermined range as a voltage anomaly, and a switch 230 which is provided between the three-phase voltage-fed AC/DC conversion circuit 40 and the AC terminal 22 as inverter output blocking means which interrupt the three-phase AC power from the three-phase voltage-fed AC/DC conversion circuit 40.

The three-phase voltage-fed AC/DC conversion circuit 40 converts the power from the DC voltage source not shown in the drawings to three-phase AC power in accordance with the pulse width of the gate signals generated by the gate signal generator 41 based on the PWM reference. Examples of a DC voltage source include a distribution network which outputs DC voltage independently such as a battery or the like, a distribution network which outputs DC voltage by rectifying power generated by a power generation method such as wind power generation or the like, or a distribution network which outputs DC voltage by controlling the voltage of a DC capacitor. In this case, a blocking inductor may be provided between the AC terminal 29 of the three-phase voltage-fed AC/DC conversion circuit 40 and the AC terminal 22 of the three-phase voltage-fed AC/DC converter 11, and the three-phase output voltage may be outputted from the AC terminal 22 via the blocking inductor. This makes it possible to prevent the PWM component in the three-phase voltage-fed AC/DC conversion circuit 40 from discharging to the AC terminal 22 of the three-phase voltage-fed AC/DC converter 11.

The UM conversion circuit 31 of FIG. 14 converts the three-phase output voltage at the AC terminal 29 to dq rotational coordinates by Equations 9~11 shown below in which the component related to the amplitude of such voltage forms the d-axis component and the component related to the frequency deviation forms the q-axis component, and then outputs such coordinates. In Equation 11, the three-phase output voltage inputted in the UM conversion circuit 31 is given by (Va, Vb, Vc), and the output voltage vector (d-axis component, q-axis component) from the UM conversion circuit 31 is given by (Vd, Vq). In FIG. 14, the UM conversion circuit 31 outputs to each of the frequency control circuit 50, the first inferior voltage control circuit 60 and the first superior voltage control circuit 70. In this regard, the three-phase output voltage at the AC terminal 29 is detected by carrying out the UM conversion operation with Equations 9~11. In this case, the three phases of the three-phase output voltage may be detected, or because the remaining one voltage is determined if any two voltages of the three-phase output voltage are determined, the UM conversion circuit 31 may detect any two voltages of the three-phase output voltage.

$$U \equiv \begin{pmatrix} \sin\theta_{dq} & -\cos\theta_{dq} \\ \cos\theta_{dq} & \sin\theta_{dq} \end{pmatrix} \tag{9}$$

$$M \equiv \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \tag{10}$$

$$\begin{pmatrix} V_d \\ V_q \end{pmatrix} \equiv UM \begin{pmatrix} V_a \\ V_b \\ V_c \end{pmatrix} \tag{11}$$

$$= \sqrt{\frac{2}{3}} \begin{pmatrix} \sin\theta_{dq} & -\cos\theta_{dq} \\ \cos\theta_{dq} & \sin\theta_{dq} \end{pmatrix} \cdot \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} V_a \\ V_b \\ V_c \end{pmatrix}$$

$$= \sqrt{\frac{2}{3}} \begin{pmatrix} \sin\theta_{dq} & \sin\left(\theta_{dq} - \frac{2}{3}\pi\right) & \sin\left(\theta_{dq} + \frac{2}{3}\pi\right) \\ \cos\theta_{dq} & \cos\left(\theta_{dq} - \frac{2}{3}\pi\right) & \cos\left(\theta_{dq} + \frac{2}{3}\pi\right) \end{pmatrix} \begin{pmatrix} V_a \\ V_b \\ V_c \end{pmatrix}$$

The frequency control circuit 50 synchronizes a value generated based on a base frequency which prescribes the frequency of the three-phase output voltage at the AC terminal 22 and the q-axis component of the output voltage vector obtained by the UM conversion circuit 31 with the rotation angle of the rotational coordinates conversion matrix 52 in the UM conversion circuit 31. Namely, as shown in FIG. 18, a low-pass filtering element is added in a loop filter 53 to the q-axis component which is the component related to the frequency deviation of the three-phase output voltage, and output is carried out after time integration is performed in a second time-integrator 55. The low-pass filtering element added in the loop filter 53 can be a lag element such as a first order lag element or the like, for example. In this way, it is possible to stabilize the feedback loop.

Further, a generated value 57 is generated by adding an integrated value from the second time-integrator 55 in a summing unit 56 to an integrated value obtained by carrying out time integration in a first time-integrator 54 on the base frequency outputted from a base frequency setting unit 51, and this generated value 57 is synchronized with the rotation angle of the rotational coordinates conversion matrix 52 in the UM conversion circuit 31. In this way, such rotation angle can be made to follow the frequency of the power system. In this synchronization, the generated value 57 obtained by adding the integrated value from the first time-integrator 54 and the integrated value from the second time-integrator 55 is given by $\theta_{dq}$ of Equation 11.

In this regard, in the UM conversion circuit 31, the component (q-axis component) related to the frequency deviation of the three-phase output voltage is outputted as described above. For this reason, the signal process in the UM conversion circuit 31 is believed to correspond to a phase comparison process which compares the phase of the three-phase output voltage with the phase of the generated value 57 obtained by adding the integrated value from the first time-integrator 54 and the integrated value from the second time-integrator 55. Further, the signal process which depends on adding the integrated value from the first time-integrator 54 and the integrated value from the second time-integrator 55 is believed to correspond to the signal process of a VCO (Voltage Controlled Oscillator) which can vary the value of a generated value in accordance with the output voltage from the loop filter 53. For this reason, the UM conversion circuit 31 and the frequency control circuit 50 are believed to collectively operate as a PLL in which the generated value 57 obtained by adding the integrated value from the first time-integrator 54 and the integrated value from the second time-integrator 55 is synchronized with the frequency of the three-phase output voltage at the AC terminal 22. For this reason, the frequency range in which synchronization is maintained (synchronization holding range (locking range)) and the frequency locking range (capture range) can be determined in the same way as the case of a PLL.

A superior reference vector 120 formed from a voltage amplitude reference value for the amplitude of the three-phase output voltage at the AC terminal 22 and a frequency reference value for the frequency is inputted in the first superior voltage control circuit 70 of FIG. 14. Further, a signal is generated based on the inputted superior reference vector 120 and the output voltage vector obtained by the UM conversion circuit 31 so that the amplitude and frequency of the three-phase output voltage at the AC terminal 22 are close to the reference values that are based on the superior reference vector 120, and this signal is outputted as a voltage reference vector. Namely, as shown in FIG. 18, the output vector obtained by the UM conversion circuit 31 and the superior reference vector 120 are subtracted in a subtracter 71, and the result is amplified by a first superior control amplifier 72 to generate and output a voltage reference vector so as to make the amplitude and frequency of the inverter close to the reference values that are based on the superior reference vector 120. In this way, even if the voltage amplitude and frequency of the power system are changed, it is possible to detect each deviation portion of the voltage amplitude and frequency of the three-phase output of the three-phase voltage-fed AC/DC converter 11 for such amplitude and frequency.

In the first inferior voltage control circuit 60 of FIG. 14, a signal is generated so that the amplitude and phase of the three-phase output voltage are close to the combined value of the base voltage vector and the voltage reference vector based on a base voltage vector which prescribes the amplitude and phase of the three-phase output voltage at the AC terminal 22, the output voltage vector obtained by the UM conversion circuit 31 and the voltage reference vector from the first superior voltage control circuit 70, and then this signal is outputted as a PWM reference. Further, the base voltage vector is set in advance by a first base voltage vector setting unit 61. This base voltage vector forms the reference of the amplitude and phase of the three-phase output voltage at the AC terminal 22 in two phases.

Namely, as shown in FIG. 18, the voltage reference vector from the first superior voltage control circuit 70 is added in an adder 62 to the base voltage vector set in advance in the first base voltage vector setting unit 61 to add a compensation portion of the deviation of the voltage amplitude and phase of the power system. Further, the output voltage vector obtained by the UM conversion circuit 31 is subtracted in the subtracter 63, and the result is converted and outputted so that the difference with the voltage amplitude and phase of the power system is close to the combined value of the base voltage vector and the voltage reference vector in a first voltage controller 64. Further, the output vector in dq space from the first voltage controller 64 is converted to αβ space in a first Inverse U transformation unit 65 and outputted as a PWM reference to the three-phase voltage-fed AC/DC conversion circuit 40. In this way, the deviation portion detected by the first superior voltage control circuit 70 can be compensated, and the amplitude and phase of the three-phase output voltage of the three-phase voltage-fed AC/DC converter 11 can be controlled so that the amplitude and phase of the three-phase output voltage of the three-phase voltage-fed AC/DC converter 11 match the voltage amplitude and phase of the power system.

At the time when the first superior voltage control circuit 70 interrupts the power system and carries out an islanding operation, a voltage reference vector is outputted by the positive feedback circuit 200 so that the three-phase AC voltage outputted to the AC terminal 29 becomes unstable. Namely, the operation described below is carried out.

In this regard, $V^*_{FILq}$ is the q-axis filter voltage reference value of the three-phase voltage-fed AC/DC converter, $V_{FILq}$ is the actual measured q-axis filter voltage, $V^*_{FILd}$ is the d-axis filter voltage reference value of the three-phase voltage-fed AC/DC converter, and $V_{FILd}$ is the actual measured d-axis filter voltage.

$V^*_{FILq}$ is given by Equation 12 below.

$$V^*_{FILq} = V^*_{FILqq} + k_q \cdot V_{FILq} \, [V] \quad [12]$$

In this regard, $k_q$ is the gain ($k_q > 0$), and $V^*_{FILqq}$ is the q-axis voltage reference value [V]. Positive feedback is carried out for $k_q > 0$.

During a power network link operation, because the output frequency and output voltage amplitude of the inverter are equal to the values of the power system, $V_{FILq}$ is fixed.

In the case of an islanding operation, because positive feedback is applied to $V^*_{FILq}$ for the gain $k_q > 0$ of the positive feedback circuit 200 of FIG. 14, $V_{FILq}$ becomes larger than the value during a power network link operation. Namely, as shown in FIG. 18, because the value obtained by adding the output of the positive feedback circuit 200 and the superior reference vector 120 in an adder 210 is subtracted from the output vector obtained from the UM conversion circuit 31 in a subtracter 71, the gain $k_q$ of the positive feedback circuit 200 is made a value which satisfies Equation 13. For this reason, because positive feedback is applied to $V^*_{FILq}$, $V_{FILq}$ becomes larger than the value during a power network link operation. In this regard, the q-axis gain of the first superior voltage control circuit 70 is given by $k_{vq}$.

$$k_q > \frac{1 + k_{vq}}{k_{vq}} \quad [13]$$

Further, because the output frequency $F_i$ of the inverter is determined by Equation 14, if $V_{FILq}$ becomes large, $F_i$ is converted large from the inverter base frequency $F_{CO}$. For this reason, it is possible to detect an islanding operation by monitoring the output frequency $F_i$ with a frequency relay or the like of the voltage anomaly detection circuit 220. In this regard, $K_f$ is the voltage frequency conversion gain inside the frequency control circuit 50.

$$F_i = F_{co} K_f V_{FILq} \quad [14]$$

$V^*_{FILd}$ is given by Equation 15 below.

$$V^*_{FILd} = V_{FILdd} + k_d \cdot V_{FILd} \, [V] \quad [15]$$

In this regard, $k_d$ is the gain ($k_d > 0$), and $V^*_{FILdd}$ is the d-axis voltage reference value [V]. Positive feedback is carried out for $k_d > 0$.

During a power network link operation, because the output frequency and output voltage amplitude of the inverter are equal to the values of the power system, $V_{FILd}$ is fixed.

In the case of an islanding operation, because positive feedback is applied to $V^*_{FILd}$ for the gain $k_d>0$ of the positive feedback circuit 200 of FIG. 14, $V_{FILd}$ becomes larger than the value during a power network link operation. Namely, as shown in FIG. 18, because the value obtained by adding the output of the positive feedback circuit 200 and the superior reference vector 120 in the adder 210 is subtracted from the output vector obtained from the UM conversion circuit 31 in a subtracter 72, the gain $k_d$ of the positive feedback circuit 200 is made a value which satisfies Equation 16. For this reason, because positive feedback is applied to $V^*_{FILd}$, $V_{FILd}$ becomes larger than the value during a power network link operation. In this regard, the d-axis gain of the first superior voltage control circuit 70 is given by $k_{vd}$.

$$K_d > \frac{1 + K_{vd}}{K_{vd}} \qquad [16]$$

Further, because $V_{FILd}$ is the amplitude of the output voltage of the inverter, if $V_{FILd}$ becomes large, the output voltage of the inverter is converted large from the base voltage $V_{CO}$. For this reason, it is possible to detect an islanding operation by monitoring the voltage amplitude with a voltage relay or the like of the voltage anomaly detection circuit 220.

The voltage anomaly detection circuit 220 of FIG. 14 has a voltage detection circuit, a voltage relay and an anomaly detection circuit. Further, the voltage anomaly detection circuit 220 may have a voltage detection circuit, a frequency relay and an anomaly detection circuit. The voltage anomaly detection circuit 220 sets a monitoring point between the three-phase voltage-fed AC/DC conversion circuit 40 and the AC terminal 22, and monitors the three-phase AC voltage or frequency between the three-phase voltage-fed AC/DC conversion circuit 40 and the AC terminal 22. Further, the voltage anomaly detection circuit 220 may monitor the voltage of the q-axis component and/or the d-axis component of the vector obtained by carrying out UM conversion of the output of the three-phase voltage-fed AC/DC conversion circuit 40. Further, the voltage anomaly detection circuit 220 may monitor the voltage of the α-axis component and/or the β-axis component of the vector obtained by carrying out UM conversion of the output of the three-phase voltage-fed AC/DC conversion circuit 40 to αβ static coordinates formed by an α axis and a β axis which are mutually orthogonal, with one voltage of the three-phase AC voltage forming a reference. The three-phase voltage-fed AC/DC converter 11 can judge that an islanding operation is formed by detecting a voltage anomaly with the voltage anomaly detection circuit 220. The voltage anomaly detection circuit 220 of FIG. 14 and FIG. 18 carries out monitoring between the switch 230 and the AC terminal 22, but may carry out monitoring between the three-phase voltage-fed AC/DC conversion circuit 40 and the switch 230.

The voltage anomaly detection circuit 220 of FIG. 14 monitors the output of the three-phase voltage-fed AC/DC conversion circuit 40, but may monitor the output from the adder 210, the output from the first superior voltage control circuit 70 or the output from the first inferior voltage control circuit 60 as a positive feedback point where the output voltage vector obtained by the positive feedback circuit 200 carries out positive feedback on the superior reference vector 120. The monitoring of the output from the adder 210, the output from the first superior voltage control circuit 70 or the output from the first inferior voltage control circuit 60 as a positive feedback point by the voltage anomaly detection circuit 220 may be carried out for the voltage of the q-axis component and/or the d-axis component of the dq rotational coordinates vector, the voltage of the α-axis component and/or the β-axis component of the αβ static coordinates vector or the value obtained by carrying out inverse UM transformation or inverse U transformation.

Figure 19A:
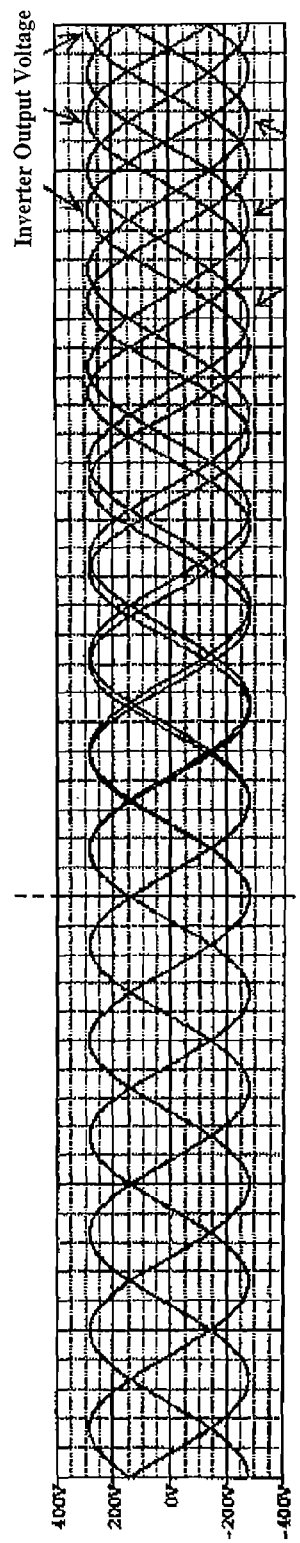
FIGS. 19(A)-19(C) are graphs showing the voltage waveform, the power waveform and the current waveform in the AC terminal at the time of switching from a power network link operation to an islanding operation in the three-phase voltage-fed AC/DC converter of FIG. 18 in the case where positive feedback of the q-axis component of the output voltage vector obtained by the UM conversion circuit is carried out.
Figure 19B:
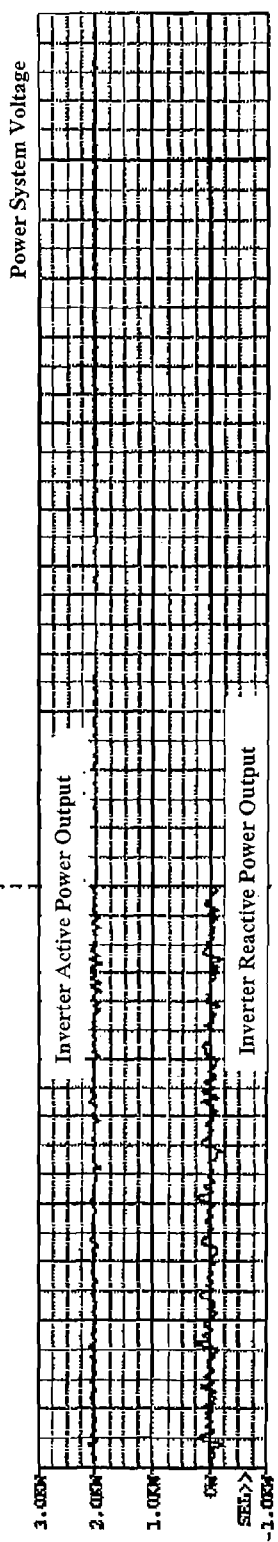
Figure 19C:
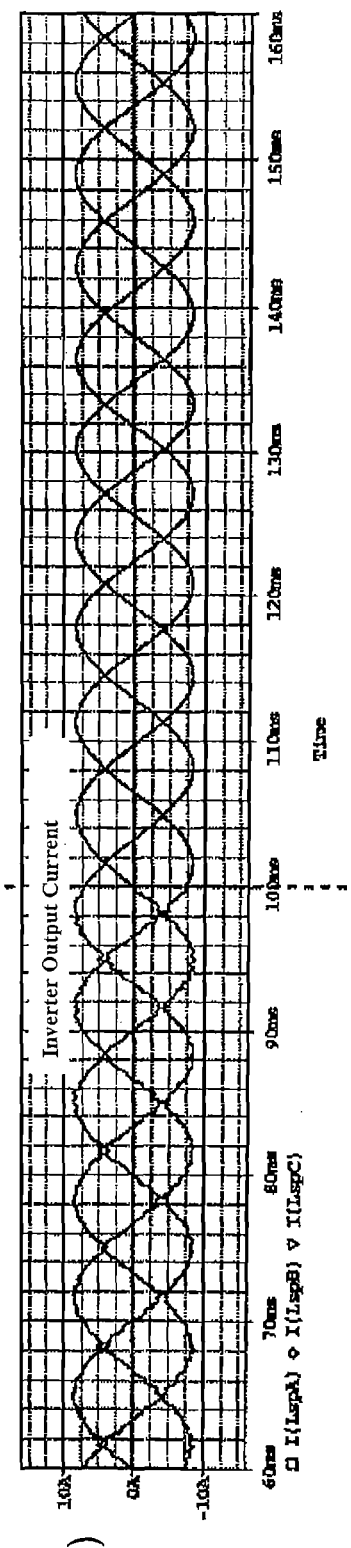

FIGS. 19(A) to 19(C) show an example operation of the case where positive feedback of the q-axis component of the output voltage vector obtained by the UM conversion circuit 31 is carried out in the three-phase voltage-fed AC/DC converter 11. The three-phase voltage-fed AC/DC converter 11 carries a 2 kW, 1.0 power factor load, and carries out a link operation with a 200 V, 50 Hz power system. Further, because the output of the three-phase voltage-fed AC/DC converter 11 is P=2 kW, Q=0 kvar, the link current is zero.

When a link interrupter is opened at time t=100 ms, the output frequency of the three-phase voltage-fed AC/DC converter 11 becomes higher gradually. Then, at 60 ms after the release of the link interrupter, the frequency rises roughly 5 Hz.

Figures 20A, 20B, 20C:
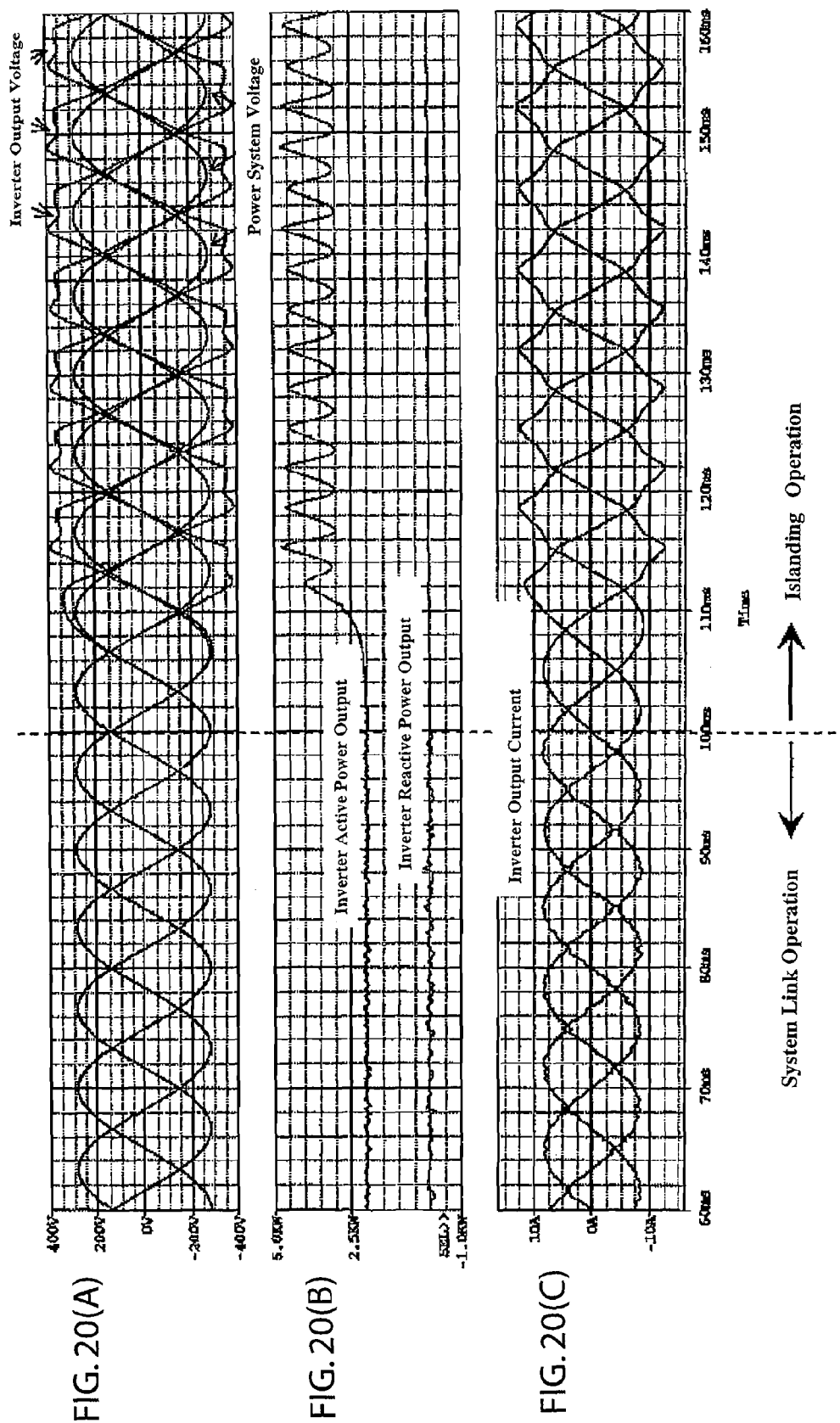
FIGS. 20(A)-20(C) are graphs showing the voltage waveform, the power waveform and the current waveform in the AC terminal at the time of switching from a power network link operation to an islanding operation in the three-phase voltage-fed AC/DC converter of FIG. 18 in the case where positive feedback of the d-axis component of the output voltage vector obtained by the UM conversion circuit is carried out.

FIGS. 20(A) to 20(C) show an example operation of the case where positive feedback of the d-axis component of the output voltage vector obtained by the UM conversion circuit 31 is carried out in the three-phase voltage-fed AC/DC converter 11. The three-phase voltage-fed AC/DC converter 11 carries a 2 kW, 1.0 power factor load, and carries out a link operation with a 200 V, 50 Hz power system. Further, because the output of the three-phase voltage-fed AC/DC converter 11 is P=2 kW, Q=0 kvar, the link current is zero.

When the link interrupter is released at time t=100 ms, the absolute value of the voltage of the three-phase voltage-fed AC/DC converter 11 becomes larger. At maximum, the DC-side voltage of the three-phase voltage-fed AC/DC converter 11 becomes as high as 360 V.

The three-phase voltage-fed AC/DC converter 11 is further equipped with inverter output blocking means. The inverter output blocking means of FIG. 14 is a switch 230 provided between the AC terminal 22 and a gate signal blocking unit and/or the three-phase voltage-fed AC/DC conversion circuit 40. In the case where the voltage anomaly detection circuit 220 detects a voltage anomaly, the gate signal blocking unit blocks the gate signals from the gate signal generator 41 inside the three-phase voltage-fed AC/DC conversion circuit 40, and blocks the output of the three-phase AC power from the three-phase voltage-fed AC/DC conversion circuit 40. On the other hand, in the case where the voltage anomaly detection circuit 220 detects a voltage anomaly, the switch 230 interrupts the three-phase AC power from the three-phase voltage-fed AC/DC conversion circuit 40, and blocks the output of the three-phase AC power to the AC terminal 22. The three-phase voltage-fed AC/DC converter 11 of FIG. 14 and FIG. 18 is equipped with the gate signal blocking unit which blocks the gate signal generator 41 and the switch 230 as inverter output blocking means.

By providing the inverter output blocking means, in the case where the voltage anomaly detection circuit 220 detects a voltage anomaly, namely, at the time of an islanding operation, the three-phase voltage-fed AC/DC converter 11 can interrupt the output to an external unit of the three-phase AC voltage.

Figure 17:
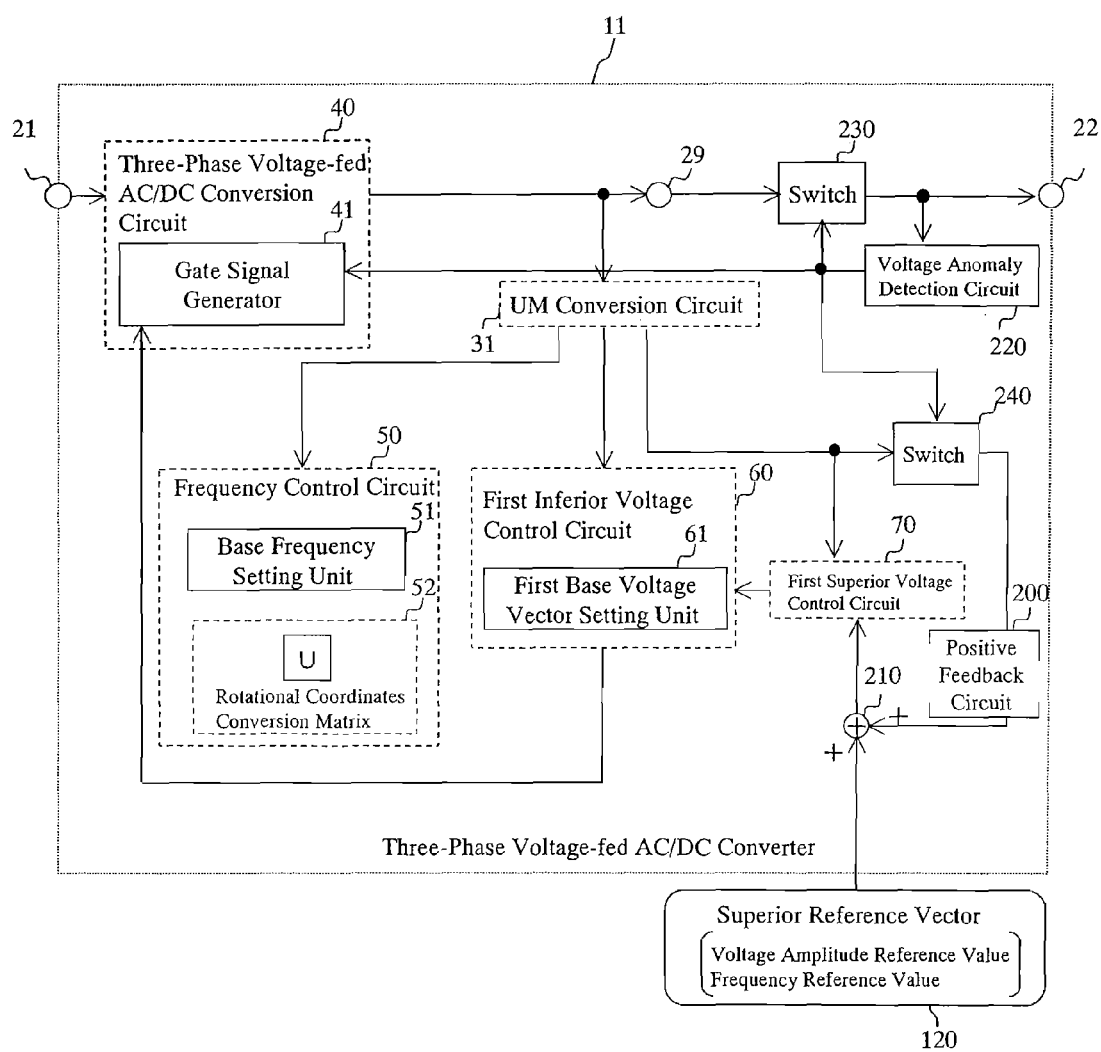
FIG. 17 is a schematic block diagram of another three-phase voltage-fed AC/DC converter according to the present invention.

The three-phase voltage-fed AC/DC converter 11 is further equipped with positive feedback circuit halting means. The positive feedback circuit halting means is a switch which opens and closes the positive feedback circuit 200 or an indicator circuit which sets the gain of the positive feedback circuit 200 to zero. FIG. 17 shows the three-phase voltage-fed AC/DC converter 11 for the case where a switch 240 is applied as the positive feedback circuit halting means. In the case where the voltage anomaly detection circuit 220 detects a voltage anomaly, the positive feedback circuit halting means halts the positive feedback of the voltage output vector to the superior reference vector 120 carried out by the positive feedback circuit 200. By providing the positive feedback circuit halting means, in the case where the voltage anomaly detection circuit 220 detects a voltage anomaly, namely, at the time of an islanding operation, the three-phase voltage-fed AC/DC converter 11 can prevent wide fluctuation of the frequency and voltage amplitude of the three-phase AC from the three-phase voltage-fed AC/DC conversion circuit 40.

FIG. 18 shows a schematic block diagram of another three-phase voltage-fed AC/DC converter 11 according to the present invention. The three-phase voltage-fed AC/DC converter 11 of FIG. 18 is an embodiment in which the three-phase voltage-fed AC/DC converter 11 shown in FIG. 14 is further equipped with a current detection circuit 80 which detects the three-phase output current of the AC terminal 22, and a UM conversion circuit 81 in which the detected current signal of the current detection circuit 80 is converted to dq rotational coordinates and outputted, wherein the output vector from the first voltage controller 64 and the output vectors from a filter current compensator 66, a PWM current deviation compensator 67 and a feedforward amplifier 68 are added in an adder 69. Further, the dq conversion in the UM conversion circuit 81 is the same as the coordinates conversion described in Equations 9~11. Namely, the UM conversion circuit 81 outputs the detected current signal of the current detection circuit 80 as a d-axis component forming the component related to the active power and a q-axis component forming the component related to the reactive power of such detected current signal.

The filter current compensator 66 outputs a current compensation vector which is prescribed so that the current loss in a three-phase AC filter circuit 45 inside the three-phase voltage-fed AC/DC conversion circuit 40 is compensated. In this way, in the three-phase voltage-fed AC/DC converter 11, the current loss portion in the three-phase AC filter circuit 45 is set in advance in the current compensator 66, and by adding this to the output vector from the first voltage controller 64, it is possible to compensate such loss. Further, the PWM current deviation compensator 67 outputs a current deviation compensation vector which is prescribed so that the current deviation of the three-phase output current from the three-phase voltage-fed AC/DC conversion circuit 40 is compensated. In this way, in the three-phase voltage-fed AC/DC converter 11, the current deviation portion in the three-phase voltage-fed AC/DC conversion circuit 40 when the PWM reference is a zero reference is set in advance in the PWM current deviation compensator 67, and by adding this to the output vector from the first voltage controller 64, it is possible to compensate such loss.

Further, in the feedforward amplifier 68, the output current vector from the UM conversion circuit 81 is amplified at a prescribed feedforward gain and outputted so that the current flowing to the AC terminal 22 is compensated. In this way, in the three-phase voltage-fed AC/DC converter 11, by detecting the three-phase output current of the AC terminal 22 in the current detection circuit 80 and carrying out dq conversion, the active and reactive components of the three-phase output current can be detected, and by passing these values through the feedforward amplifier 68 and adding them to the output vector from the first voltage controller 64, it is possible to generate a stabilized output voltage even when the load current changes.

As described above, from the fact that the three-phase voltage-fed AC/DC converter 11 of FIG. 14 and FIG. 18 has internal equivalent impedance, it can be operated in connection to a power system as a distribution network, and because the three-phase voltage-fed AC/DC converter 11 is equipped with the frequency control circuit 50, the first superior voltage control circuit 70 and the first inferior voltage control circuit 60, it can carry out an autonomous parallel operation which compensates the power deviation for the power system autonomously.

Further, the three-phase voltage-fed AC/DC converter 12 can detect an islanding operation by the positive feedback circuit 200 and the voltage anomaly detection circuit 220, can block the output of the three-phase AC voltage at the time of an islanding operation to an external unit by the inverter output blocking means, and can prevent wide fluctuation of the frequency and voltage amplitude of the three-phase AC from the three-phase voltage-fed AC/DC conversion circuit 40 by the positive feedback circuit halting means.

Detection can be carried out even in the case where the system voltage forms an open phase state. In FIGS. 20(A) to 20(C), it is possible to detect an islanding operation state from the fact that the absolute value of the voltage of the three-phase voltage-fed AC/DC converter 11 becomes larger after a time t=100 ms (FIG. 20(A)), and even in the case where the system voltage is in an open phase state, the increase is not as high as the time of an islanding operation state, but it is possible to detect that the absolute value of the voltage of the three-phase voltage-fed AC/DC converter 11 has become larger.

Further, it is possible to discriminate whether there is an islanding operation state or an open phase state depending on the degree of variation of the absolute value of the voltage of the three-phase voltage-fed AC/DC converter 11 within an interval of several hundred ms.

Further, in the case where the first phase of the three phases is an open phase state, for example, because a frequency oscillation at double the power system frequency is stacked on the signal outputted from the UM conversion circuit 31, this fact can be utilized to make it possible to discriminate whether there is an open phase state or an islanding operation state.

Figure 15:
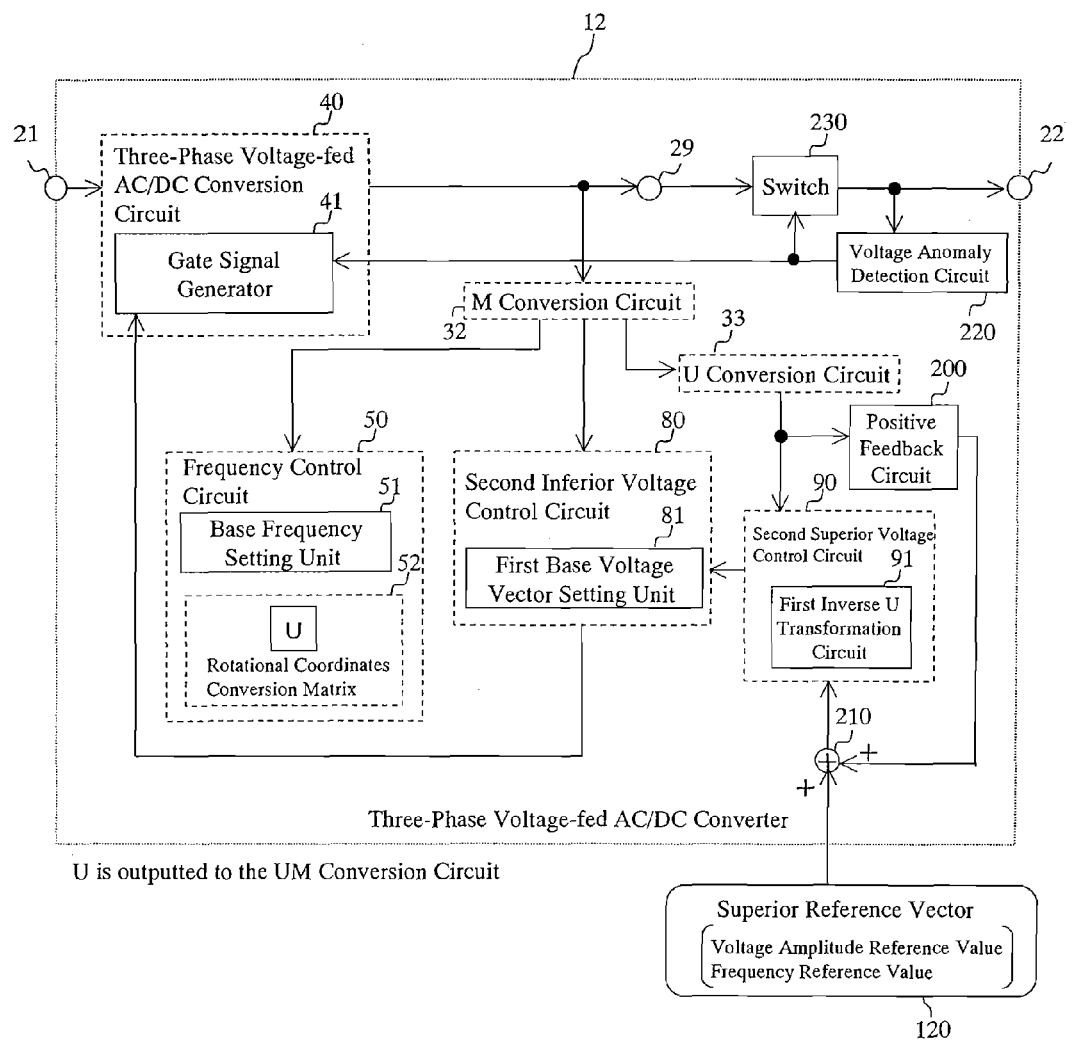
FIG. 15 is a schematic block diagram of another three-phase voltage-fed AC/DC converter according to the present invention.

FIG. 15 shows a schematic block diagram of another three-phase voltage-fed AC/DC converter according to the present invention.

A three-phase voltage-fed AC/DC converter 12 shown in FIG. 15 is equipped with a three-phase voltage-fed AC/DC conversion circuit 40 which has internal equivalent impedance viewed from an AC terminal 22, wherein power from a DC voltage source (not shown in the drawings) is converted to three-phase AC power which is then outputted from the AC terminal 22 based on a PWM reference, an M conversion circuit 32 which converts the three-phase output voltage at the AC terminal 22 to αβ static coordinates, a U conversion circuit 33 in which the output voltage vector obtained by the M conversion circuit 32 is converted to dq rotational coordinates which are then outputted, a second superior voltage control circuit 90 which outputs a signal generated based on a superior reference vector 120 and the output voltage vector obtained by the U conversion circuit 33 as a voltage reference vector, a second inferior voltage control circuit 80 which outputs a signal generated based on a base voltage vector, the output voltage vector obtained by the M conversion circuit 32 and the voltage reference vector from the second superior voltage control circuit 90 as a PWM reference, and a frequency control circuit 50 which synchronizes a value generated based on a base frequency and the q-axis component of the output voltage vector obtained by the U conversion circuit 33 with the rotation angle of a rotational coordinates conversion matrix 52 in the U conversion circuit 33.

In comparison with the three-phase voltage-fed AC/DC converter 11 described in the fourth embodiment, the differences in the three-phase voltage-fed AC/DC converter 12 according to the present embodiment lie in the point that the signal process inside the second inferior voltage control circuit 80 is carried out in $\alpha\beta$ static coordinates, and the point that the positive feedback circuit 200 carries out positive feedback on the superior reference vector 120 using the output from the U conversion circuit 33 obtained by conversion of the output from the M conversion circuit 32. Further, because the same structural elements as those in FIG. 14 and FIG. 18 are shown by the same symbols in FIG. 15, a description is omitted.

The M conversion circuit 32 converts one voltage of the three-phase output voltage at the AC terminal 22 as a reference to $\alpha\beta$ static coordinates formed by an $\alpha$ axis and a $\beta$ axis which are mutually orthogonal. The conversion matrix can be represented by Equation 10 shown above. Further, the U conversion circuit 33 converts the output voltage vector of the M conversion circuit 32 to dq rotational coordinates in which the component related to the amplitude of the three-phase output voltage forms the d-axis component and the component related to the frequency deviation forms the q-axis component, and then outputs such coordinates. The conversion matrix can be represented by Equation 9 shown above. For this reason, because the output from the U conversion circuit 33 is carried out via the M conversion circuit 32, a vector having the same qualities as the output from the UM conversion circuit 31 of FIG. 14 is outputted.

A superior reference vector 120 formed from a voltage amplitude reference value for the amplitude of the three-phase output voltage at the AC terminal 22 and a frequency reference value for the frequency is inputted in the second superior voltage control circuit 90 of FIG. 15. Further, a signal is generated based on the inputted superior reference vector 120 and the output voltage vector obtained by the U conversion circuit 33 so that the amplitude and frequency of the three-phase output voltage at the AC terminal 22 are close to the reference values that are based on the superior reference vector 120, and this signal is outputted as a voltage reference vector via the first Inverse U transformation unit 91.

Namely, as was described for the first superior voltage control circuit 70 of FIG. 18, the output vector obtained from the U conversion circuit 33 and the superior reference vector 120 are subtracted in a subtracter, and the result is amplified by a second superior control amplifier and converted to $\alpha\beta$ static coordinates in the first Inverse U transformation unit 91 to generate a voltage reference vector so that the voltage amplitude and frequency of the power system are close to the reference values that are based on the superior reference vector 120. In this way, even if the voltage amplitude and frequency of the power system are changed, it is possible to detect each deviation portion of the voltage amplitude and frequency of the three-phase output power of the three-phase voltage-fed AC/DC converter 12 for such amplitude and frequency.

In the second inferior voltage control circuit 80 of FIG. 15, a signal is generated so that the amplitude and phase of the three-phase output voltage are close to the combined value of the base voltage vector and the voltage reference vector based on a base voltage vector which prescribes the amplitude and phase of the three-phase output voltage at the AC terminal 22, the output voltage vector obtained by the M conversion circuit 32 and the voltage reference vector from the second superior voltage control circuit 90, and then this signal is outputted as a PWM reference. Namely, the second inferior voltage control circuit 80 has a second voltage controller in place of the first voltage controller 64 of the first inferior voltage control circuit 60 described in FIG. 18, and does not have the first Inverse U transformation unit 65 of the first inferior voltage control circuit 60. The voltage reference vector from the second superior voltage control circuit 90 is added in an adder to the base voltage vector set in advance in the first base voltage vector setting unit 81 to add a compensation portion of the deviation of the voltage amplitude and frequency of the power system.

Further, the output voltage vector obtained by the M conversion circuit 32 is subtracted in a subtracter, and the result is converted and outputted to the three-phase voltage-fed AC/DC conversion circuit 40 as a PWM reference so that the difference with the voltage amplitude and phase of the power system is close to the combined value of the base voltage vector and the voltage reference vector in the second voltage controller. In this way, the deviation portion detected by the second superior voltage control circuit 90 can be compensated, and the amplitude and phase of the three-phase output voltage of the three-phase voltage-fed AC/DC converter 12 can be controlled so that the amplitude and phase of the three-phase output voltage of the three-phase voltage-fed AC/DC converter 12 match the voltage amplitude and phase of the power system.

The three-phase voltage-fed AC/DC converter 12 shown in FIG. 15 is equipped with the positive feedback circuit 200 and the voltage anomaly detection circuit 220 described in FIG. 14 and FIG. 18. Accordingly, by detecting a voltage anomaly with the voltage anomaly detection circuit 220, the three-phase voltage-fed AC/DC converter 12 can judge that an islanding operation is formed.

The three-phase voltage-fed AC/DC converter 12 shown in FIG. 15 is equipped with the inverter output blocking means described in FIG. 14 and FIG. 18. The inverter output blocking means of FIG. 15 is a switch 230 provided between the AC terminal 22 and a gate signal blocking unit and/or the three-phase voltage-fed AC/DC conversion circuit 40. Accordingly, in the case where the voltage anomaly detection circuit 220 detects a voltage anomaly, namely, at the time of an islanding operation, the three-phase voltage-fed AC/DC converter 12 can interrupt the output to an external unit of the three-phase AC voltage.

The three-phase voltage-fed AC/DC converter 12 is further equipped with positive feedback circuit halting means. The positive feedback circuit halting means of FIG. 15 is a switch which opens and closes the positive feedback circuit 200 and/or an indicator circuit which sets the gain of the positive feedback circuit 200 to zero. Accordingly, in the case where the voltage anomaly detection circuit 220 detects a voltage anomaly, namely, at the time of an islanding operation, the three-phase voltage-fed AC/DC converter 12 can prevent wide fluctuation of the frequency and voltage amplitude of the three-phase AC from the three-phase voltage-fed AC/DC conversion circuit 40.

The three-phase voltage-fed AC/DC converter 12 of FIG. 15 is further equipped with the feedforward amplifier 68 as well as the current detection circuit 80 and the M conversion circuit 32 required for this, the filter current compensator 66 and the PWM current deviation compensator 67 described in FIG. 18, and the outputs from these circuits can be added to the output vector from the second voltage controller 84 inside the second inferior voltage control circuit 80.

As described above, from the fact that the three-phase voltage-fed AC/DC converter 12 of FIG. 15 has the same internal equivalent impedance as the three-phase voltage-fed AC/DC converter 11 of FIG. 14 and FIG. 18, it can be operated in connection to a power system as a distribution network, and because the three-phase voltage-fed AC/DC converter 12 is equipped with the frequency control circuit 50, the second superior voltage control circuit 90 and the second inferior voltage control circuit 80, it can carry out an autonomous parallel operation which compensates the power deviation for the power system autonomously.

Further, the three-phase voltage-fed AC/DC converter 12 can detect an islanding operation by the positive feedback circuit 200 and the voltage anomaly detection circuit 220, can block the output of the three-phase AC voltage at the time of an islanding operation to an external unit by the inverter output blocking means and the positive feedback circuit halting means, and can prevent wide fluctuation of the frequency and voltage amplitude of the three-phase AC from the three-phase voltage-fed AC/DC conversion circuit 40.

Figure 16:
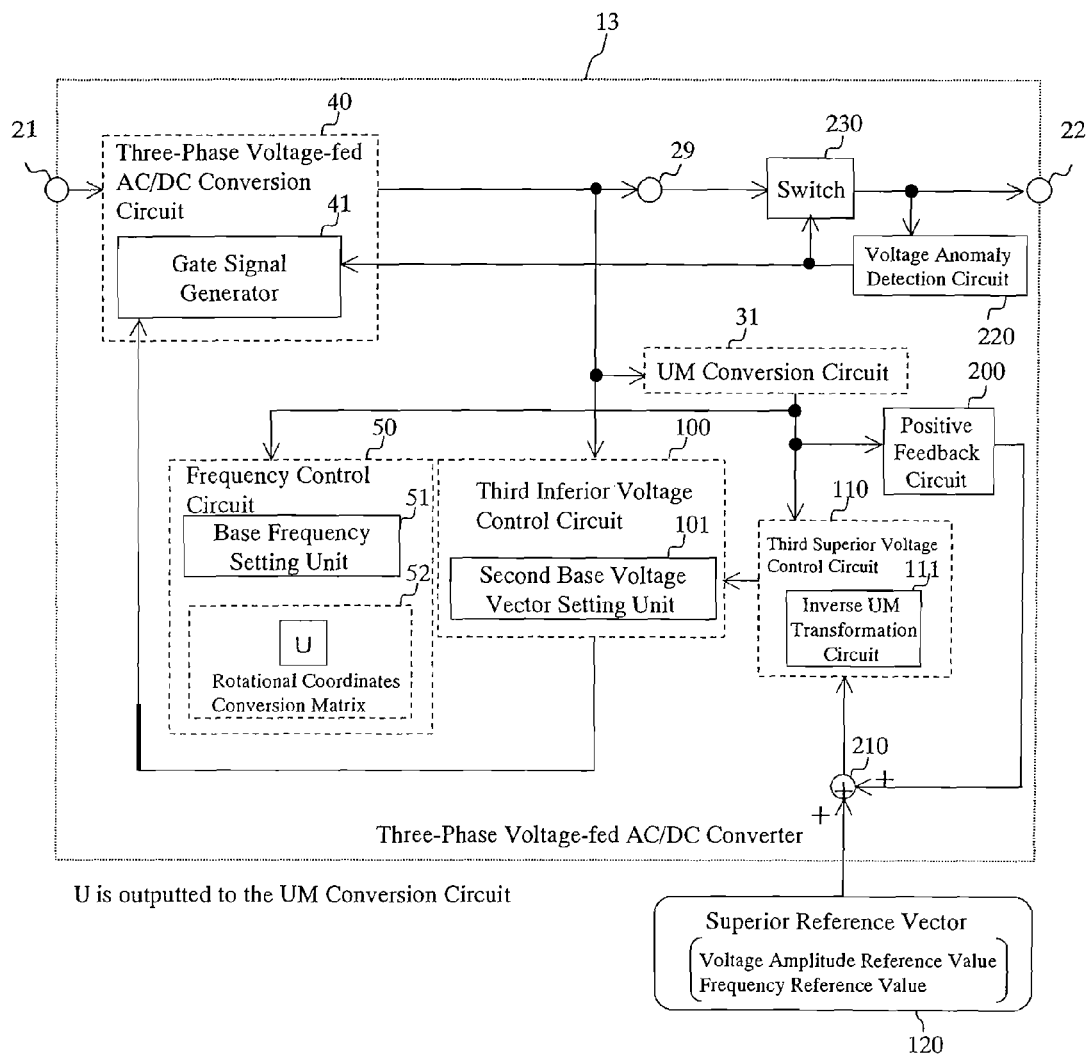
FIG. 16 is a schematic block diagram of another three-phase voltage-fed AC/DC converter according to the present invention.

FIG. 16 shows a schematic block diagram of another three-phase voltage-fed AC/DC converter according to the present invention.

A three-phase voltage-fed AC/DC converter 13 shown in FIG. 16 is equipped with a three-phase voltage-fed AC/DC conversion circuit 40 which has internal equivalent impedance viewed from an AC terminal 22, wherein power from a DC voltage source (not shown in the drawings) is converted to three-phase AC power which is then outputted from the AC terminal 22 based on a PWM reference, a UM conversion circuit 31 in which the three-phase output voltage at the AC terminal 22 is converted to dq rotational coordinates which are then outputted, a third superior voltage control circuit 110 which outputs a signal generated based on the superior reference vector 120 and the output voltage vector of the UM conversion circuit 31 as a voltage reference vector, a third inferior voltage control circuit 100 which outputs a signal generated based on a base voltage vector, the three-phase output voltage at the AC terminal 22 and the voltage reference vector from the third superior voltage control circuit 110 as a PWM reference, and a frequency control circuit 50 which synchronizes a value generated based on a base frequency and the q-axis component of the output voltage vector obtained by the UM conversion circuit 31 with the rotation angle of a rotational coordinates conversion matrix 52 in the UM conversion circuit 31. In the present converter 13, the signal process inside the third inferior voltage control circuit 100 is carried out for the original three phases. Because the same structural elements as those in FIG. 14 and FIG. 15 are shown by the same symbols in FIG. 16 and FIG. 18, a description is omitted.

A superior reference vector 120 formed from a voltage amplitude reference value for the amplitude of the three-phase output voltage at the AC terminal 22 and a frequency reference value for the frequency is inputted in the third superior voltage control circuit 110. Further, a signal is generated based on the inputted superior reference vector 120 and the output voltage vector obtained by the UM conversion circuit 31 so that the amplitude and frequency of the three-phase output voltage at the AC terminal 22 are close to the reference values that are based on the superior reference vector 120, and this signal is outputted as a voltage reference vector.

Namely, as was described for the first superior voltage control circuit 70 of FIG. 18, the output vector obtained from the UM conversion circuit 31 and the superior reference vector 120 are subtracted in a subtracter, and the result is amplified by a third superior control amplifier and undergoes inversion from dq rotational coordinates in an Inverse UM transformation circuit 111 to generate a voltage reference vector so that the voltage amplitude and frequency of the power system are close to the reference values that are based on the superior reference vector 120. In this way, even if the voltage amplitude and frequency of the power system are changed, it is possible to detect each deviation portion of the voltage amplitude and frequency of the three-phase output of the three-phase voltage-fed AC/DC converter 13 for such amplitude and frequency.

In the third inferior voltage control circuit 100 of FIG. 16, a signal is generated so that the amplitude and phase of the three-phase output voltage are close to the combined value of the base voltage vector and the voltage reference vector based on a base voltage vector which prescribes the amplitude and phase of the three-phase output voltage at the AC terminal 22, the three-phase output voltage at the AC terminal 22 and the voltage reference vector from the third superior voltage control circuit 110, and then this signal is outputted as a PWM reference. Namely, the third inferior voltage control circuit 100 has a second base voltage vector setting unit 101 in place of the first base voltage vector setting unit 61, and a third voltage controller in place of the first voltage controller 64 of the first inferior voltage control circuit 60 described in FIG. 18, and does not have the first Inverse U transformation unit 65 of the first inferior voltage control circuit 60. Further, the base voltage vector is set in advance by a second base voltage vector setting unit 101. This base voltage vector forms the reference of the amplitude and phase of the three-phase output voltage at the AC terminal 22.

Namely, the voltage reference vector from the third superior voltage control circuit 110 is added in an adder to the base voltage vector set in advance in the second base voltage vector setting unit 101 to add a compensation portion of the deviation of the voltage amplitude and frequency of the power system. Further, the three-phase output voltage vector of the AC terminal 22 is subtracted in a subtracter, and the result is converted and outputted to the three-phase voltage-fed AC/DC conversion circuit 40 as a PWM reference so that the difference with the voltage amplitude and phase of the power system is close to the combined value of the base voltage vector and the voltage reference vector in a third voltage controller. In this way, the deviation portion detected by the third superior voltage control circuit 110 can be compensated, and the amplitude and phase of the three-phase output voltage of the three-phase voltage-fed AC/DC converter 13 can be controlled so that the amplitude and phase of the three-phase output voltage of the three-phase voltage-fed AC/DC converter 13 match the voltage amplitude and phase of the power system.

The three-phase voltage-fed AC/DC converter 13 shown in FIG. 16 is equipped with the positive feedback circuit 200 and the voltage anomaly detection circuit 220 described in FIG. 14 and FIG. 18. Accordingly, by detecting a voltage anomaly with the voltage anomaly detection circuit 220, the three-phase voltage-fed AC/DC converter 13 can judge that an islanding operation is formed.

The three-phase voltage-fed AC/DC converter 13 shown in FIG. 16 is equipped with the inverter output blocking means described in FIG. 14 and FIG. 18. The inverter output blocking means of FIG. 15 is a switch 230 provided between the AC terminal 22 and a gate signal blocking unit and/or the three-phase voltage-fed AC/DC conversion circuit 40. Accordingly, in the case where the voltage anomaly detection circuit 220 detects a voltage anomaly, namely, at the time of an islanding operation, the three-phase voltage-fed AC/DC converter 13 can interrupt the output to an external unit of the three-phase AC voltage.

The three-phase voltage-fed AC/DC converter 13 is further equipped with positive feedback circuit halting means. The positive feedback circuit halting means of FIG. 16 is a switch which opens and closes the positive feedback circuit 200 and/or an indicator circuit which sets the gain of the positive feedback circuit 200 to zero. Accordingly, in the case where the voltage anomaly detection circuit 220 detects a voltage anomaly, namely, at the time of an islanding operation, the three-phase voltage-fed AC/DC converter 13 can prevent wide fluctuation of the frequency and voltage amplitude of the three-phase AC from the three-phase voltage-fed AC/DC conversion circuit 40.

The three-phase voltage-fed AC/DC converter 13 of FIG. 16 may be further equipped with the feedforward amplifier 68 of FIG. 18 as well as the current detection circuit 80 required for this, the filter current compensator 66 and the PWM current deviation compensator 67 of FIG. 18, and the outputs from these circuits can be added to the output vector from a third voltage controller inside the third inferior voltage control circuit 100.

Further, the three-phase voltage-fed AC/DC converter 12 can detect an islanding operation by the positive feedback circuit 200 and the voltage anomaly detection circuit 220, can block the output of the three-phase AC voltage at the time of an islanding operation to an external unit by the inverter output blocking means and the positive feedback circuit halting means, and can prevent wide fluctuation of the frequency and voltage amplitude of the three-phase AC from the three-phase voltage-fed AC/DC conversion circuit 40.

As described above, from the fact that the three-phase voltage-fed AC/DC converter 13 of FIG. 16 has the same internal equivalent impedance as the three-phase voltage-fed AC/DC converter 11 of FIG. 14 and FIG. 18, it can be operated in connection to a power system as a distribution network, and because the three-phase voltage-fed AC/DC converter 13 is equipped with the frequency control circuit 50, the third superior voltage control circuit 110 and the third inferior voltage control circuit 100, it can carry out an autonomous parallel operation which compensates the power deviation for the power system autonomously.

What is claimed is:

1. A three-phase voltage-fed AC/DC converter, comprising:

a three-phase voltage-fed AC/DC conversion circuit which has internal equivalent impedance viewed from an AC terminal, converts power from a DC voltage source to three-phase AC power in accordance with the pulse width of gate signals generated based on a PWM reference, and outputs said three-phase AC power to said AC terminal;

a UM conversion circuit which converts the three-phase output voltage at said AC terminal to dq rotational coordinates in which the component related to the amplitude of said three-phase output voltage forms the d-axis component and the component related to the frequency deviation of said three-phase output voltage forms the q-axis component, and outputs the result;

a superior voltage control circuit which receives the input of a superior reference vector formed with both a voltage amplitude reference value for the amplitude of the three-phase output voltage at said AC terminal and a frequency reference value for the frequency, and generates a signal that makes the amplitude and frequency of the three-phase output voltage at said AC terminal close to the reference values prepared by said superior reference vector, based on said inputted superior reference vector and the output voltage vector obtained by said UM conversion circuit, and outputs the signal as a voltage reference vector;

an inferior voltage control circuit which generates a signal that makes the amplitude and phase of said three-phase output voltage close to the combined value of both a base voltage vector and said voltage reference vector, based on said base voltage vector which prescribes the amplitude and phase of the three-phase output voltage at said AC terminal, an output voltage vector obtained by said UM conversion circuit and said voltage reference vector from said superior voltage control circuit, and outputs the signal as said PWM reference; and a frequency control circuit which synchronizes a value generated based on a base frequency which prescribes the frequency of the three-phase output voltage at said AC terminal and said q-axis component of the output voltage vector obtained by said UM conversion circuit with the rotation angle of a conversion matrix in said UM conversion circuit.

2. The three-phase voltage-fed AC/DC converter described in claim 1, wherein:

said superior voltage control circuit is provided with a first subtracter which subtracts the output voltage vector obtained by said UM conversion circuit from said superior reference vector, and a superior control amplifier which amplifies the output vector prepared by said first subtracter and then outputs the result as said voltage reference vector so that the three-phase output voltage at said AC terminal is close to said reference value that is based on said superior reference vector;

said inferior voltage control circuit is provided with a base voltage vector setting unit which sets and outputs said base voltage vector, a first adder which adds the voltage reference vector from said superior voltage control circuit and the base voltage vector from said base voltage vector setting unit and then outputs the result, a second subtracter which subtracts the output voltage vector obtained by said UM conversion circuit from the output vector prepared by said first adder, a voltage controller which converts the output vector from said second subtracter and outputs the result so that the three-phase output voltage at said AC terminal is close to the combined value of said base voltage vector and said voltage reference vector, and an Inverse U transformation unit which outputs the output vector from said voltage controller as said PWM reference by carrying out inversion from said dq rotational coordinates; and said frequency control circuit is provided with a base frequency setting unit which sets said base frequency, a first time-integrator which carries out time integration of the base frequency from said base frequency setting unit and outputs the result, a loop filter which adds a low-pass filtering element to said q-axis component of the output voltage vector obtained by said UM conversion circuit and outputs the result, a second time-integrator which carries out time integration of the output value from said loop filter and outputs the result, and a second adder which adds the output value from said first time-integrator and the output value from said second time-integrator and then outputs the result as said generated value;

wherein said frequency control circuit synchronizes said generated value with the rotation angle of the conversion matrix in said UM conversion circuit and said Inverse U transformation unit.

3. A three-phase voltage-fed AC/DC converter, comprising:
- a three-phase voltage-fed AC/DC conversion circuit which has internal equivalent impedance viewed from an AC terminal, converts power from a DC voltage source to three-phase AC power in accordance with the pulse width of gate signals generated based on a PWM reference, and outputs said three-phase AC power to said AC terminal;
- an M conversion circuit which converts the three-phase output voltage at said AC terminal to $\alpha\beta$ static coordinates formed by an $\alpha$ axis and a $\beta$ axis which are mutually orthogonal;
- a U conversion circuit which converts the output voltage vector of said M conversion circuit to dq rotational coordinates in which the component related to the amplitude of said three-phase output voltage forms the d-axis component and the component related to the frequency deviation of said three-phase output voltage forms the q-axis component, and then outputs the result;
- a superior voltage control circuit which receives the input of a superior reference vector formed with both a voltage amplitude reference value for the amplitude of the three-phase output voltage at said AC terminal and a frequency reference value for the frequency, and generates a signal that makes the amplitude and frequency of the three-phase output voltage at said AC terminal close to the reference values prepared by said superior reference vector, based on said inputted superior reference vector and the output voltage vector obtained by said U conversion circuit, and carries out inverse U transformation of the signal from said dq rotational coordinates to said $\alpha\beta$ static coordinates, and outputs the signal on the $\alpha\beta$ coordinates as a voltage reference vector;
- an inferior voltage control circuit which generates a signal that makes the amplitude and phase of said three-phase output voltage close to the combined value of both a base voltage vector and said voltage reference vector, based on said base voltage vector which prescribes the amplitude and phase of the three-phase output voltage at said AC terminal, an output voltage vector obtained by said UM conversion circuit and said voltage reference vector from said superior voltage control circuit, and outputs the signal as said PWM reference; and
- a frequency control circuit which synchronizes a value generated based on a base frequency which prescribes the frequency of the three-phase output voltage at said AC terminal and said q-axis component of the output voltage vector obtained by said U conversion circuit with the rotation angle of a conversion matrix in said U conversion circuit and said superior voltage control circuit.

4. The three-phase voltage-fed AC/DC converter described in claim 3, wherein:
- said superior voltage control circuit is provided with a first subtracter which subtracts the output voltage vector obtained by said U conversion circuit from said superior reference vector, a superior control amplifier which amplifies the output vector prepared by said first subtracter and then outputs the result so that the three-phase output voltage at said AC terminal is close to said reference value that is based on said superior reference vector, and an Inverse U transformation unit which carries out inverse U transformation of the output vector from said superior control amplifier from said dq rotational coordinates to said $\alpha\beta$ static coordinates and outputs said $\alpha\beta$ coordinates as said voltage reference vector;
- said inferior voltage control circuit is provided with a base voltage vector setting unit which sets and outputs said base voltage vector, a first adder which adds the voltage reference vector from said superior voltage control circuit and the base voltage vector from said base voltage vector setting unit and then outputs the result, a second subtracter which subtracts the output voltage vector obtained by said M conversion circuit from the output vector prepared by said first adder, and a voltage controller which converts the output vector from said second subtracter and outputs the result as said PWM reference so that the three-phase output voltage at said AC terminal is close to the combined value of said base voltage vector and said voltage reference vector; and
- said frequency control circuit is provided with a base frequency setting unit which sets said base frequency, a first time-integrator which carries out time integration of the base frequency from said base frequency setting unit and outputs the result, a loop filter which adds a low-pass filtering element to said q-axis component of the output voltage vector obtained by said U conversion circuit and outputs the result, a second time-integrator which carries out time integration of the output value from said loop filter and outputs the result, and a second adder which adds the output value from said first time-integrator and the output value from said second time-integrator and then outputs the result as said generated value;
- wherein said frequency control circuit synchronizes said generated value with the rotation angle of the conversion matrix in said U conversion circuit and said Inverse U transformation unit.

5. A three-phase voltage-fed AC/DC converter, comprising:
- a three-phase voltage-fed AC/DC conversion circuit which has internal equivalent impedance viewed from an AC terminal, converts power from a DC voltage source to three-phase AC power in accordance with the pulse width of gate signals generated based on a PWM reference, and outputs said three-phase AC power to said AC terminal;
- a UM conversion circuit which converts the three-phase output voltage at said AC terminal to dq rotational coordinates in which the component related to the amplitude of said three-phase output voltage forms the d-axis component and the component related to the frequency deviation of said three-phase output voltage forms the q-axis component, and outputs the result;
- a superior voltage control circuit which receives the input of a superior reference vector formed with both a voltage amplitude reference value for the amplitude of the three-phase output voltage at said AC terminal and a frequency reference value for the frequency, and generates a signal that takes the amplitude and frequency of the three-phase output voltage at said AC terminal close to the reference values prepared by said superior reference vector, based on said inputted superior reference vector and the output voltage vector obtained by said UM conversion circuit, and outputs the signal as a voltage reference vector by carrying out inverse UM transformation from said dq rotational coordinates;
- an inferior voltage control circuit which generates a signal that makes the amplitude and phase of said three-phase output voltage close to the combined value of both a base voltage vector and said voltage reference vector, based on said base voltage vector which prescribes the amplitude and phase of the three-phase output voltage at said AC terminal, an output voltage vector obtained by said UM conversion circuit and said voltage reference vector from said superior voltage control circuit, and outputs the signal as said PWM reference; and a frequency control circuit which synchronizes a value generated based on a base frequency which prescribes the frequency of the three-phase output voltage at said AC terminal and said q-axis component of the output voltage vector obtained by said UM conversion circuit with the rotation angle of a conversion matrix in said UM conversion circuit and said superior voltage control circuit.

6. The three-phase voltage-fed AC/DC converter described in claim 5, wherein:

said superior voltage control circuit is provided with a first subtracter which subtracts the output voltage vector obtained by said UM conversion circuit from said superior reference vector, a superior control amplifier which amplifies the output vector prepared by said first subtracter and then outputs the result as said voltage reference vector so that the three-phase output voltage at said AC terminal is close to said reference value that is based on said superior reference vector, and an Inverse UM transformation circuit which outputs the output vector from said superior control amplifier as said voltage reference vector by carrying out inverse UM transformation from said dq rotational coordinates;

said inferior voltage control circuit is provided with a base voltage vector setting unit which sets and outputs said base voltage vector, a first adder which adds the voltage reference vector from said superior voltage control circuit and the base voltage vector from said base voltage vector setting unit and then outputs the result, a second subtracter which subtracts the three-phase output voltage at said AC terminal from the output vector prepared by said first adder, and a voltage controller which converts the output vector from said second subtracter and outputs the result as said PWM reference so that the three-phase output voltage at said AC terminal is close to the combined value of said base voltage vector and said voltage reference vector; and said frequency control circuit is provided with a base frequency setting unit which sets said base frequency, a first time-integrator which carries out time integration of the base frequency from said base frequency setting unit and outputs the result, a loop filter which adds a low-pass filtering element to said q-axis component of the output voltage vector obtained by said UM conversion circuit and outputs the result, a second time-integrator which carries out time integration of the output value from said loop filter and outputs the result, and a second adder which adds the output value from said first time-integrator and the output value from said second time-integrator and then outputs the result as said generated value;

wherein said frequency control circuit synchronizes said generated value with the rotation angle of the conversion matrix in said UM conversion circuit and said Inverse UM transformation circuit.

7. The three-phase voltage-fed AC/DC converter described in claim 1 wherein said three-phase voltage-fed AC/DC conversion circuit is provided with:

a three-phase voltage-fed AC/DC conversion unit which has said internal equivalent impedance viewed from said AC terminal, converts power from said DC voltage source to three-phase AC power in accordance with the pulse width of said gate signals, and outputs said three-phase AC power;

a current detection circuit which detects the three-phase output current of said three-phase voltage-fed AC/DC conversion unit and then outputs a signal generated in accordance with the size of said three-phase output current;

a gate signal generator which generates and outputs said gate signals so that the difference between said PWM reference and the output from said current detection circuit is close to zero; and a three-phase AC filter circuit which removes the high-frequency component originating in said gate signals in said three-phase voltage-fed AC/DC conversion unit from the three-phase output voltage of said three-phase voltage-fed AC/DC conversion unit.

8. The three-phase voltage-fed AC/DC converter described in claim 1 wherein said three-phase voltage-fed AC/DC conversion circuit is provided with:

a three-phase voltage-fed AC/DC conversion unit which has said internal equivalent impedance viewed from said AC terminal, converts power from said DC voltage source to three-phase AC power in accordance with the pulse width of said gate signals, and outputs said three-phase AC power;

a voltage detection circuit which detects the three-phase output voltage of said three-phase voltage-fed AC/DC conversion unit and then outputs a signal generated in accordance with the size of said three-phase output voltage;

a gate signal generator which generates and outputs said gate signals so that the difference between said PWM reference and the output from said current detection circuit is close to zero; and a three-phase AC filter circuit which removes the high-frequency component originating in said gate signals in said three-phase voltage-fed AC/DC conversion unit from the three-phase output voltage of said three-phase voltage-fed AC/DC conversion unit.

9. The three-phase voltage-fed AC/DC converter described in claim 2, further comprising a current detection circuit which detects the three-phase output current of said AC terminal, and a second UM conversion circuit which converts the detected current signal of said current detection circuit to dq rotational coordinates in which the d-axis component forms the component related to the active power and the q-axis component forms the component related to the reactive power, and outputs the result, wherein:

said three-phase voltage-fed AC/DC conversion circuit is provided with a three-phase voltage-fed AC/DC conversion unit which has said internal equivalent impedance viewed from said AC terminal, converts power from said DC voltage source to three-phase AC power in accordance with the pulse width of said gate signals, and outputs said three-phase AC power, a current detection circuit which detects the three-phase output current of said three-phase voltage-fed AC/DC conversion unit and then outputs a signal generated in accordance with the size of said three-phase output current, a gate signal generator which generates and outputs said gate signals so that the difference between said PWM reference and the output from said current detection circuit is close to zero, and a three-phase AC filter circuit which removes the high-frequency component originating in said gate signals in said three-phase voltage-fed AC/DC conversion unit from the three-phase output voltage of said three-phase voltage-fed AC/DC conversion unit; and said inferior voltage control circuit is provided with a filter current compensator which outputs a current compensation vector prescribed so that the current loss in said three-phase AC filter circuit is compensated, a PWM current deviation compensator which outputs a current deviation compensation vector prescribed so that the current deviation of the three-phase output current from said three-phase voltage-fed AC/DC conversion circuit is compensated, a feedforward amplifier which amplifies the output current vector from said second UM conversion circuit at a prescribed feedforward gain so that the current for the load of said AC terminal is compensated, and a third adder which adds the current deviation compensation vector from said filter current compensator, the current deviation compensation vector from said PWM current deviation compensator and the output vector from said feedforward amplifier to the output vector from said voltage controller;

wherein said frequency control circuit synchronizes said generated value with the rotation angle of the conversion matrix in said second UM conversion circuit.

10. The three-phase voltage-fed AC/DC converter described in claim 2, further comprising a current detection circuit which detects the three-phase output current of said AC terminal, and a second UM conversion circuit which converts the detected current signal of said current detection circuit to dq rotational coordinates in which the d-axis component forms the component related to the active power and the q-axis component forms the component related to the reactive power, and outputs the result, wherein:

said three-phase voltage-fed AC/DC conversion circuit is provided with a three-phase voltage-fed AC/DC conversion unit which has said internal equivalent impedance viewed from said AC terminal, converts power from said DC voltage source to three-phase AC power in accordance with the pulse width of said gate signals, and outputs said three-phase AC power, a voltage detection circuit which detects the three-phase output voltage of said three-phase voltage-fed AC/DC conversion unit and then outputs a signal generated in accordance with the size of said three-phase output voltage, a gate signal generator which generates and outputs said gate signals so that the difference between said PWM reference and the output from said current detection circuit is close to zero, and a three-phase AC filter circuit which removes the high-frequency component originating in said gate signals in said three-phase voltage-fed AC/DC conversion unit from the three-phase output voltage of said three-phase voltage-fed AC/DC conversion unit; and said inferior voltage control circuit is provided with a filter current compensator which outputs a current compensation vector prescribed so that the current loss in said three-phase AC filter circuit is compensated, a PWM current deviation compensator which outputs a current deviation compensation vector prescribed so that the current deviation of the three-phase output current from said three-phase voltage-fed AC/DC conversion circuit is compensated, a feedforward amplifier which amplifies the output current vector from said second UM conversion circuit at a prescribed feedforward gain so that the current for the load of said AC terminal is compensated, and a third adder which adds the current deviation compensation vector from said filter current compensator, the current deviation compensation vector from said PWM current deviation compensator and the output vector from said feedforward amplifier to the output vector from said voltage controller;

wherein said frequency control circuit synchronizes said generated value with the rotation angle of the conversion matrix in said second UM conversion circuit.

11. A three-phase voltage-fed AC/DC converter, comprising:

a three-phase voltage-fed AC/DC conversion circuit which has internal equivalent impedance viewed from an AC terminal, converts power from a DC voltage source to three-phase AC power in accordance with the pulse width of gate signals generated based on a PWM reference, and outputs said three-phase AC power to said AC terminal;

a superior voltage control circuit which receives the input of the output voltage vector obtained by converting the output from said three-phase voltage-fed AC/DC conversion circuit to dq rotational coordinates in which the component related to the amplitude of the three-phase output voltage forms the d-axis component and the component related to the frequency deviation of said three-phase output voltage forms the q-axis component, and the input of a superior reference vector in dq rotational coordinates in which the amplitude reference value for the amplitude of the output voltage of said AC terminal forms the d-axis component and the reference value for the frequency forms the q-axis component, generates a voltage reference vector based on said inputted output voltage vector and said inputted superior reference vector so that the amplitude and frequency of the three-phase output voltage at said AC terminal are close to the reference values that are based on said superior reference vector, and outputs said voltage reference vector;

a positive feedback circuit which carries out positive feedback of each of the dq rotational coordinates axial components of said output voltage vector on at least one of the dq rotational coordinates axial components of said superior reference vector inputted in said superior voltage control circuit;

an inferior voltage control circuit which generates a signal so that the amplitude and phase of said three-phase output voltage are close to the combined value of a base voltage vector and said voltage reference vector based on said base voltage vector which prescribes the amplitude and phase of the three-phase output voltage at said AC terminal, a vector based on the output voltage of said three-phase voltage-fed AC/DC conversion circuit and said voltage reference vector from said superior voltage control circuit, and outputs the signal as said PWM reference; and a frequency control circuit which synchronizes a value generated based on a base frequency which prescribes the frequency of the three-phase output voltage at said AC terminal and a value generated based on the q-axis component of the output voltage vector obtained by conversion of the output of said three-phase voltage-fed AC/DC conversion circuit to dq rotational coordinates with the rotation angle of a conversion matrix that converts the output from said three-phase voltage-fed AC/DC conversion circuit to dq rotational coordinates and/or the rotation angle of a conversion matrix in said superior voltage control circuit;

a voltage anomaly detection circuit which monitors the output voltage of said three-phase voltage-fed AC/DC conversion circuit and detects a deviation of the monitored voltage from a predetermined range as a voltage anomaly;

wherein said voltage anomaly detection circuit monitors the amplitude value of said output, the frequency of said output or the amount of correlation in these.

12. The three-phase voltage-fed AC/DC converter described in claim 11, further comprising:

inverter output blocking means which is provided inside said three-phase voltage-fed AC/DC conversion circuit, and has a gate signal blocking function that blocks said gate signals and/or an interruption function that interrupts the three-phase AC power from said three-phase voltage-fed AC/DC conversion circuit by a switch provided between said three-phase voltage-fed AC/DC conversion circuit and said AC terminal;

wherein said inverter output blocking means blocks the output of the three-phase AC power to said AC terminal in the case where said voltage anomaly detection circuit detects a voltage anomaly.

13. The three-phase voltage-fed AC/DC converter described in claim 11 further comprising:

a switch which interrupts said positive feedback circuit and/or positive feedback circuit halting means which sets the gain of said positive feedback circuit to zero;

wherein said positive feedback circuit halting means halts the positive feedback of said voltage output vector to said superior reference vector carried out by said positive feedback circuit after said inverter output blocking means blocks the output of the three-phase AC power to said AC terminal.

* * * * *